(12) United States Patent
Adachi et al.

(10) Patent No.: US 7,988,185 B2
(45) Date of Patent: Aug. 2, 2011

(54) KNEE-PROTECTING AIRBAG APPARATUS

(75) Inventors: Yuichi Adachi, Aichi-ken (JP); Kazuaki Bito, Aichi-ken (JP); Osamu Fukawatase, Aichi-ken (JP); Tomoyuki Moro, Toyota (JP); Kenji Imamura, Kosai (JP); Akiyoshi Sanada, Aichi-ken (JP)

(73) Assignees: Toyoda Gosei Co., Ltd., Aichi-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 222 days.

(21) Appl. No.: 12/310,194

(22) PCT Filed: Sep. 27, 2007

(86) PCT No.: PCT/JP2007/069416
§ 371 (c)(1),
(2), (4) Date: Feb. 17, 2009

(87) PCT Pub. No.: WO2008/047605
PCT Pub. Date: Apr. 24, 2008

(65) Prior Publication Data
US 2011/0049847 A1    Mar. 3, 2011

(30) Foreign Application Priority Data

Sep. 29, 2006  (JP) .................................. 2006-268004
Nov. 9, 2006   (JP) .................................. 2006-304213

(51) Int. Cl.
*B60R 21/16* (2006.01)
(52) U.S. Cl. .................................. 280/730.1; 280/728.3
(58) Field of Classification Search ............... 280/730.1, 280/728.3
See application file for complete search history.

(56) References Cited

U.S. PATENT DOCUMENTS

| | | | |
|---|---|---|---|
| 5,072,967 | A | 12/1991 | Batchelder et al. |
| 5,570,901 | A | 11/1996 | Fyrainer |
| 6,039,380 | A | 3/2000 | Heilig et al. |
| 2003/0107206 | A1 | 6/2003 | Takimoto et al. |
| 2004/0232662 | A1 | 11/2004 | Loeper et al. |

FOREIGN PATENT DOCUMENTS

| | | |
|---|---|---|
| CN | 1765660 A | 5/2006 |
| DE | 10250405 | 5/2003 |
| EP | 0684167 | 11/1995 |

(Continued)

OTHER PUBLICATIONS

Office Action issued from the Japanese Patent Office mailed on Sep. 8, 2009 in the corresponding Japanese patent application No. 2006-304213.

(Continued)

*Primary Examiner* — Eric Culbreth
(74) *Attorney, Agent, or Firm* — Posz Law Group, PLC

(57) ABSTRACT

The knee-protecting airbag apparatus includes an airbag folded and housed in a lower area inside the column cover. The airbag pushes and opens a door section on the column cover upon deployment. When the door section is thus opened, a door of the door section blocks off an allowance gap formed between an outer circumference of the column cover subjected to position adjustment and a lower area of a peripheral region of an installation opening on a dashboard for installing the column cover by locating a rear edge region of the door to abut on a rear side of the dashboard or the lower area of the peripheral region of the installation opening on the rear side of the dashboard.

7 Claims, 53 Drawing Sheets

FOREIGN PATENT DOCUMENTS

| | | |
|---|---|---|
| GB | 2263671 | 8/1993 |
| JP | A-5-4556 | 1/1993 |
| JP | A-5-147489 | 6/1993 |
| JP | A-6-247252 | 9/1994 |
| JP | A-7-2043 | 1/1995 |
| JP | A-7-108892 | 4/1995 |
| JP | 8-301054 | 11/1996 |
| JP | 9-104317 | 4/1997 |
| JP | 10-71911 | 3/1998 |
| JP | 11-59301 | 3/1999 |
| JP | 2000-335344 | 12/2000 |
| JP | 2001-106013 | 4/2001 |
| JP | 2002-037003 | 2/2002 |
| JP | A-2005-503951 | 2/2005 |

OTHER PUBLICATIONS

PCT International Search Report of the International Searching Authority (EPO) for the corresponding International patent application No. PCT/JP2007/069416 mailed on Apr. 9, 2008 (a copy thereof).

Office Action issued from the Chinese Patent Office mailed on Jul. 12, 2010 in corresponding Chinese patent application No. 2007 8003 6050.3.

though a knee-protecting airbag apparatus is known, it is
KNEE-PROTECTING AIRBAG APPARATUS

CROSS REFERENCE TO RELATED APPLICATIONS

This application is a U.S. national stage application of PCT/JP2007/069416 filed on Sep. 27, 2007, and claims priority to, and incorporates by reference, Japanese Patent Application No. 2006-268004 filed on Sep. 29, 2006, and Japanese Patent Application No. 2006-304213 filed on Nov. 9, 2006.

TECHNICAL FIELD

The present invention relates to a knee-protecting airbag apparatus which protects knees of a driver upon a crash of vehicle, and more particularly to a knee-protecting airbag apparatus mounted on a steering column such that an airbag is housed in a folded state inside a column cover covering the steering column.

BACKGROUND OF THE INVENTION

As disclosed in JP 8-301054, JP 9-104317, JP 10-71911 and DE 10250405, it is known in the prior art that an airbag of a knee-protecting airbag apparatus mounted on a steering column is housed at a lower region of a space inside a column cover in a folded state. In operation, the airbag is fed with inflation gas and emerges from the column cover to be deployed in front of knees of a driver.

DISCLOSURE OF THE INVENTION

The column cover is configured into a tubular contour for covering the steering column in such a manner as to project rearward from the instrument panel and is located in front of knees of a driver.

In an instance where the steering column is equipped with such adjusting mechanisms as a telescopic mechanism and/or a tilt mechanism for adjusting the disposition of the steering wheel, the column cover can be moved back and forth and/or up and down together with the steering column by operation of such mechanisms. Considering the fear that the column cover may engage with the instrument panel upon such movement, an allowance gap is formed between the column cover and a periphery of an opening on the instrument panel for installing the steering column together with the column cover for allowing the movement of the column cover.

Efforts have been made to make an airbag deploy smoothly in front of knees of a driver without having the airbag enter into the allowance gap even in the event that the column cover is moved to enlarge the gap due to the operation of the adjusting mechanisms.

The first object of the present invention is to provide a knee-protecting airbag apparatus which deploys an airbag housed inside the column cover smoothly even in the event that the disposition of the column cover is adjusted.

It is also known in the prior art, as disclosed in JP 9-104317 and JP 10-71911, that an airbag of the knee-protecting airbag apparatus pushes and opens an airbag cover formed integral with the column cover upon emerging from the column cover. The airbag cover is configured together with a thinned tearable portion formed around the airbag cover such that the tearable portion is torn when pushed by the inflating airbag so as to provide an opening allowing the airbag to emerge therefrom to be deployed in front of knees of a driver.

With this structure, the airbag upon deployment has to overcome a high resistance of the airbag cover in order to tear the tearable portion of the airbag cover.

In order that the airbag cover swiftly opens for allowing the airbag to deploy in front of driver's knees quickly, it is conceivable to heighten the output of the inflator so the airbag has a high internal pressure in the initial stage of inflation. With this measure, however, although the airbag cover may be opened quickly, the airbag cover on opening process or the airbag in the initial stage of inflation are liable to engage with the knees since the column cover is located proximate the driver's knees in an instance where the knee-protecting airbag apparatus is mounted on a steering column. Hence separate means will be required to suppress the internal pressure of the airbag in order to protect the knees.

The second object of the present invention is to provide a knee-protecting airbag apparatus which suppresses the resistance of the airbag cover which the airbag would experience upon opening of the airbag cover and secures a quick deployment of the airbag from an airbag housing even with a suppressed internal pressure of the airbag in the initial stage of airbag inflation.

The first knee-protecting airbag apparatus of the present invention is mounted on a steering column of vehicle. The steering column projects rearward from an instrument panel and is equipped with a steering wheel at a rear end thereof and an adjusting mechanism for adjusting the disposition of the steering wheel at least vertically. The airbag apparatus includes a column cover, an airbag, and a door section. The column cover has a tubular contour and is mounted on the steering column for covering the steering column. The column cover is set in an installation opening on the instrument panel for installing the column cover with an allowance gap left between the column cover and a peripheral region of the installation opening on a rear side of the instrument panel for allowing the movement of the column cover together with the steering column by operation of the adjusting mechanism. The airbag is folded and housed in a lower area inside the column cover and emerges from the column cover for deployment when fed with inflation gas upon activation of the airbag apparatus. The airbag has such a contour as to cover at least a lower side of the column cover projected from the instrument panel and an area of the rear side of the instrument panel on lower, left and right sides of the column cover when fully inflated and deployed in front of driver's knees. The door section is formed on an area of the column cover ranging from the lower side to left and right sides of the column cover for opening up when pushed by the airbag for providing a single airbag emergence opening. The door section includes a lower door disposed on the lower side, a left door disposed on the left side, and a right door disposed on the right side, of the column cover.

At least the lower door opens forward and away from the column cover from a rear edge region thereof and locates the rear edge region to abut on the rear side of the instrument panel or on a lower area of the peripheral region of the installation opening on the rear side of the instrument panel for blocking the allowance gap formed between an outer circumference of the column cover moved by the adjusting mechanism and the lower area of the peripheral region of the installation opening on the rear side of the instrument panel from the rear such that the airbag is prevented from entering into the allowance gap.

With above structure of the airbag apparatus, if the airbag inflates with inflation gas, the lower door, left door and right door of the door section are pushed by the airbag to provide the airbag emergence opening on the column cover. This allows the airbag to emerge from the airbag emergence opening and deploy to cover at least the lower side of the column cover projected from the instrument panel and the rear side of the instrument panel on the lower, left and right sides of the column cover so that knees of a driver moving forward are protected from these members.

At this time, at least the rear edge region of the lower door of the door section abuts against the rear side of the instrument panel or the lower area of the peripheral region of the installation opening on the instrument panel so that the allowance gap formed between the outer surface of the column cover subjected to position adjustment by the adjusting mechanism and the lower area of the peripheral region of the installation opening on the instrument panel is blocked from the rear. This area of the allowance gap formed right below the column cover is most variable in vertical size due to operation of the adjusting mechanism. With above structure, however, the airbag is allowed to deploy smoothly without entering into the allowance gap even in the event that this area of the allowance gap is enlarged.

The allowance gap formed right below the column cover is maximized when the column cover is moved to the uppermost position by operation of a tilt mechanism. The gaps formed on the left and right sides of the column cover are not considerably affected in size by the operation of the adjusting mechanism such as the tilt mechanism and/or a telescopic mechanism. Accordingly, it will be desirable that the contours of the column cover and the installation opening are such that the allowance gaps formed on the left and right sides of the column cover be minimized, for example, by forming the installation opening into a rectangular shape whereas fabricating the column cover into a tubular shape having a rectangular section corresponding to the installation opening. With this structure, the airbag is securely prevented from entering into the allowance gap only by composing at least the lower door of the door section so as to block the allowance gap formed right below the column cover without a need to consider the structures of the left and right door for blocking the narrow allowance gaps formed on the left and right of the column cover. Under above condition, the left and right doors may be designed to open upward from the lower edges or open rearward from the front edges on condition that the left and right doors provide a single airbag emergence opening coupled with the lower door when pushed open by the airbag.

That is, with the first airbag apparatus of the present invention, the airbag housed inside the column cover deploys smoothly without entering into the allowance gap even if the column cover is subjected to position adjustment. Therefore, the airbag protects driver's knees moving forward from at least the lower side of the column cover and the rear side of the instrument panel on the lower, left and right sides of the column cover by covering these areas.

The left and right doors of the door section may of course structured like the lower door to open forward and away from the column cover from rear edge regions thereof and locating the rear edge regions to abut on the rear side of the instrument panel or on left and right areas of the peripheral region of the installation opening on the rear side of the instrument panel for blocking the allowance gap formed between the outer circumference of the column cover moved by the adjusting mechanism and the left and right areas of the peripheral region of the installation opening on the rear side of the instrument panel from the rear such that the airbag is prevented from entering into the allowance gap.

This structure will allow large allowance gaps on the left and right sides of the column cover and further increase the degree of freedom in designing the outer contour of the column cover since there is no need to consider the engagement between the column cover and left and right areas of the peripheral region of the installation opening on the instrument panel upon vertical and/or anteroposterior movement of the column cover.

In the above structure, it is desired that each of the lower door, left door and right door of the door section has flexibility, and that dispositions of the rear edges of the lower, left and right doors and lengths of the respective doors from rear ends to front ends at both lateral edges of the doors are predetermined as follows. The dispositions of the rear edges of the lower, left and right doors are predetermined such that regions of the respective doors flexed and opened in such a manner as to project from the outer circumference of the column cover contact with the lower, left and right areas of the peripheral region of the installation opening (the lower peripheral region of the installation opening) on the instrument panel when the column cover is moved to the foremost position by the adjusting mechanism and the allowance gap is maximized. The lengths of the respective doors from rear ends to front ends at both lateral edges are predetermined such that the flexed-open regions of the respective doors contact with the lower, left and right areas of the peripheral region of the installation opening (the lower peripheral region of the installation opening) on the instrument panel when the column cover is moved to the rearmost position by the adjusting mechanism and the allowance gap is maximized.

With this structure, since all the doors of the door section have flexibility, the flexed-open regions, i.e., areas of the rear edges regions of the doors disposed rearward relative to the rear sides of the instrument panel open in such a bent manner as to protrude from the outer surface of the column cover, and the flexed-open regions abut on the lower peripheral region of the installation opening (the lower, left and right areas of the peripheral region of the installation opening) on the column cover. At this time, if the dispositions of the rear edges of the respective doors and the lengths of the respective doors from rear ends to front ends at both lateral edges are predetermined as above, part of or whole regions of the respective doors projected rearward from the instrument panel are flexed or bent even when the allowance gap is maximized during the back and forth motion of the column cover. Then the flexed-open regions of the doors abut against the lower peripheral region of the installation opening on the instrument panel, thereby closing the allowance gap.

Moreover, if the doors of the door section all have flexibility, the doors smoothly block the allowance gap from the rear smoothly even in the event that the column cover is adjusted forward, rearward, upward or downward, by predetermining two parameters; the dispositions of the rear edges of the respective doors and the lengths of the respective doors from the rear ends to the front ends at both lateral edges.

With the above structure, when the lengths of the respective doors from the rear ends to the front ends at both lateral edges are long to certain extent, the flexed-open regions of the respective doors abut against the rear side of the lower peripheral region of the installation opening on the instrument panel in a clinging manner over a certain range. In this instance, the fully inflated airbag is allowed to deploy along and in proximity to the rear side of the instrument panel beyond regions of the flexed-open regions clung to the instrument panel. This arrangement helps the airbag to secure adequate reaction force from the rear side of the instrument panel upon receiving driver's knees, so that the knees are protected with adequate cushioning property.

It is desired in the above structure that the front ends of the lower, left and right doors of the door section at both lateral edges of the doors are located proximate the peripheral region of the installation opening on the instrument panel as viewed from a side of vehicle when the column cover is disposed at the rearmost position. This structure will allow the respective doors of the door section to secure sufficient anteroposterior lengths, and allow the respective doors to abut on the lower peripheral region of the installation opening on the instrument panel in such a manner as to produce the regions attached to the rear side of the instrument panel over a certain range at a point where the column cover is disposed at the rearmost position. As a result, the airbag deploys in an attached manner to the rear side of the instrument panel and secures the reaction force from the instrument panel easily at whatever position between the foremost position and the rearmost position the column cover is disposed.

If each of the lower door, left door and right door of the door section has a tearable portion around thereof adapted to tear when pushed by the airbag such that the door opens by teardown of the tearable portions for providing the airbag emergence opening, parting lines do not appear on the outer surface of the column cover around the respective doors, thereby improving the appearance of the column cover. Without considering this advantage, it will also be appreciated that each of the lower door, left door and right door of the door section is connected to the column cover at a hinge region thereof around which the respective door opens and that a peripheral edge of each of the doors except the hinge region is preliminarily separated from a surrounding area of the column cover.

In addition to the door section, an additional door may be formed on the column cover to adjoin the lower door, left door and right door of the door section from the rear such that the additional door coupled with the door section forms the airbag emergence opening.

With this structure, the additional door section located at the rear serves to widen the opening area of the airbag emergence opening while the front door section serves to cover the allowance gap, so that the airbag smoothly emerges from the column cover for deployment without getting into the installation opening on the instrument panel or being caught by a peripheral area of the airbag emergence opening.

The second knee-protecting airbag apparatus of the invention is adapted to be mounted on a steering column of a vehicle. The airbag apparatus includes a column cover, an airbag, and an airbag cover with a door. The column cover has a tubular contour for covering the steering column. The airbag is folded and housed on a lower region of the column cover so as to be inflatable with inflation gas for deployment in front of driver's knees for protection of the knees upon activation of the airbag apparatus. The airbag cover is disposed at a lower region on the column cover for covering the housed airbag and includes a door adapted to open when pushed by the inflating airbag for providing an airbag emergence opening on the column cover. The door is provided on the outer peripheral edge with a separate surface which is preliminarily separated from a peripheral edge of the airbag emergence opening on the column cover from before the opening of the door such that a resistance that the airbag would experience upon opening the door is suppressed.

If the airbag of the second airbag apparatus of the invention inflates with inflation gas, the door of the airbag cover is pushed by the airbag and opens to provide the airbag emergence opening on the column cover. Then the airbag emerges from the opening and is deployed in front of knees of a driver.

At this time, the door of the airbag cover is provided on the outer peripheral edge with the separate surface which is preliminarily separated from the peripheral edge of the airbag emergence opening on the column cover from before the opening of the door. That is, the door has no or few portion to break in order to provide the airbag emergence opening, otherwise the airbag would experience a high resistance. Accordingly, the door of the airbag cover opens quickly and smoothly when pushed by the airbag even if the internal pressure of the airbag is not so high. As a result, the airbag emerges from an airbag housing quickly for further deployment.

With the second knee-protecting airbag apparatus of the present invention, therefore, the resistance of the airbag cover which the airbag would experience upon opening of the airbag cover is suppressed and a quick deployment of the airbag from the airbag housing is secured even with a suppressed internal pressure of the airbag in the initial stage of airbag inflation.

The airbag cover may be formed integral with the column cover of synthetic resin, or may alternatively be formed separate from the column cover.

If the airbag cover is integral with the column cover, the door may be designed such that a hinge region of the door is an integral hinge and the separate surface is comprised of a slit formed between the outer peripheral edge of the door except the integral hinge and the peripheral edge of the airbag emergence opening on the column cover.

With this structure, the integral hinge is flexed when the door is pushed by the inflating airbag, and allows the door to open to provide the airbag emergence opening. Since the door has the separate surface composed of the slit formed along the outer peripheral edge of the door except the location of the integral hinge, the door opens quickly. This structure will further facilitate the manufacture of the airbag cover since the airbag cover and the column cover are integral.

If the airbag cover is formed as a separate entity from the column cover, it will be appreciated that the door is formed as a hinged door which opens downwardly about a hinge portion and that the airbag cover is coupled to the column cover at the hinge portion of the door.

With this structure, since the hinge portion around which the door opens also serves as a joint to the column cover, the number of parts of the joint is reduced. Of course the door stays connected to the column cover at the hinge portion if the door opens, and therefore, the door does not fly off from the column cover.

The hinge portion may include a rotary shaft serving as a center of rotation of the door and a bearing element supporting the rotary shaft in such a manner as to allow rotation of the rotary shaft. The rotary shaft and bearing element may be respectively disposed on either the column cover or the door in a corresponding fashion.

Alternatively, the hinge portion may be comprised of a band member having flexibility. In this instance, the band member is fixedly connected to the door of the airbag cover at a first end thereof and is fixedly connected to the peripheral edge of the airbag emergence opening on the column cover at a second end thereof.

If the airbag cover is formed separate from the column cover while being coupled to the column cover at the hinge portion of the door, and if the airbag emergence opening is formed on the lower side of the column cover, the door rotates downward when forming the airbag emergence opening. At this time, if the door is designed to include, along the outer peripheral edge thereof, a plurality of retaining legs to be retained by an inner surface of the column cover at the peripheral edge of the airbag emergence opening, the door is prevented from opening downwardly. The same effect will be attained by forming such retaining legs along the peripheral edge of the airbag emergence opening on the column cover to hold the outer peripheral edge of the door. These retaining legs should be designed such that their retaining force is such as to allow the opening of the door upon airbag inflation. There is no need for means for preventing the door from moving upwardly because such a movement toward the interior of the column cover will be regulated by the folded airbag.

When the airbag cover is formed separate from the column cover so as to be held by the column cover, the door of the airbag cover may be a sliding door that moves along an opening face of the airbag emergence opening to provide the airbag emergence opening upon airbag inflation. In this instance, the pushing force of the airbag upon inflation may be utilized as a driving force to move or slide the door, optionally together with an actuator disposed inside the column cover. The sliding door desirably includes a thrust portion to be thrusted by the inflating airbag for movement for making most of the pushing force of the airbag. It will further be appreciated that a guide mechanism is disposed on the door and the column cover for guiding the movement of the door.

Moreover, if the airbag cover is separate from the column cover, the airbag cover may be mounted on the steering column such that the door is disposed on a location of the airbag emergence opening on the column cover so as to be opened when pushed by the inflating airbag.

The airbag emergence opening may be disposed either on a lower side of the column cover, on left and right sides of the column cover, or on an area of the column cover ranging from the lower side to the left and right sides.

If each one airbag emergence opening is formed on the left and right sides of the column cover, the airbag is promoted to unfurl toward the left and right, which helps the airbag to secure a wide protection area in the lateral direction.

When the airbag emergence opening is formed on an area of the column cover ranging from the lower side to the left and right sides, too, a wide protection area of the airbag is secured in the lateral direction. Further, the airbag is also deployed in the vicinity of the lateral center of the lower side of the column cover. Accordingly, if knees of a driver are positioned immediately below the column cover, the knees will be protected by the inflated airbag.

BEST MODES FOR CARRYING OUT THE INVENTION

Embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 4:
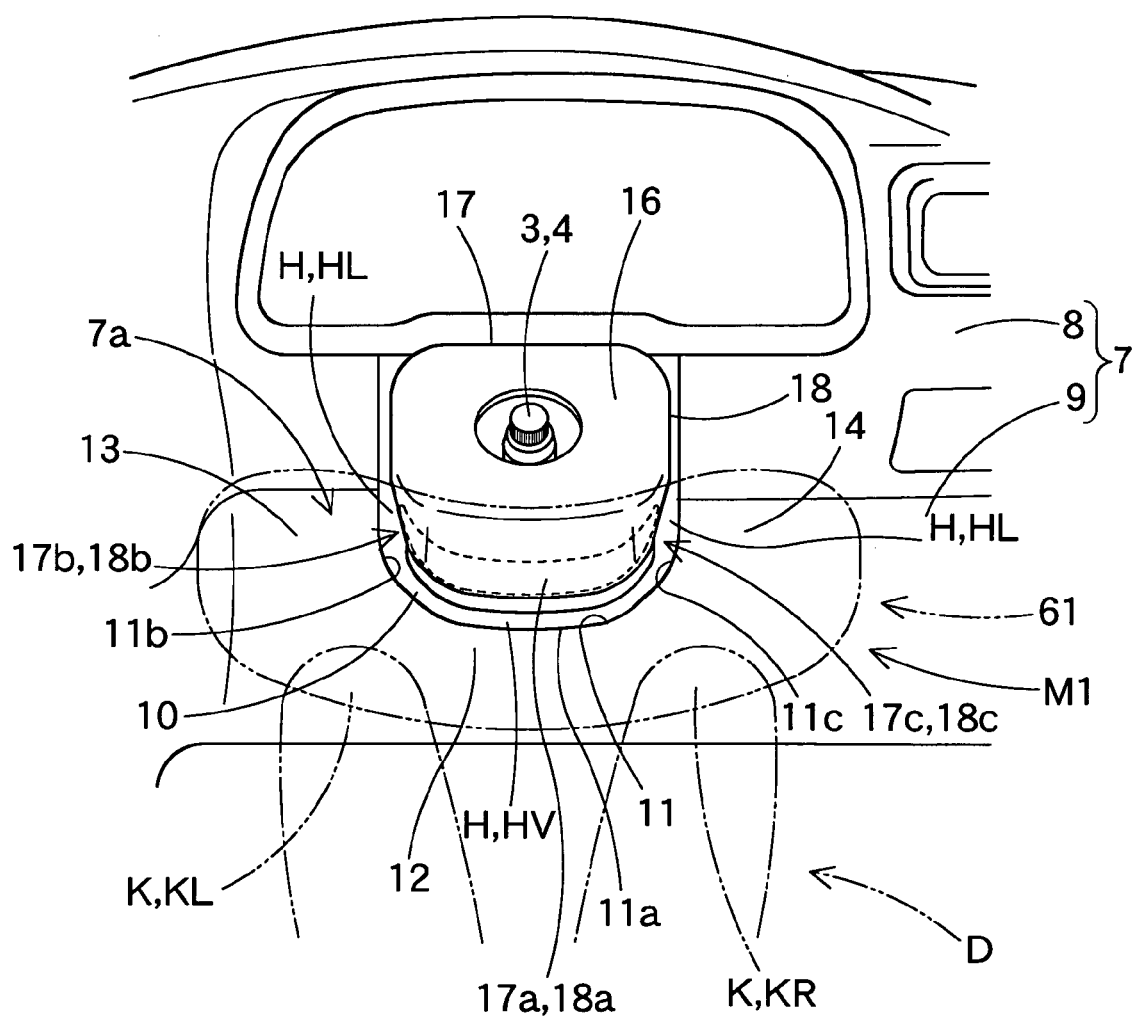
FIG. 4 is a schematic front view of the vicinity of the column cover of FIG. 1 as viewed from the rear.
Figure 5:
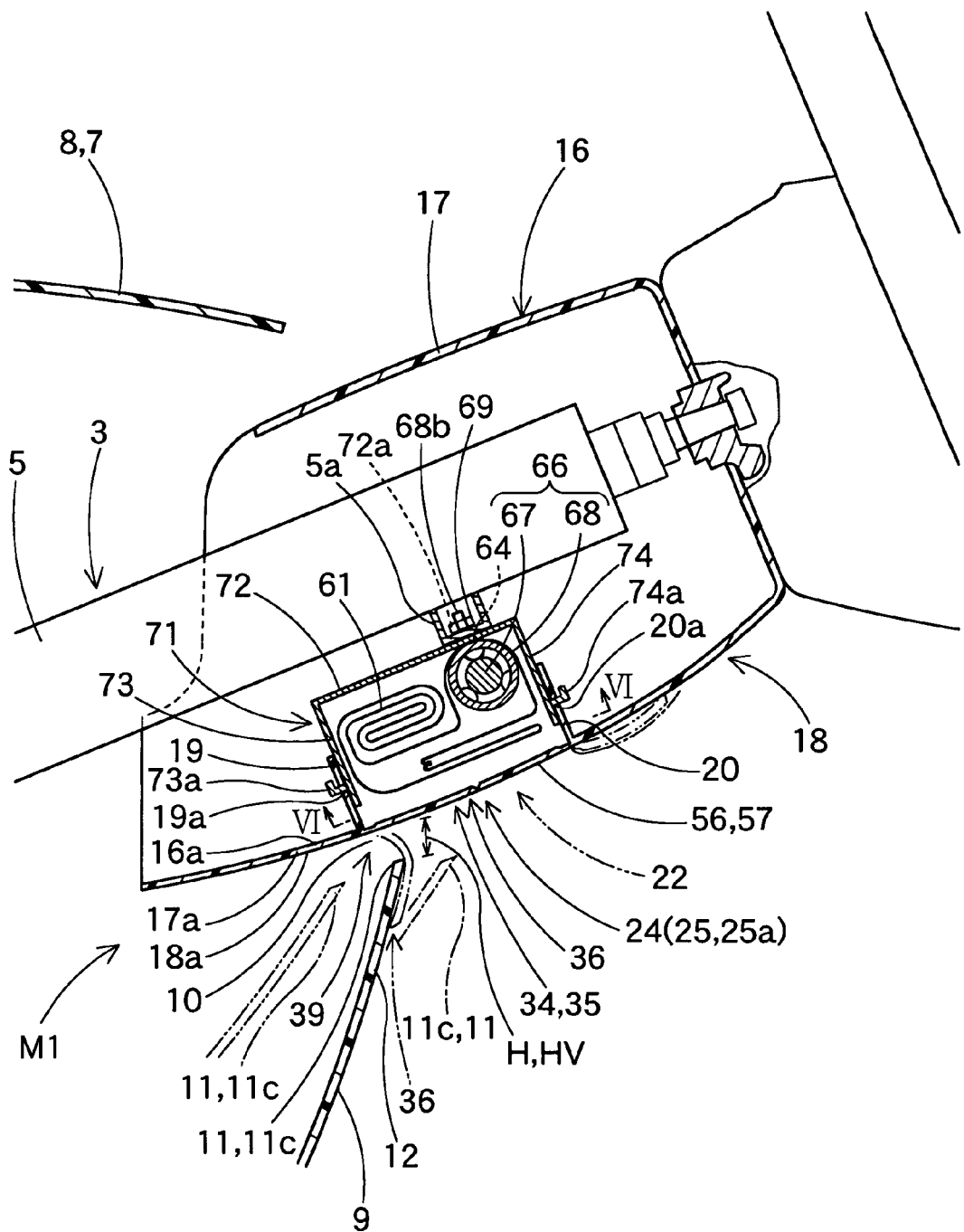
FIG. 5 is a schematic vertical section of the knee-protecting airbag apparatus of the first embodiment.

As shown in FIG. 5, a knee-protecting airbag apparatus M1 according to the first embodiment of the invention is mounted on a steering column 3, and includes an airbag 61 housed in a folded state at a lower region 16a of and inside a column cover 16. The airbag apparatus M1 includes the column cover 16 covering the steering column 3, the airbag 61, an inflator 66 for supplying inflation gas to the airbag 61, and a case 71 accommodating the airbag 61 and the inflator 66. The airbag 61 is designed to push and open a front door section 34 and a rear door section 56 formed on the column cover 16 upon inflation to be deployed in front of knees K (KL and KR) of a driver D seated in a driver's seat, as shown in FIG. 4.

Figure 1:
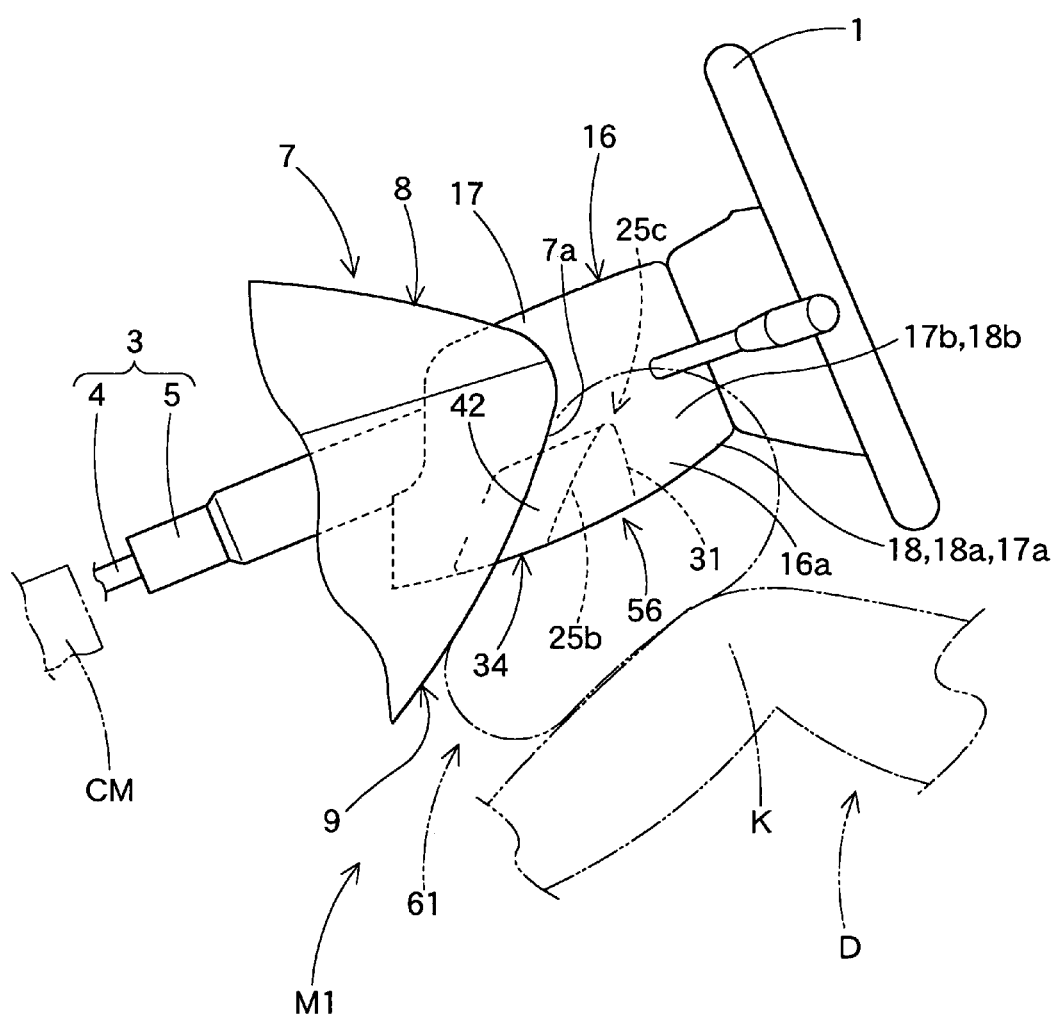
FIG. 1 is a schematic side view of the vicinity of a column cover equipped with a knee-protecting airbag apparatus of the first embodiment of the present invention.
Figure 2:
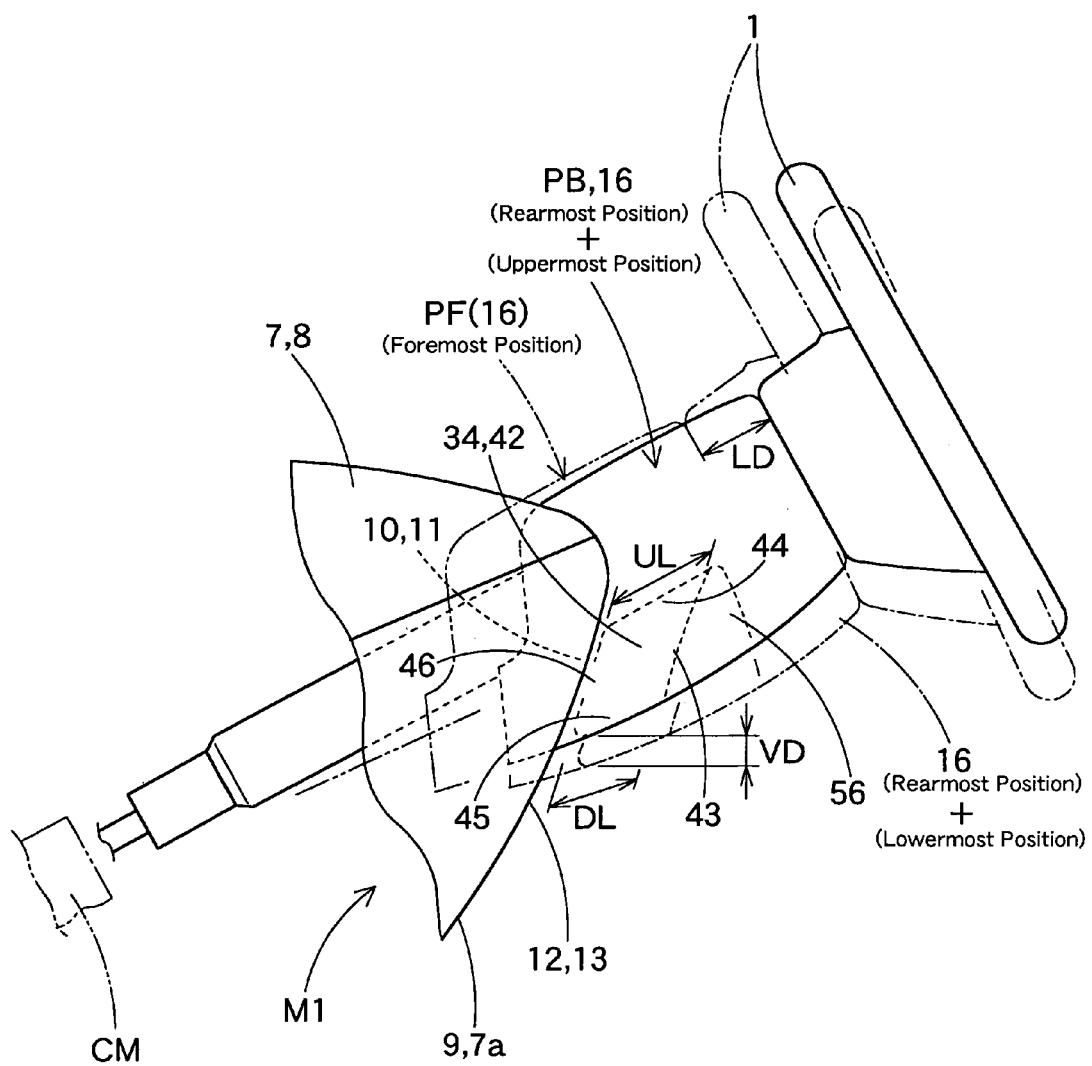
FIG. 2 illustrates by side view a steering wheel disposed at the rearmost position and moved vertically together with the column cover by operation of an adjusting mechanism mounted on a steering column.
Figure 3:
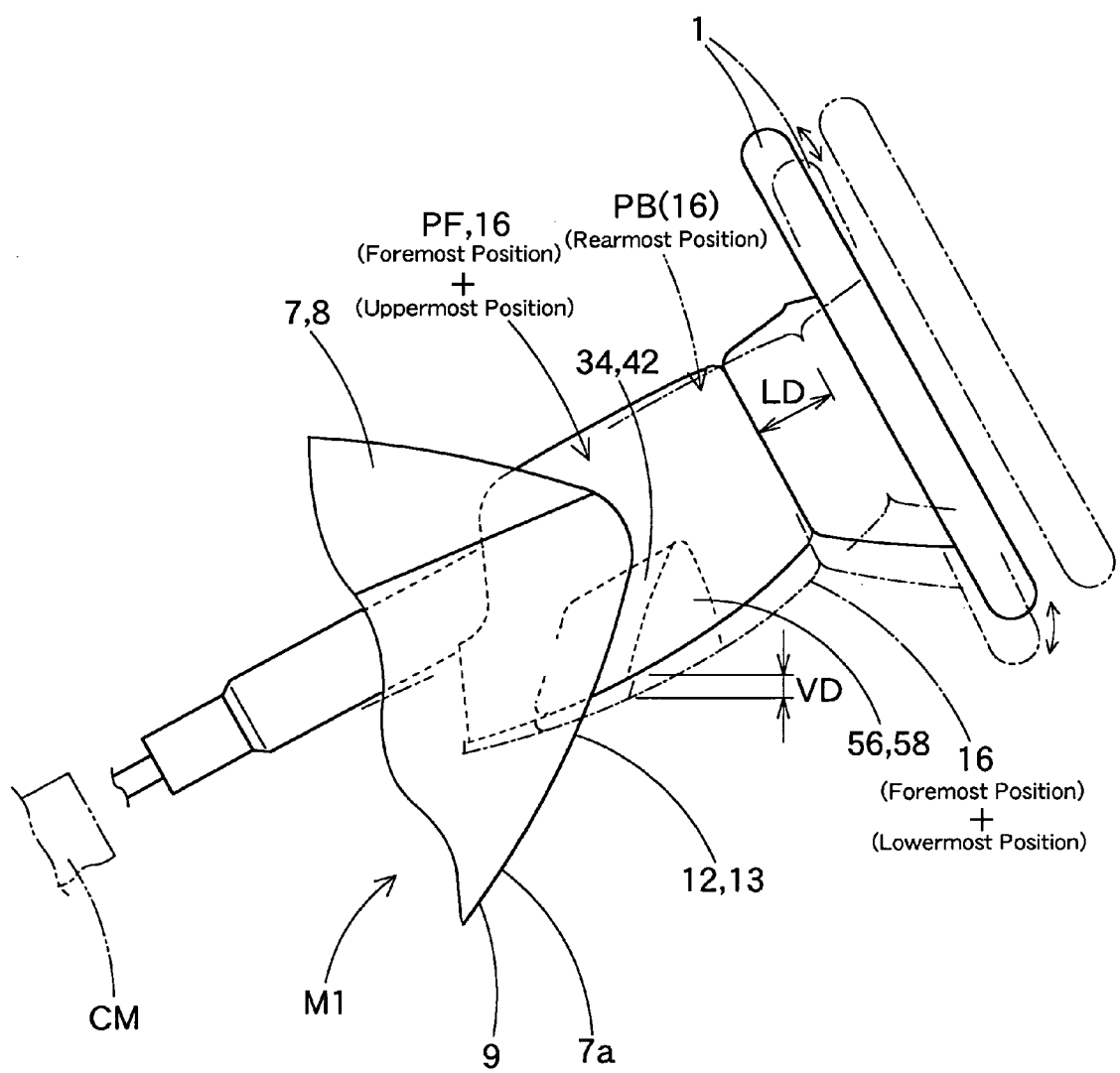
FIG. 3 illustrates by side view the steering wheel disposed at the foremost position and moved vertically together with the column cover by operation of the adjusting mechanism.

As shown in FIGS. 1, 4 and 5, the column cover 16 is formed of synthetic resin into a generally square tubular contour covering the steering column 3. The column cover 16 is attached to a column tube 5 of the steering column 3 at its unillustrated region and is disposed in front of a seated driver D in such a manner as to protrude rearward from an installation opening 10 formed on the instrument panel or dashboard 7 for installing the column cover 16. The dashboard 7 is comprised of an upper panel 8 disposed in upper side and a lower panel 9 disposed in lower side. The steering column 3 is disposed to protrude rearward from the dashboard 7 while being covered by the column cover 16. The steering column 3 includes a main shaft 4 and the column tube 5 mounted around the main shaft 4. A steering wheel 1 is connected to the rear end of the main shaft 4. The steering column 3 is equipped with an adjusting mechanism CM comprised of a telescopic mechanism and tilt mechanism for adjusting the disposition of the steering wheel 1 anteroposteriorly and vertically (FIGS. 1 to 3). The column cover 16 is moved together with the steering column 3 by operation of the adjusting mechanism CM. Further, the dashboard 7 is provided between a periphery of the installation opening 10 and an outer circumference 18 of the column cover 16 on a rear side 7a with an allowance gap H (HL, HV) for allowing the movement of the column cover 16 so the column cover 16 may not engage with the dashboard 7 upon such movement. The allowance gap HL is intended to refer to the gap disposed on lateral sides of the column cover 16 while the allowance gap HV is intended to refer to the gap disposed below the column cover 16. Further, a later-described allowance gap HVM is intended to refer to the maximum value of the gap HV.

In using the adjusting mechanism CM, if the steering wheel 1 is located rearmost by operating the telescopic mechanism and is located uppermost by operation of the tilt mechanism, the steering wheel 1 and the column cover 16 are such that as indicated by solid lines of FIG. 2 and double-dashed lines of FIG. 3. By then operating the tilt mechanism to locate the wheel 1 at the lowermost and rearmost position, the wheel 1 and the column cover 16 are such that as indicated by dot-dashed lines of FIG. 2. By operating the telescopic mechanism to locate the wheel 1 foremost and operating the tilt mechanism to locate the wheel 1 uppermost, the wheel 1 and the column cover 16 are such that as indicated by solid lines of FIG. 3 and double-dashed lines of FIG. 2. If then the wheel 1 is located at the foremost and lowermost position by operating the tilt mechanism, the wheel 1 and the column cover 16 are such that as indicated by dot-dashed lines of FIG. 3.

The travel distance LD in the anteroposterior direction of the column cover 16 by the telescopic mechanism is about 40 mm, and the travel distance VD in the vertical direction by the tilt mechanism is about 20 mm at the vicinity of the rear side 7*a* of the dashboard 7.

As shown in FIGS. 1, 4 (by double-dashed lines), 7 and 10, the airbag 61 is formed into a rectangular plate shape elongative in the lateral direction at full inflation. The airbag 61 includes a driver side wall 62 deployed toward a driver D and a column side wall 63 deployed toward the column cover 16, respectively upon airbag deployment. The driver side wall 62 and column side wall 63 are cut out from woven fabric of polyester, polyamide or the like into the same outer contours, and then sewn up at outer peripheral edges to form the airbag 61. The column side wall 63 is provided at more than one (2, in the first embodiment) positions with mounting holes 64 for receiving bolts 68*b* (FIG. 5) of the inflator 66 housed inside the airbag 61.

As shown in FIG. 4, the airbag 61 has such a contour as to cover the lower side 18*a* of the column cover 16 projecting rearward from the dashboard 7 and rear sides 12, 13 and 14 of areas of the dashboard 7 below, on the left and right sides of the column cover 16 at full deployment to protect knees KL and KR of the driver D.

Other than the above-described method of making the airbag 61, the airbag 61 may be made by doubling up a single cloth member where the driver side wall 62 and the column side wall 63 are connected at a part of the peripheral edge of the walls, and sewing up a remainder of the peripheral edges. The airbag 61 internally includes an unillustrated tether connecting the driver side wall 62 and the column side wall 63 so the thickness of the airbag 61 at full inflation is regulated to keep the airbag 61 in a plate shape.

Figure 6:
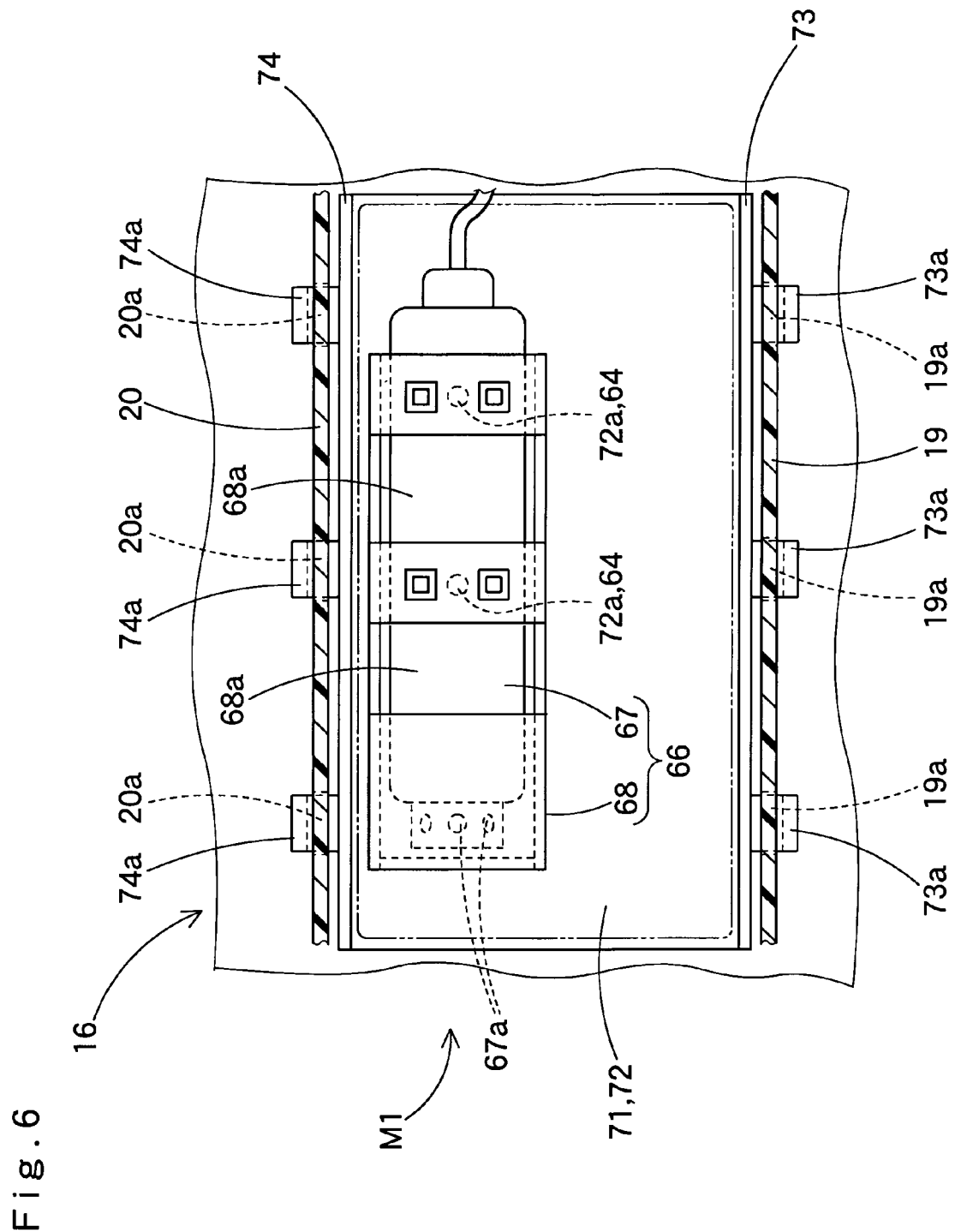
FIG. 6 is a schematic enlarged cross section of the airbag apparatus taken along line VI-VI of FIG. 5.
Figure 7:
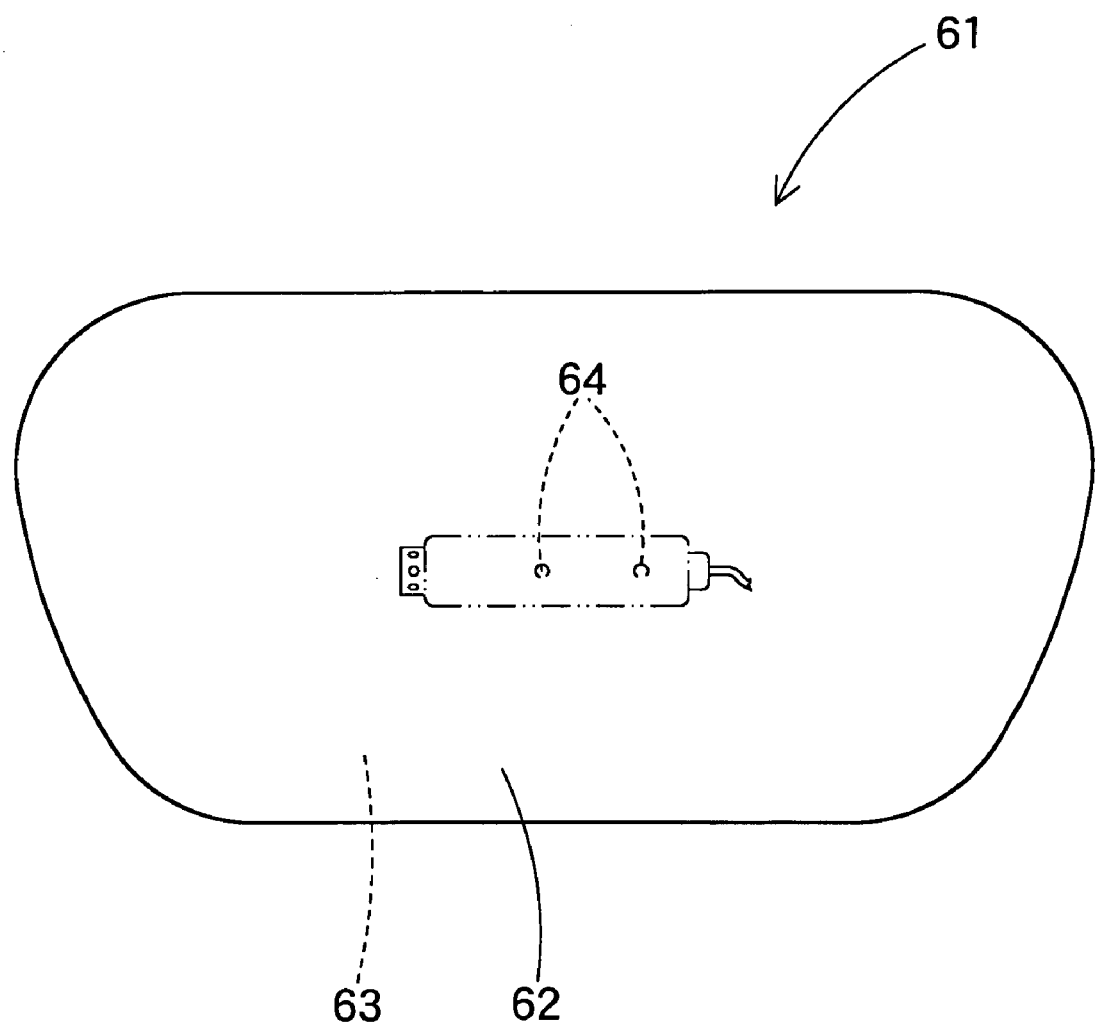
FIG. 7 is a schematic front view of an airbag used for the airbag apparatus of the first embodiment as viewed from the rear.

As shown in FIGS. 5 and 6, the inflator 66 includes a cylindrical body 67 provided with gas discharge ports 67*a* for discharging inflation gas and a generally tubular diffuser 68 for holding the body 67. The diffuser 68 has apertures 68*a* for allowing the inflation gas to flow out therefrom and two bolts 68*b* for attachment of the inflator 66 to the column tube 5 together with the airbag 61 and the case 71. Each of the bolts 68*b* has nut 69 fastened to a bracket 5*a* of the column tube 5.

The case 71 is made of sheet metal and has a reverse-U shaped sectional view. The case 71 includes a ceiling wall 72 and side walls 73 and 74 extending downward from front and rear edges of the ceiling wall 72. Each of the side walls 73 and 74 is provided with retaining legs 73*a*/74*a*. The retaining legs 73*a* and 74*a* are put into slots 19*a* and 20*a* formed on mounting walls 19 and 20 of the column cover 16 so as to be retained by the mounting walls 19 and 20, so that the side walls 73 and 74 are coupled with the mounting walls 19 and 20. The ceiling wall 72 is provided with through holes 72*a* for receiving the bolts 68*b* of the inflator 66.

Figure 8:
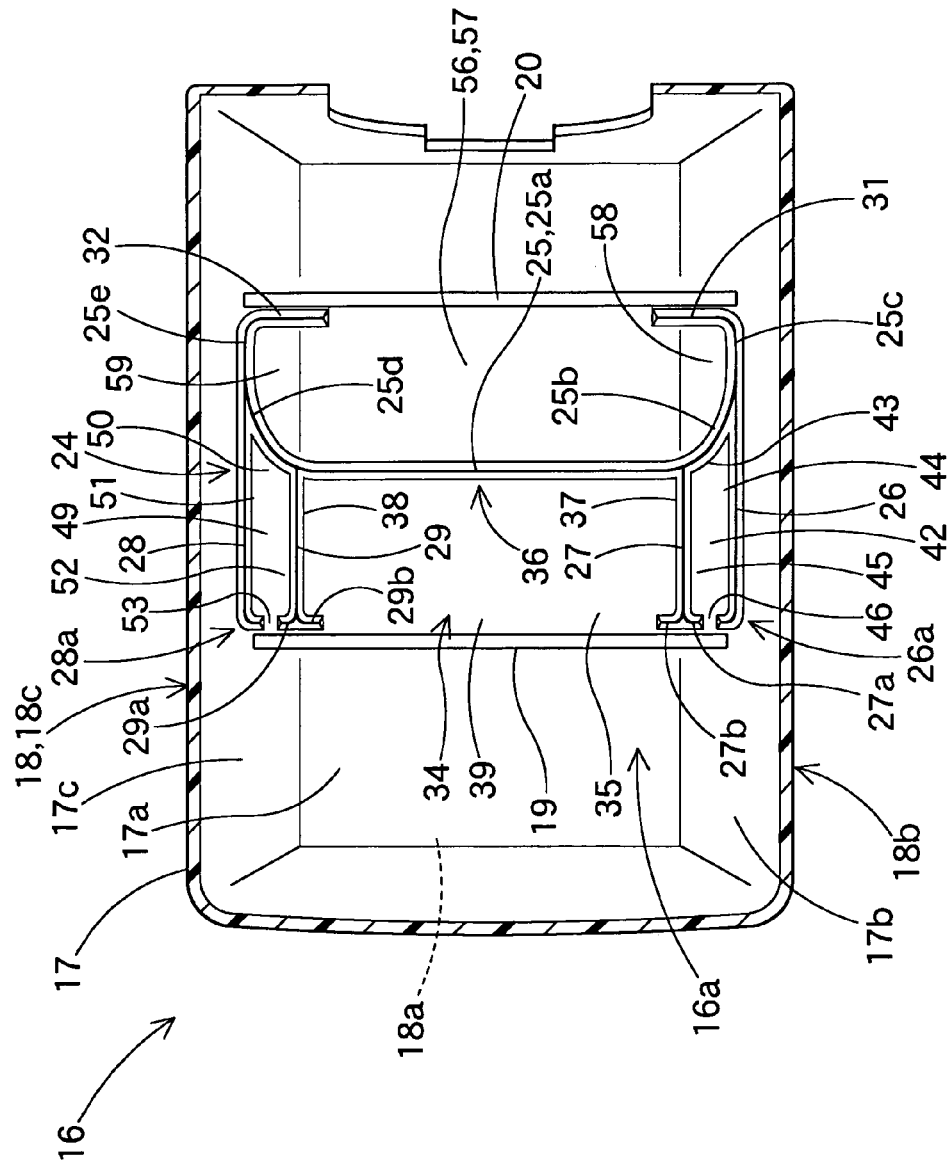
FIG. 8 is a schematic cross sectional view of the column cover of FIG. 1.
Figure 9:
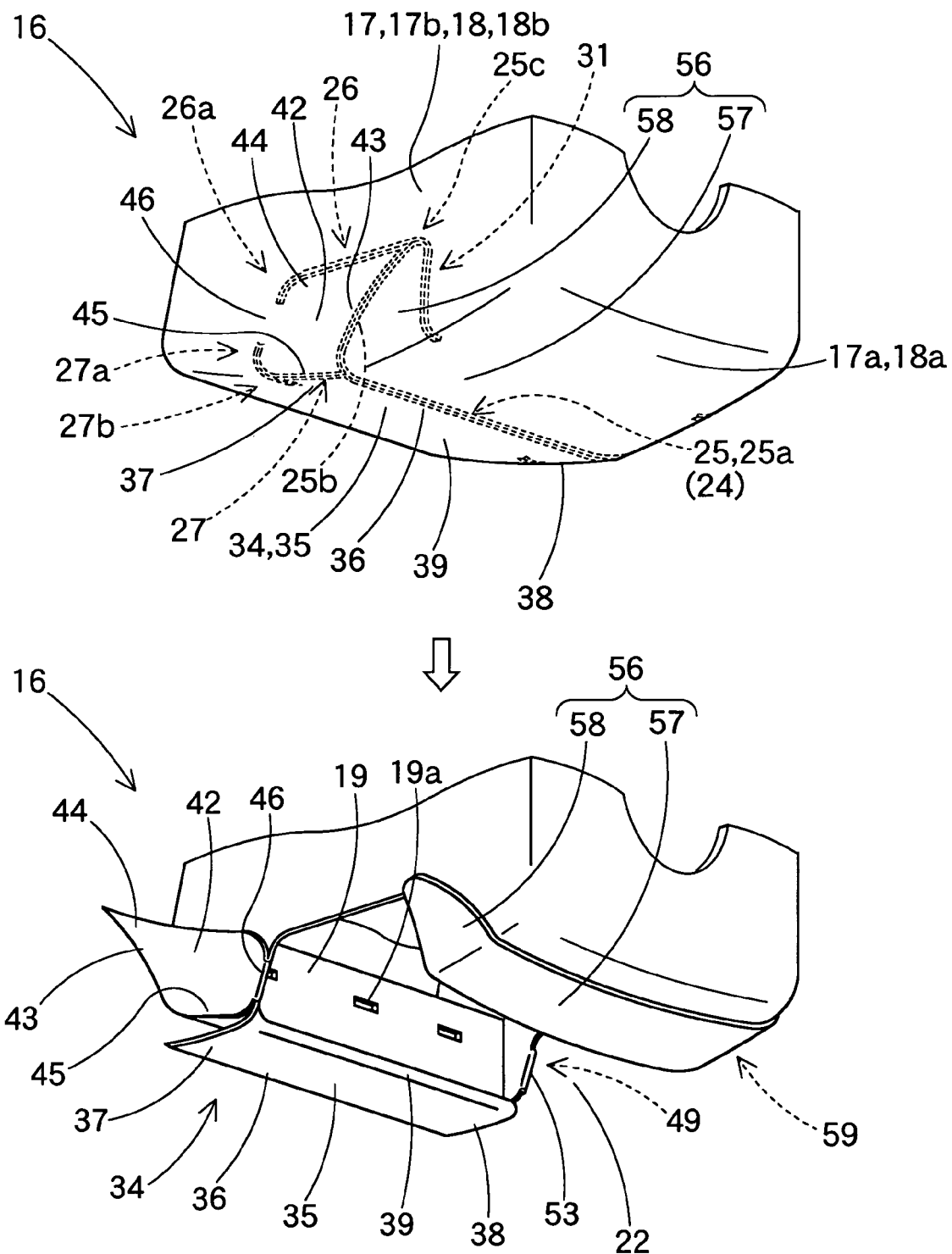
FIG. 9 schematically illustrates the way an airbag emergence opening is formed on the column cover of FIG. 1 by partial perspective view.

As shown in FIGS. 8 and 9, the column cover 16 includes, in an area of its outer surface 18 ranging from a lower side 18*a* to left side 18*b* and right side 18*c*, a front door section 34 and a rear door section 56 adapted to open when pushed by the airbag 61 to cooperatively provide a single airbag emergence opening 22 allowing the airbag 61 to emerge therefrom. The front door section 34 includes a lower door 35 located on the lower side 18*a*, a left door 42 located on the left side 18*b*, and a right door 49 located on the right side 18*c*, respectively of the column cover 16, and around each of these doors is a tearable portion 24 to be torn when pushed by the airbag 61. Each of these doors 35, 42 and 49 are adapted to open from rear edge 36, 43 and 50 forward and away from the column cover 16. The rear door section 56 includes a lower region 57, left region 58 and right region 59 respectively disposed adjacent the lower door 35, left door 42 and right door 49 of the front door section 34 with the tearable portion 24 disposed therebetween.

The tearable portion 24 is formed of a thinned region or linear grooves formed on an inner surface of the generally square tubular circumferential wall 17 of the column cover 16. The tearable portion 24 includes a central region 25, upper left region 26, lower left region 27, upper right region 28, lower right region 29, rear left region 31, and rear right region 32 all of which are in the form of a line. The central region 25 extends transversely in such a manner as to partition the front door section 34 and the rear door section 56, and includes a transverse region 25*a*, left vertical region 25*b* and right vertical region 25*d*. The transverse region 25*a* extends along the lateral direction on the lower wall 17*a* of the column cover 16. The left and right vertical region 25*b* and 25*c* extend upward from left and right ends of the transverse region 25*a* on the left wall 17*b* and right wall 17*c* in such a manner as to extend along the rear sides 12, 13 and 14 of the lower panel 9 of the dashboard 7 in the vicinity of a lower peripheral region 11 of the installation opening 10 (FIGS. 2 to 4). The left end 25*c* and right end 25*e*, which are leading ends of the left and right vertical regions 25*b* and 25*d* are located at sides of the ceiling wall 72 of the case 71. The lower peripheral region 11 of the installation opening 10 is intended to refer to a lower area of the peripheral region of the opening 10, and includes a lower edge 11*a*, left edge 11*b* and a right edge 11*c*.

The upper left region 26 extends forward from the left end 25*c* of the central region 25. The lower left region 27 extends forward from the vicinity of the border of the transverse region 25*a* and left vertical region 25*b* of the central region 25 (or the crossing of the lower wall 17*a* and left wall 17*b* of the circumferential wall 17) generally along a ridge line of the crossing of the lower wall 17*a* and left wall 17*b*. The upper right region 28 extends forward from the right end 25*e* of the central region 25. The lower right region 29 extends forward from the vicinity of the border of the transverse region 25*a* and right vertical region 25*d* of the central region 25 (or the crossing of the lower wall 17*a* and right wall 17*c* of the circumferential wall 17) generally along a ridge line of the crossing of the lower wall 17*a* and right wall 17*c*. The rear left region 31 extends from the left end 25*c* of the central region 25 diagonally rearward and downward to the lower wall 17*a*. The rear right region 32 extends from the right end 25*e* of the central region 25 diagonally rearward and downward to the lower wall 17*a*.

The lower door 35 of the front door section 34 is defined by an area forward of the transverse region 25*a* of the central region 25 and between the lower left region 27 and lower right region 29. The left door 42 is defined by an area forward of the left vertical region 25*b* of the central region 25 and between the upper left region 26 and lower left region 27. The right door 49 is defined by an area forward of the right vertical region 25*d* of the central region 25 and between the upper right region 28 and lower right region 29. Each of the upper left region 26 and upper right region 28 is provided at the front end with a bent region 26*a*/28*a* bent downward. Each of the lower left region 27 and lower right region 29 is provided at the front end with bent portions 27*a* and 27*b*/29*a* and 29*b* which extend from respective front end in a bifurcate manner along the circumferential direction of the circumferential wall 17. These bent portions 26*a*, 28*a*, 27*a*, 27*b*, 29*a* and 29*b* help shorten the lengths of front edges 39, 46, 53 of the respective doors 35, 42 and 49, i.e., regions between the bent portions 27b and 29b, between the bent portions 26a and 27a, and between the bent portions 28a and 29a, which front edges are thick-walled and serve as hinges about which the respective doors 35, 42 and 49 open. This structure assists the lower door 35, left door 42 and right door 49 with opening around the front edges 39, 46 and 53 while tearing the whole central region 25, upper left region 26, lower left region 27, upper right region 28 and lower right region 29 of the tearable portion 24.

The rear door section 56 is defined by an area rearward of the central region 25 and surrounded by the rear left region 31 and rear right region 32. In the first embodiment, the rear door section 56 is a single entity in which the lower region 57, the left region 58 and right region 59 are all continued.

The respective doors 35, 42 and 49 of the front door section 34 and respective regions 57, 58 and 59 of the rear door section 56 are designed to secure flexibility. In the first embodiment, the respective doors 35, 42 and 49 and respective regions 57, 58 and 59 each has such a thin configuration at an entire area as to secure flexibility although they are thicker than the tearable portion 24.

The lower door 35, left door 42 and right door 49 of the front door section 34 are designed to prevent the airbag 61 in the process of deployment from entering into the allowance gaps HL or HV formed between the outer surface 18 of the column cover 16 and lower peripheral region 11 of the installation opening 10 on the lower panel 9 when the column cover 16 is moved by the operation of the adjusting mechanism CM. Specifically, the lower door 35, left door 42 and right door 49 are designed to locate their rear edges 36, 43 and 50 onto the lower peripheral region 11 of the rear sides 12, 13 and 14 of the lower panel 9 of the dashboard 7 upon opening so as to block the allowance gaps HL and HV from the rear (FIGS. 10, 11, and 13-16).

Figure 15:
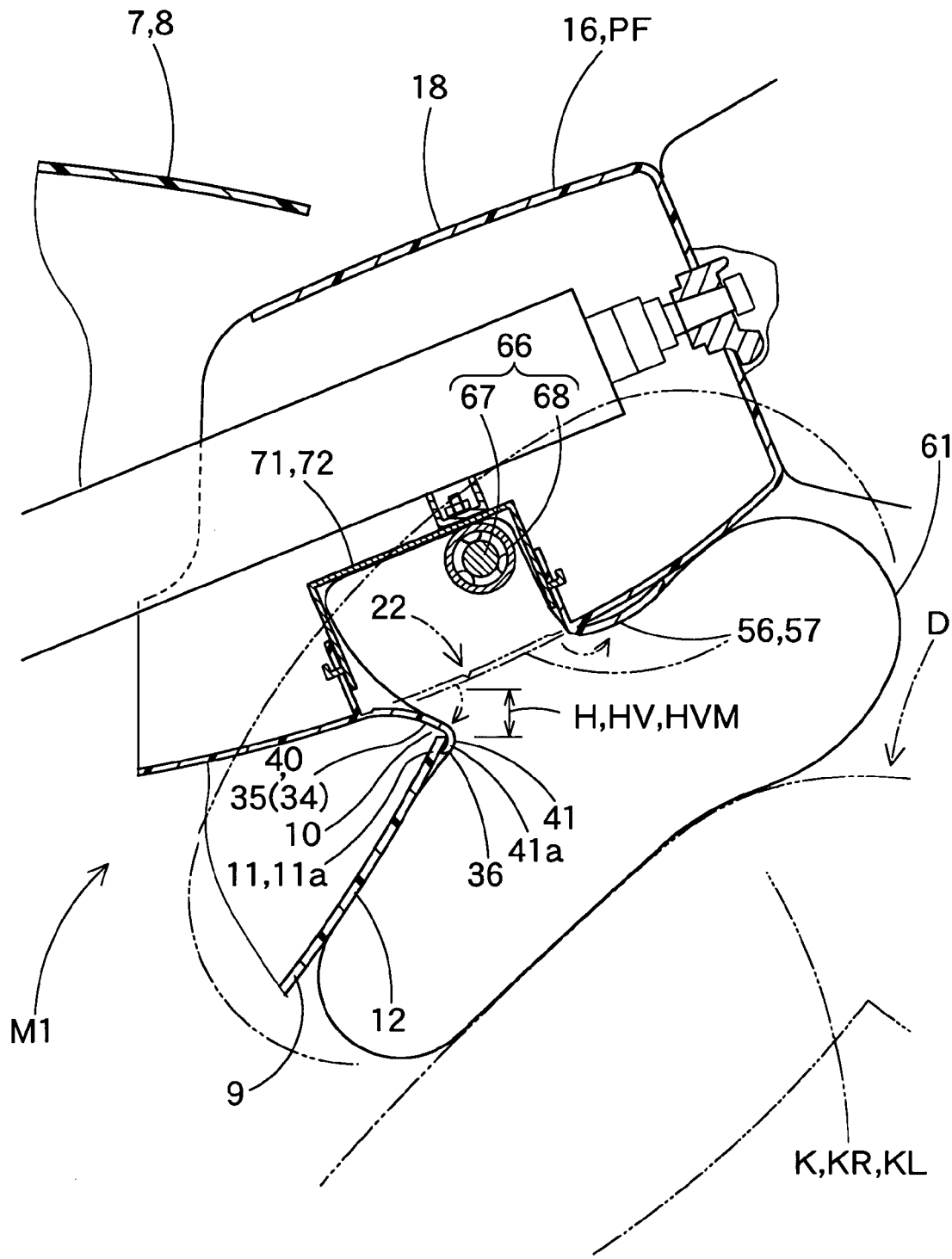
FIG. 15 is a schematic vertical section of the airbag apparatus of FIG. 5 in operation when the column cover is disposed at the foremost and uppermost position.
Figure 16:
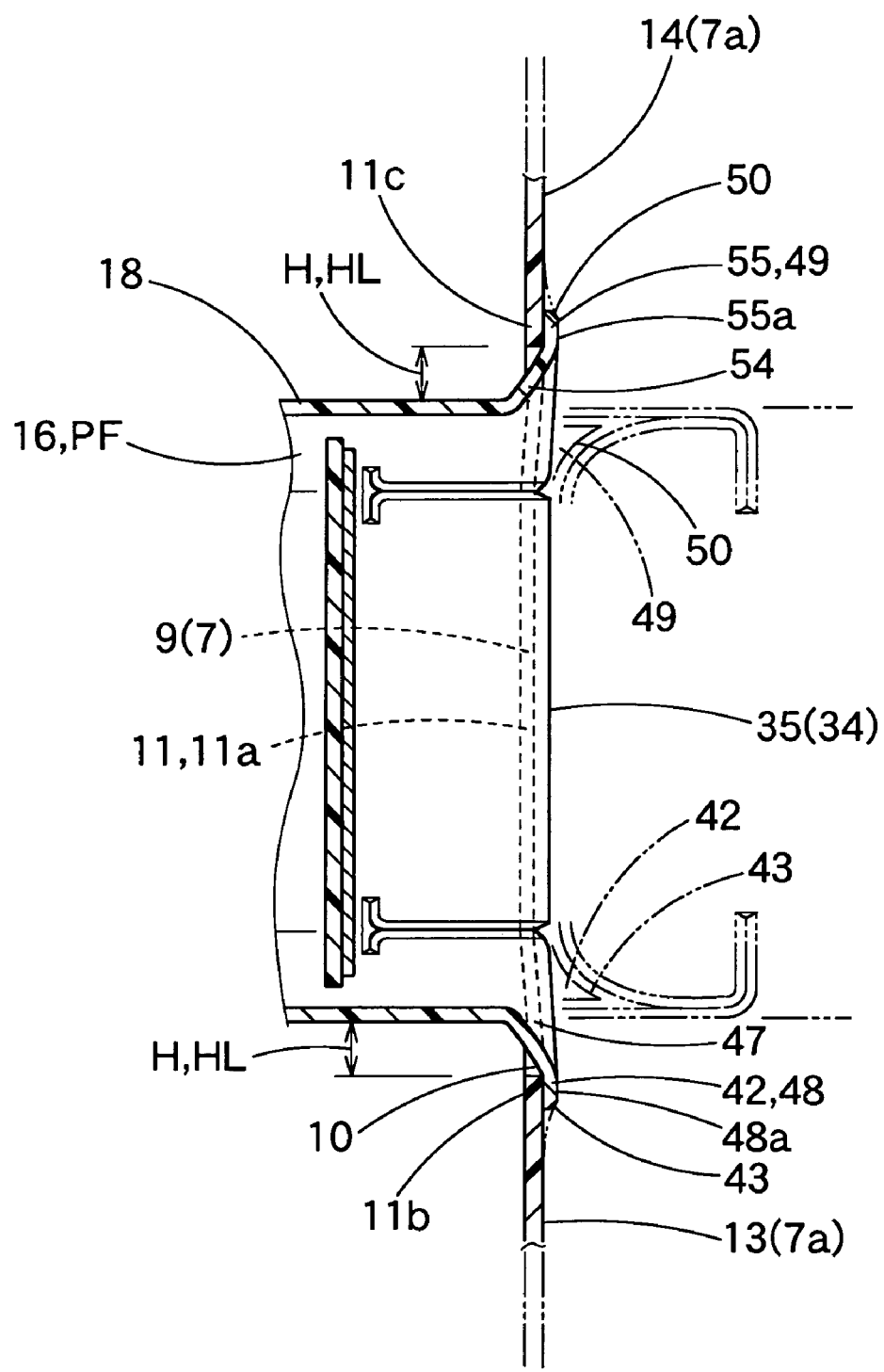
FIG. 16 is a schematic cross section of the column cover upon operation of the airbag apparatus particularly showing the way the respective doors of the door section open when the column cover is disposed at the foremost and uppermost position.

More specifically, the disposition of the rear edges 36, 43 and 50 of the respective doors 35, 42 and 49 are designed such that flexed-open regions 40, 47 and 54 of the doors 35, 42 and 49 contact the lower peripheral region 11 of the installation opening 10 when the allowance gaps HL and HV (HVM) between the outer surface 18 of the column cover 16 and the lower peripheral region 11 are maximized under the condition shown in FIGS. 15 and 16 where the column cover 16 is moved to the foremost position PF by operation of the adjusting mechanism CM, in other words where the column cover 16 is moved to the foremost and uppermost position by using the telescopic mechanism and tilt mechanism. The flexed-open regions 40, 47 and 54 are intended to refer to regions of the respective doors 35, 42 and 49 positioned rearward relative to the rear sides 12, 13, 14 of the lower panel 9 and flexed and opened in such a manner as to protrude from the outer surface 18 of the column cover 16.

Figure 13:
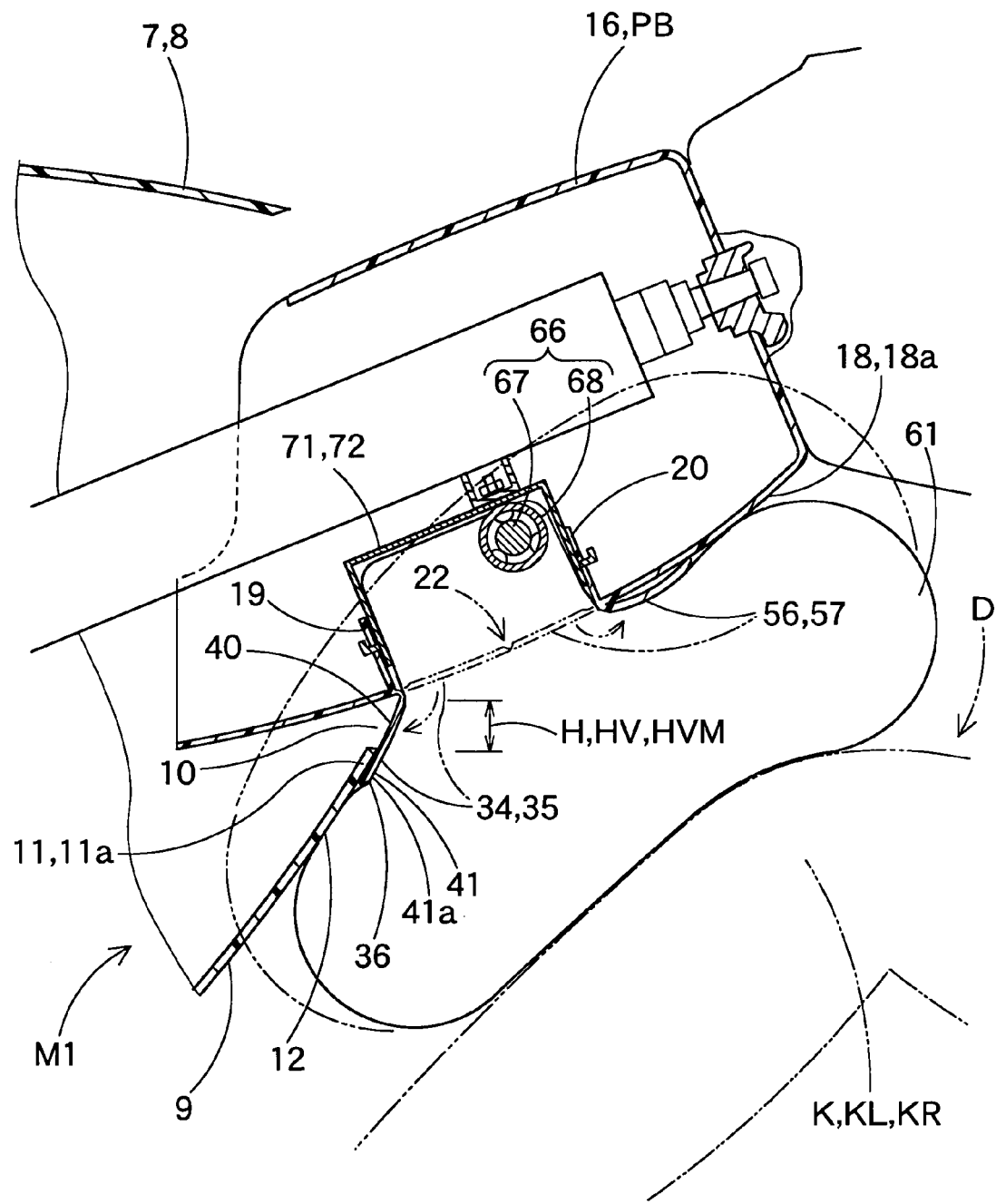
FIG. 13 is a schematic vertical section of the airbag apparatus of FIG. 5 in operation when the column cover is disposed at the rearmost and uppermost position.
Figure 14:
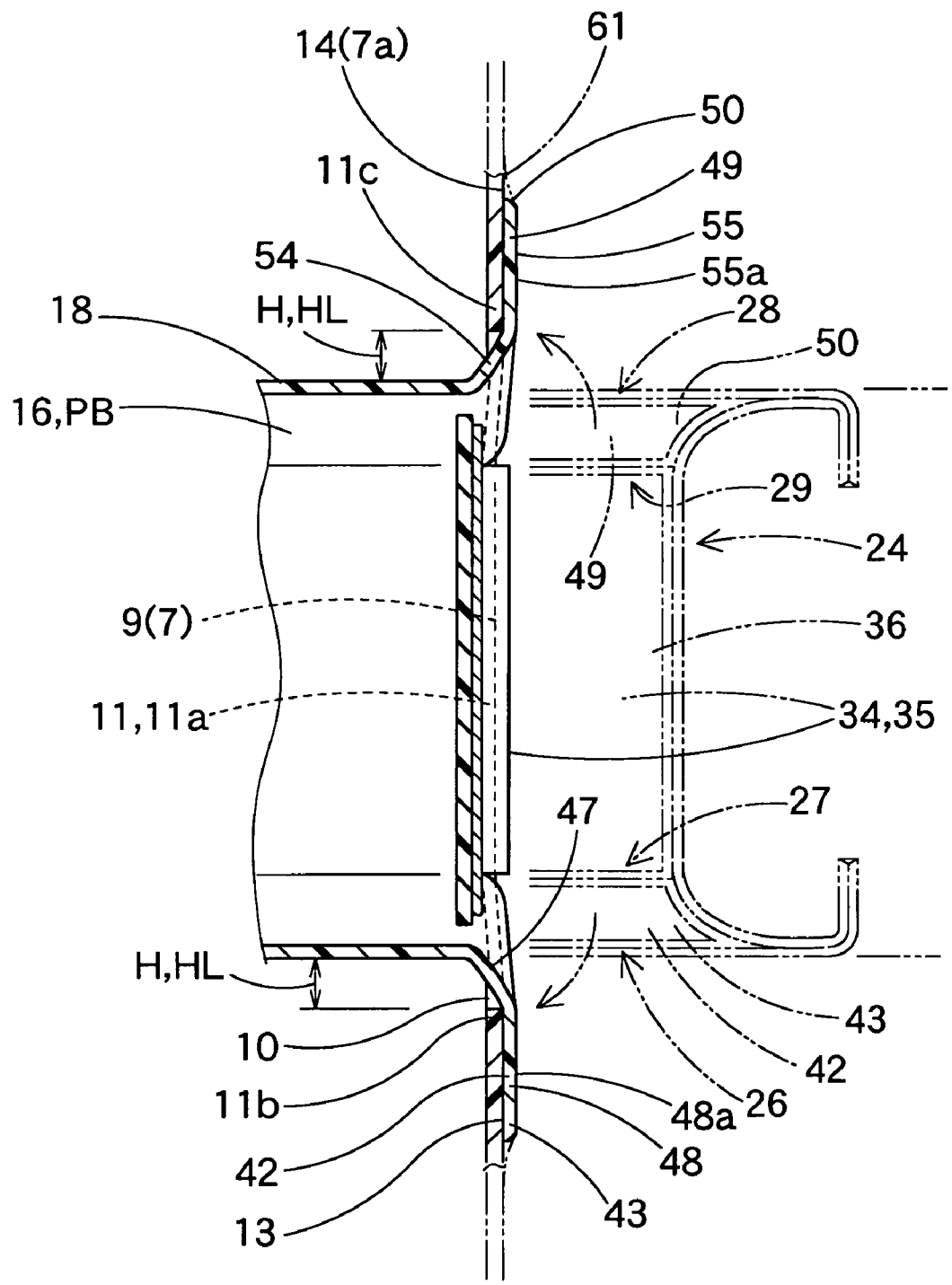
FIG. 14 is a schematic cross section of the column cover upon operation of the airbag apparatus particularly showing the way the respective doors of the door section open when the column cover is disposed at the rearmost and uppermost position.

Moreover, the length UL of the doors 42 and 49 and the length DL of the door 35 (FIG. 2) are designed such that the flexed-open regions 40, 47 and 54 of the doors 35, 42 and 49 contact the lower peripheral region 11 of the installation opening 10 when the allowance gaps HL and HV (HVM) are maximized under the condition shown in FIGS. 13 and 14 where the column cover 16 is moved to the rearmost position PB by operation of the adjusting mechanism CM, in other words where the column cover 16 is moved to the rearmost and uppermost position by using the telescopic mechanism and tilt mechanism. The lengths UL and DL are intended to refer to the lengths at both lateral sides of the respective doors 35, 42 and 49 from the rear ends 36, 43 and 50 to the front ends or bent portions 26a, 27a, 27b, 28a, 29a and 29b of the tearable portion 24 (upper left region 26, lower left region 27, upper right region 28 and lower right region 29) as seen from a side. As explained above, the flexed-open regions 40, 47 and 54 refer to the regions of the doors 35, 42 and 49 positioned rearward relative to the rear sides 12, 13, 14 of the lower panel 9 and flexed and opened in such a manner as to protrude from the outer surface 18 of the column cover 16.

In the first embodiment, furthermore, as viewed from a side of a vehicle, the front ends of the respective regions of the tearable portion 24, i.e., the position of the bent portions 26a, 27a, 27b, 28a, 29a and 29b or the front edges 39, 46 and 53 of the lower, left and right doors 35, 42 and 49 are located proximate the lower peripheral region 11 of the installation opening 10 at the rearmost position PB of the column cover (FIG. 2).

Figure 11:
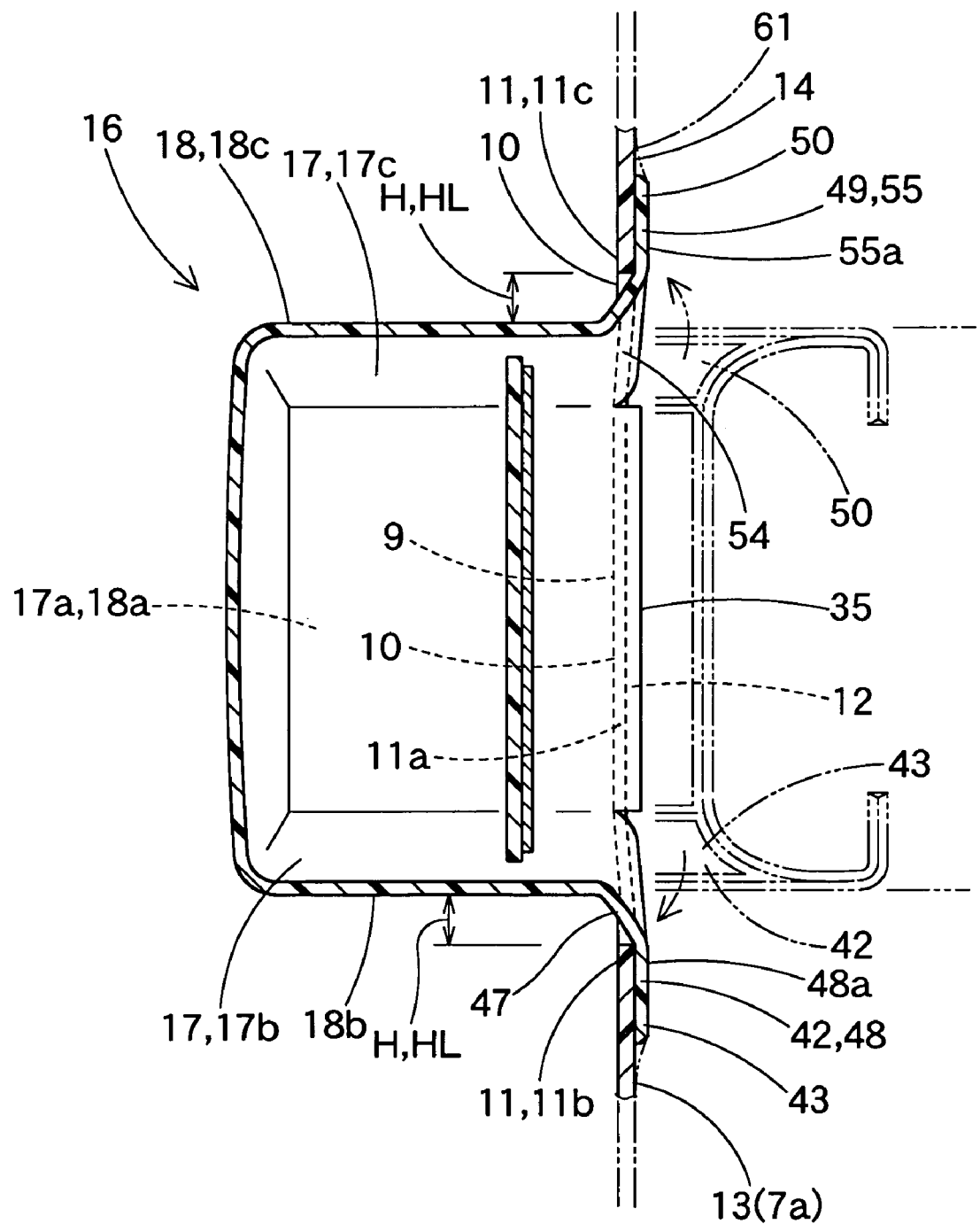
FIG. 11 is a schematic cross section of the column cover upon operation of the airbag apparatus, particularly showing the way respective doors of a door section open.
Figure 12:
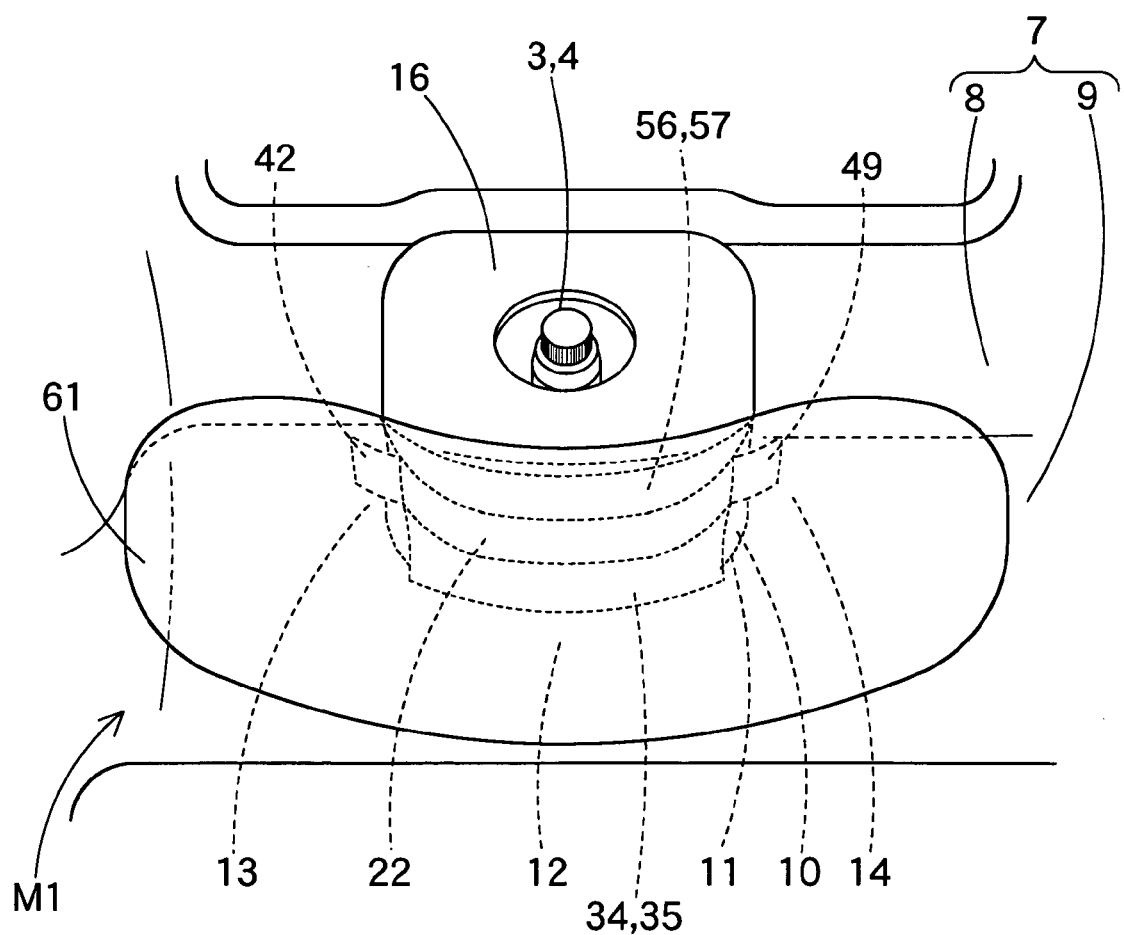
FIG. 12 is a schematic front view of the airbag apparatus of FIG. 5 in operation as viewed from the rear.

Moving the steering wheel 1 vertically by operating the tilt mechanism does not considerably vary the size of the allowance gap HL on the left and right sides of the column cover 16, i.e., the gap between the left and right sides 18b and 18c of the column cover 16 and the left and right areas 11b and 11c of the lower peripheral region 11 of the lower panel 9 so long as the anteroposterior position of the column cover 16 is not changed (FIGS. 11, 14 and 16). In the first embodiment, the allowance gap HL on the left and right stay in the range of 5 mm to 10 mm. In contrast, the vertical movement of the steering wheel 1 considerably varies the size of the allowance gap HV in the vertical direction, i.e., the gap between the lower side 18a of the column cover 16 and the lower edge 11a of the installation opening 10 on the lower panel 9. Specifically, when the steering wheel 1 is moved to the uppermost position, the allowance gap HV is maximized (gap HVM). In the first embodiment, the gap HV in the vertical direction varies within a range of 5 mm to 25 mm. When the column cover 16 is moved back and forth, the gap HV is maximized (gap HVM) at any position when the steering wheel 1 is disposed at the uppermost position.

Taking the above circumstances into account, with respect to the structure required to block the allowance gap HL on the left and right sides, it would be sufficient to consider the instance where the column cover 16 is disposed at the foremost position PF where the anteroposterior lengths of the flexed-open regions 47 and 54 are hard to secure (the left and right doors 42 and 49 are hard to flex) because the left door 42 and the right door 49 of the front door section 34 get inside the lower panel 9. If the column cover 16 is disposed rearward relative to the foremost position PF, longer anteroposterior lengths of the flexed-open regions 47 and 54 are secured (the left and right doors 42 and 49 are allowed to flex easily) so that the rear edges 43 and 50 of the left and right doors 42 and 49 securely abut against the rear sides 13 and 14 of the left and right areas 11b and 11c of the lower peripheral region 11 of the installation opening 10 on the lower panel 9, thereby covering the allowance gap HL (FIGS. 11, 14 and 16).

Figure 10:
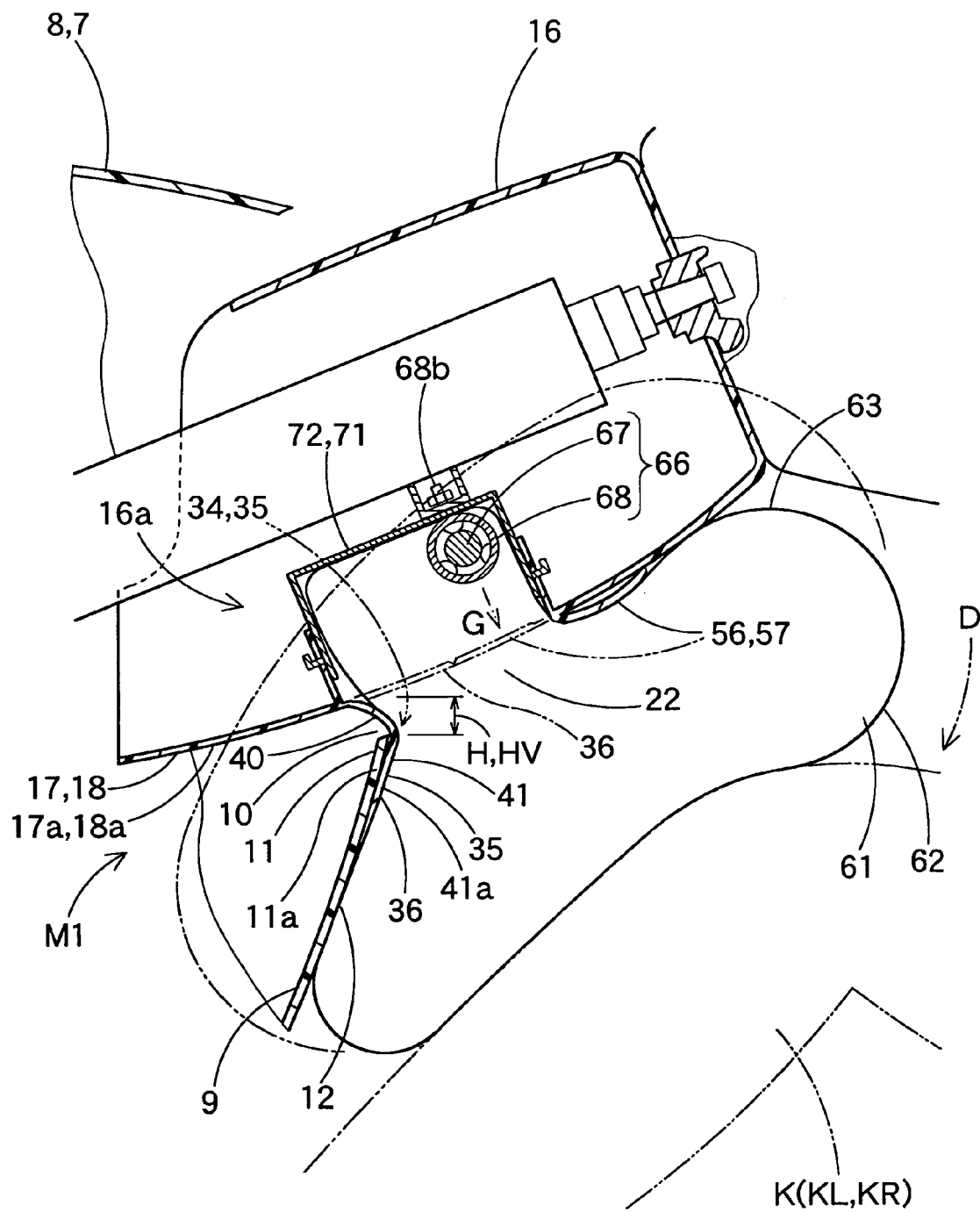
FIG. 10 is a schematic vertical section of the knee-protecting airbag apparatus of FIG. 5 in operation.

With respect to the structure required to block the allowance gap HV in the vertical direction, it would be sufficient if the lower door 35 is capable of blocking the allowance gap HV (HVM) in the instance where the column cover 16 is disposed at the foremost position PF at which the anteroposterior length of the flexed-open region 40 is hard to secure (the lower door 35 is hard to flex) because the lower door 35 gets into the lower panel 9 and where the gap HV is maximized and thereby making it hard for the rear edge 36 of the lower door 35 to reach the lower area 11a of the lower peripheral region 11 of the installation opening 10 on the lower panel 9. If the column cover 16 is disposed rearward relative to the foremost position PF, longer anteroposterior length of the flexed-open region 40 of the lower door 35 is secured so that the rear edge 36 of the lower door 35 securely abuts against the rear side 12 of lower area 11a of the lower peripheral region 11 of the installation opening 10 on the lower panel 9, thereby covering the allowance gap HVM (FIGS. 10, 13 and 15).

With above structure of the first embodiment of the knee-protecting airbag apparatus, if the airbag 61 inflates with inflation gas G, the lower door 35, left door 42 and right door 49 of the front door section 34 are pushed by the airbag 61 so that the tearable portion 24 disposed around the respective doors of the front door section 34 are broken. Then the rear edges 36, 43 and 50 of the respective doors open forward and away from the column cover 16, while the rear door section 56 opens rearward thereby providing the airbag emergence opening 22 on the column cover 16. The airbag 61 then emerges from the opening 22 and deploys to cover the lower side 18a of the column cover 16 projected from the dashboard 7 and the rear sides 12, 13 and 14 of the dashboard 7 on the lower, left and right sides of the column cover 16 so that the knees KL and KR of the driver D moving forward are protected from these members (FIGS. 10, 11, 13 to 16).

At this time, the rear edges 36, 43 and 50 of the lower door 35, left door 42 and right door 49 of the front door section 34 abut against the rear sides 12, 13 and 14 of the dashboard 7 or the lower peripheral region 11 of the installation opening 10 so that the allowance gap H (HL, HV) is blocked.

Consequently, the airbag 61 is allowed to deploy in front of the knees KL and KR of the driver D smoothly without entering into the gaps HL or HV between the outer surface 18 of the column cover 16 subjected to the operation of the adjusting mechanism CM and the lower peripheral region 11 of the installation opening 10 of the lower panel 9.

That is, the airbag 61 of the airbag apparatus M1 housed inside the column cover 16 deploys smoothly without entering into the allowance gap H (HL, HV) even if the column cover 16 is subjected to position adjustment. Therefore, the airbag 61 protects the knees KL and KR of the driver D moving forward from at least the lower side 18a of the column cover 16 and the rear sides 12, 13 and 14 of the dashboard 7 on the lower, left and right sides of the column cover 16.

Moreover, since the lower door 35, left door 42 and right door 49 of the door section 34 all have flexibility, areas of the rear edges 36, 43 and 50 disposed rearward relative to the rear sides 12, 13 and 14 of the lower panel 9 open in such a flexed or bent manner as to protrude from the outer surface 18 of the column cover 16, and the flexed-open regions 40, 47 and 54 abut on the lower peripheral region 11 of the installation opening 10. At this time, dispositions of the rear edges 36, 43 and 50 of the respective doors are predetermined such that the flexed-open regions 40, 47 and 54 of the respective doors contact with the lower peripheral region 11 (the lower, left and right peripheral edges 11a, 11b and 11c) of the installation opening 10 on the lower panel 9 when the column cover 16 is moved to the foremost position PF by the adjusting mechanism and the allowance gaps HL and HV are maximized (FIGS. 15 and 16). Further, the lengths UL and DL of the respective doors 35, 42 and 49 from rear ends 36, 43 and 50 to front ends (bent portions of the tearable portion 24) 26a, 27a, 27b, 28a, 29a and 29b at both lateral edges of the doors are predetermined such that the flexed-open regions 40, 47 and 54 of the respective doors contact with the lower peripheral region 11 (the lower, left and right peripheral edges 11a, 11b and 11c) of the installation opening 10 on the lower panel 9 when the column cover 16 is moved to the rearmost position PB by the adjusting mechanism and the allowance gaps HL and HV are maximized (FIGS. 13 and 14). That is, even when the allowance gaps HL and HV are maximized during the back and forth motion of the column cover 16, part of or whole upper left region 26, lower left region 27, upper right region 28 and lower right region 29 of the tearable portion 24 disposed at both lateral sides of the respective doors 35, 42 and 49 are broken when the respective doors open from the rear edges 36, 43 and 50 so that the flexed-open regions 40, 47 and 54 are flexed and opened to abut against the lower peripheral region 11 of the installation opening 10, thereby closing the allowance gaps HL and HV smoothly.

If the lower door 35, left door 42 and right door 49 of the door section 34 have flexibility, these doors smoothly block the allowance gaps HL and HV smoothly even in the event that the column cover 16 is adjusted forward, rearward, upward or downward, by predetermining two parameters; the dispositions of the rear edges 36, 43 and 50 of the respective doors 35, 42 and 49 of the door section 34 and the lengths UL and DL of the upper left region 26, lower left region 27, upper right region 28 and lower right region 29 of the tearable portion 24 disposed at both lateral sides of the respective doors 35, 42 and 49.

Especially, when the lengths UL and DL are set so long that the flexed-open regions 40, 47 and 54 of the respective doors of the door section 34 abut against the rear sides 12, 13 and 14 of the lower panel 9 at the lower peripheral region 11 of the installation opening 10 in a clinging manner over a certain range as shown in FIGS. 10, 11, 13 to 16, the fully inflated airbag 61 is allowed to deploy along and in proximity to the rear sides 12, 13 and 14 beyond rear sides 41a, 48a and 55a of the regions 41, 48 and 55 of the flexed-open regions 40, 47 and 54 clung to the lower panel 9 (which regions will be called clung regions 41, 48 and 55). This arrangement helps the airbag 61 to secure adequate reaction force from the rear sides 12, 13 and 14 of the lower panel 9 upon receiving the knees KL and KR of the driver D, so that the knees KL and KR are protected with adequate cushioning property.

At this time, the front ends (bent portions of the tearable portion 24) 26a, 27a, 27b, 28a, 29a and 29b of the respective doors 35, 42 and 49 of the door section 34 are desirably located proximate the lower peripheral region 11 of the installation opening 10 on the dashboard 7 as viewed from a side of vehicle when the column cover 16 is disposed at the rearmost position PB. This structure allows the respective doors 35, 42 and 49 of the door section 34 to secure sufficient anteroposterior lengths, and allows the respective doors 35, 42 and 49 to abut on the lower peripheral region 11 of the installation opening 10 in such a manner as to produce the clung regions 41, 48 and 55 attached to the rear sides 12, 13 and 14 of the lower panel 9 over a certain range as shown in FIGS. 13 and 14 even if the column cover 16 is disposed at the rearmost position PB. As a result, the airbag 61, upon deployment, deploys along the rear sides 12, 13 and 14 of the lower panel 9 of the dashboard 7 and secures the reaction force from the lower panel 9 easily at whatever position between the foremost position PF and the rearmost position PB the column cover 16 is disposed.

Of course, the respective doors 35, 42 and 49 of the door section 34 are bent at an area proximate the peripheral region of the installation opening 10 on the lower panel 9 and abut on the lower peripheral region 11 of the opening 10 in such a manner as to produce the clung regions 41, 48 and 55 attached to the rear sides 12, 13 and 14 of the lower panel 9 over a certain range even if the column cover 16 is disposed at the foremost position PF (FIGS. 15 and 16) or at any positions between the foremost position PF and the rearmost position PB (FIGS. 10 and 11) since the respective doors 35, 42 and 49 have flexibility. Therefore, the airbag 61 upon deployment deploys along and in proximity to the rear sides 12, 13 and 14 of the lower panel 9 and secures an adequate reaction force from the lower panel 9.

Figure 17:
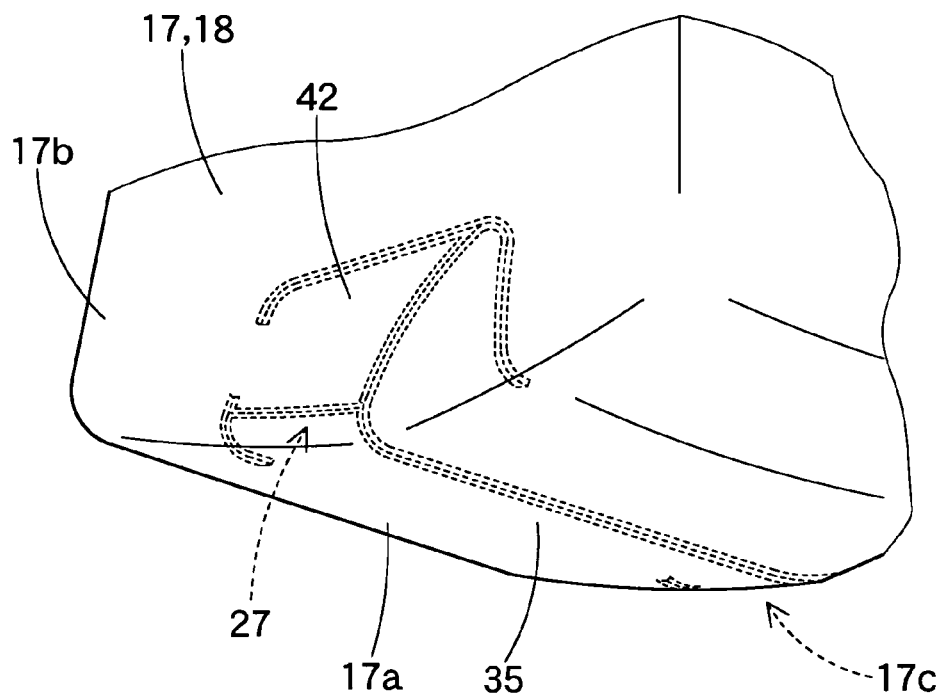
FIG. 17 is a partial perspective view of a modification of the column cover which can be used in the first embodiment.
Figure 18:
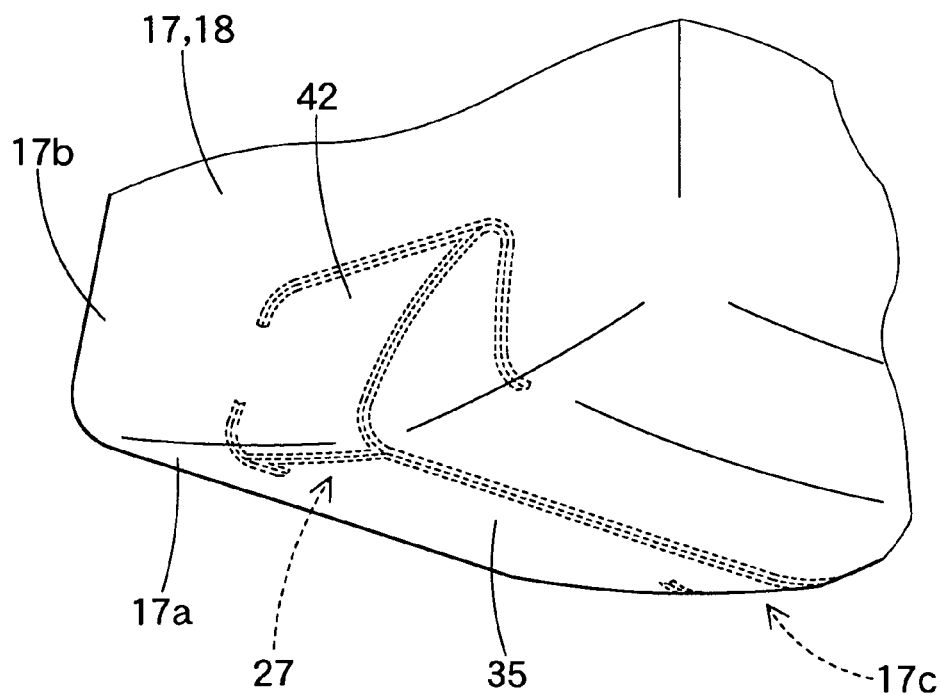
FIG. 18 is a partial perspective view of another modification of the column cover which can be used in the first embodiment.
Figure 19:
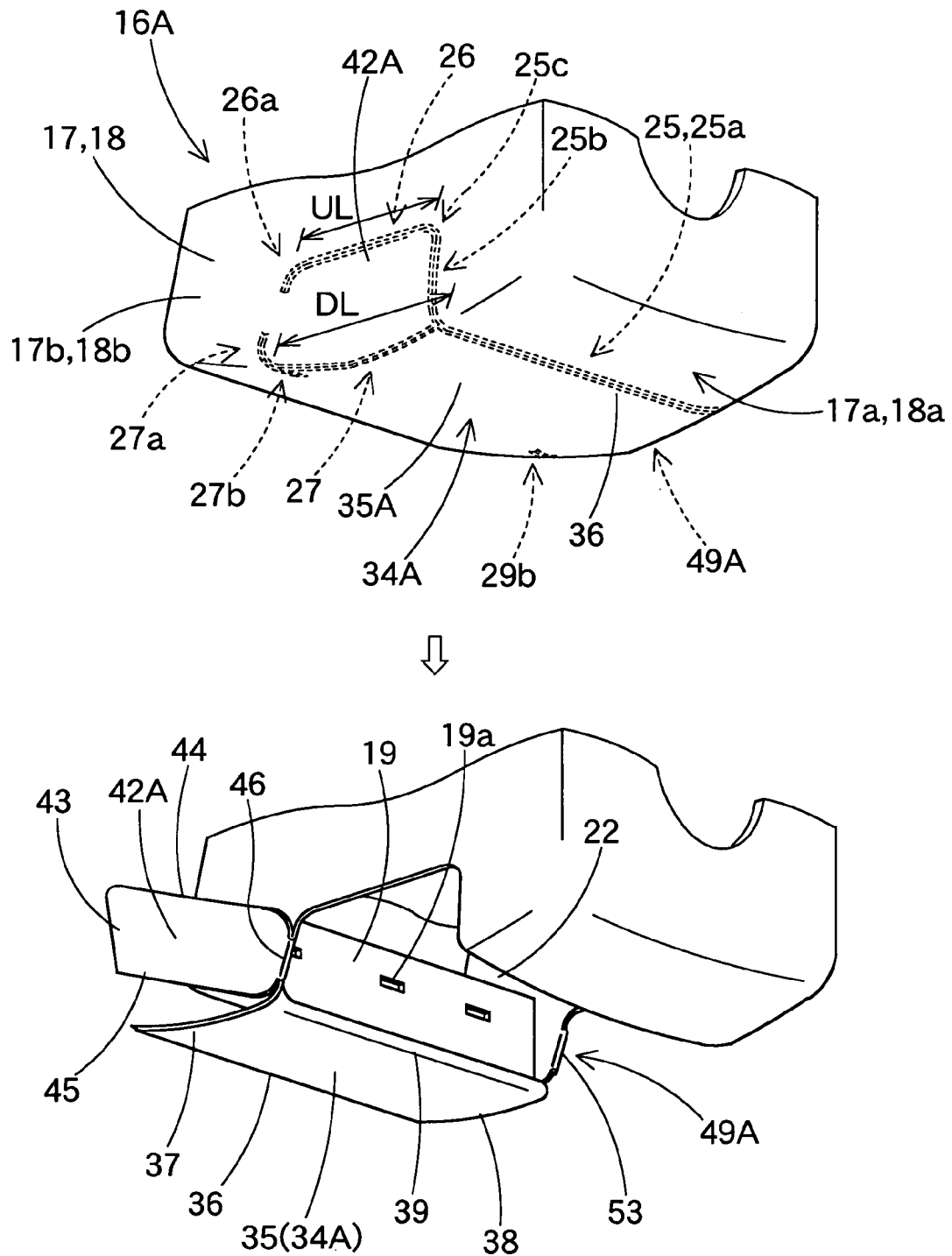
FIG. 19 schematically illustrates the way an airbag emergence opening is formed on a column cover of the second embodiment by partial perspective view.

In this specific embodiment, the border between the left door 42 and the lower door 35 and that between the right door 49 and lower door 35 of the front door section 34, i.e., the lower left region 27 and lower right region 29 of the tearable portion 24 are disposed generally along the ridge line of the crossing of the lower wall 17a and left wall 17b and ridge line of the crossing of the lower wall 17a and right wall 17c of the column cover 16. However, the lower left region 27 and lower right region 29 of the tearable portion 24 may be disposed on the left wall 17b and right wall 17c, respectively, as shown in FIG. 17, or on the lower wall 17a as shown in FIG. 18.

In the first embodiment, in addition to the front door section 34, the column cover 16 is provided with the rear door section 56 disposed to adjoin the lower door 35, left door 42 and right door 49 of the front door section 34 from the rear so that the airbag emergence opening 22 is formed by opening of both of the front door section 34 and the rear door section 56. With this structure, the rear door section 56 serves to widen the opening area of the airbag emergence opening 22 while the front door section 34 serves to cover the allowance gaps H (HL and HV), so that the airbag 61 smoothly emerges from the column cover 16 for deployment without getting into the installation opening 10 on the dashboard 7 or being caught by a peripheral area of the airbag emergence opening 22.

Although the rear door section 56 of this specific embodiment is formed as a single entity, it may be formed of split parts formed by extending the lower left region 27 and lower right region 29 of the tearable portion 24 rearward and eliminating the rear left region 31 and rear right region 32 so that the lower region 57, the left region 58 and right region 59 open rearward separately. Further, the rear door section 56 may be formed of two parts opening toward the left and right.

It will also be appreciated to provide only a front door section 34A so as to form an airbag emergence opening 22 as in a column cover 16A of a knee-protecting airbag apparatus M2 of the second embodiment shown in FIGS. 19 to 23. In the door section 34A, a lower door 35A, left door 42A and right door 49A are configured to extend rearward to the area of the rear door section 56 of the first embodiment.

Figure 22:
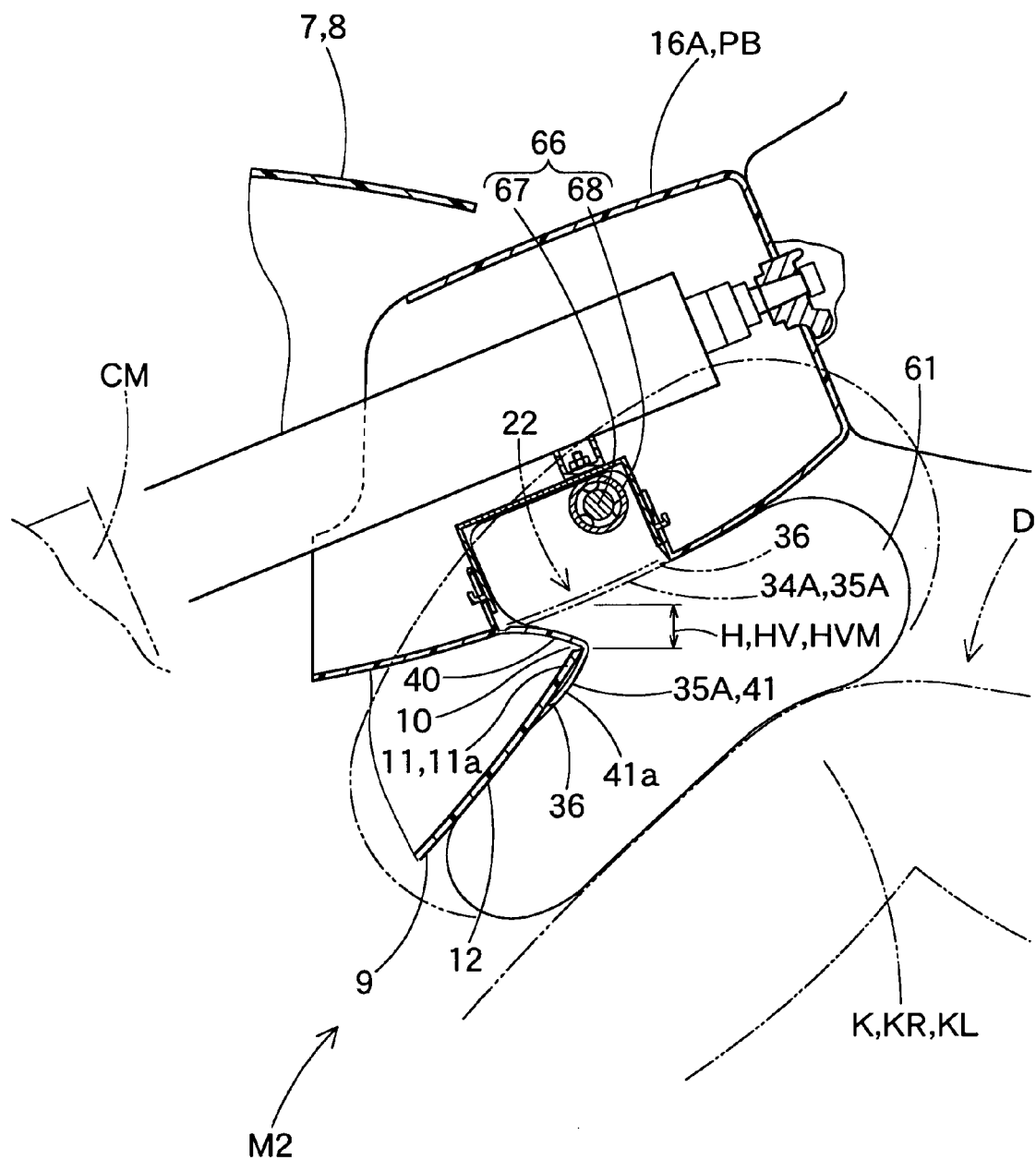
FIG. 22 is a schematic vertical section of the airbag apparatus of the second embodiment in operation when the column cover is disposed at the foremost and uppermost position.
Figure 23:
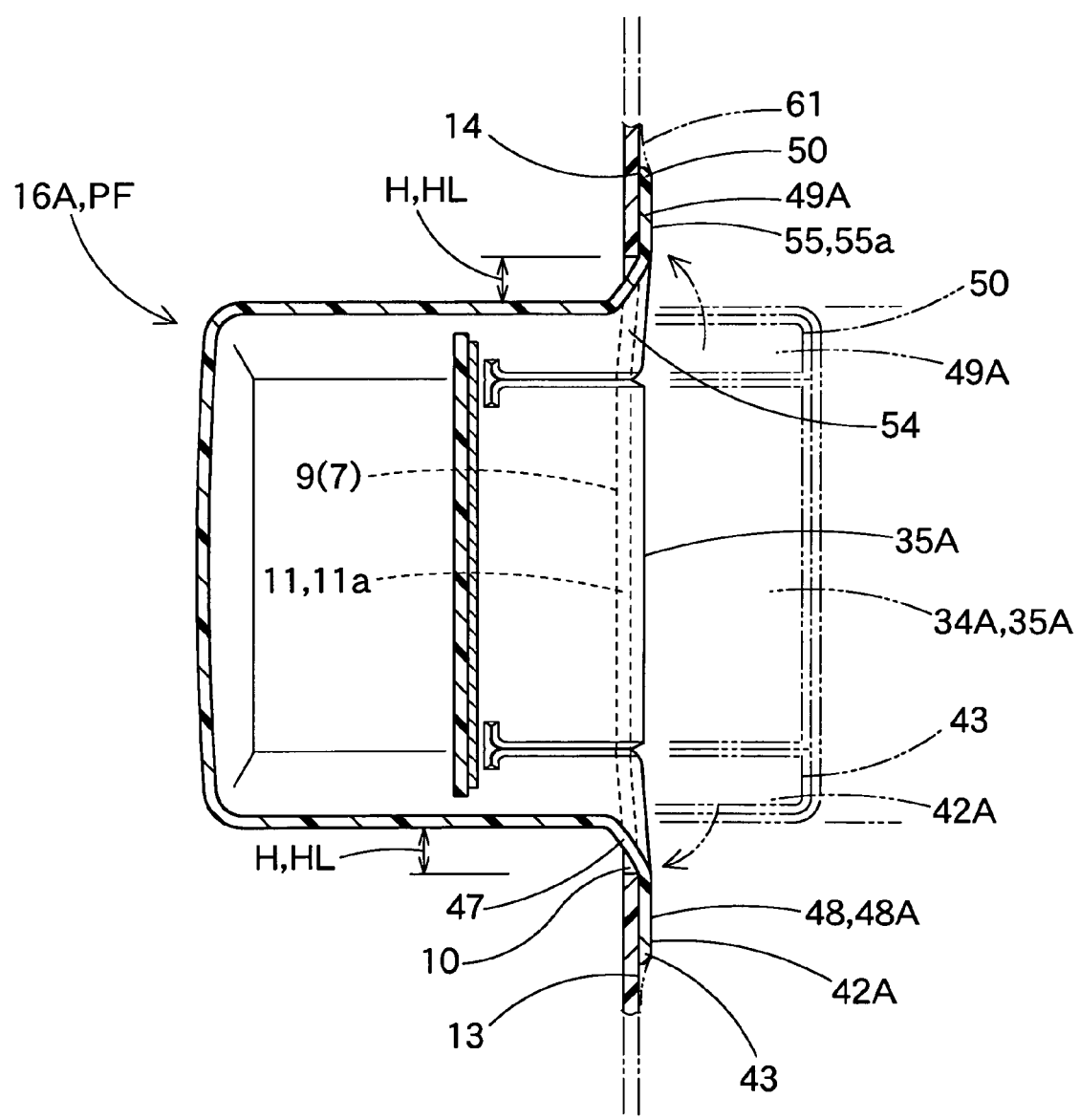
FIG. 23 is a schematic cross section of the column cover upon operation of the airbag apparatus of the second embodiment particularly showing the way the respective doors of the door section open when the column cover is disposed at the foremost and uppermost position.

In this column cover 16A, too, as shown in FIGS. 22 and 23, dispositions of rear edges 36, 43 and 50 of the respective doors of the door section 34A are predetermined such that flexed-open regions 40, 47 and 54 of the lower door 35A, left door 42A and right door 49A, i.e. regions of the doors 35A, 42A and 49A positioned at the rear of the rear sides 12, 13 and 14 of the lower panel 9 and flexed and opened in such a manner as to project from the outer circumference 18 of the column cover 16A, contact the lower peripheral region 11 of the installation opening 10 on the lower panel 9 when the column cover 16A is moved to the foremost position PF by an unillustrated adjusting mechanism and allowance gaps HL and HV are maximized, that is, when the column cover 16A is moved to the foremost and uppermost position by operating a telescopic mechanism and a tilt mechanism, and such that the airbag emergence opening 22 secures an enough area for allowing the emergence of the airbag.

Figure 20:
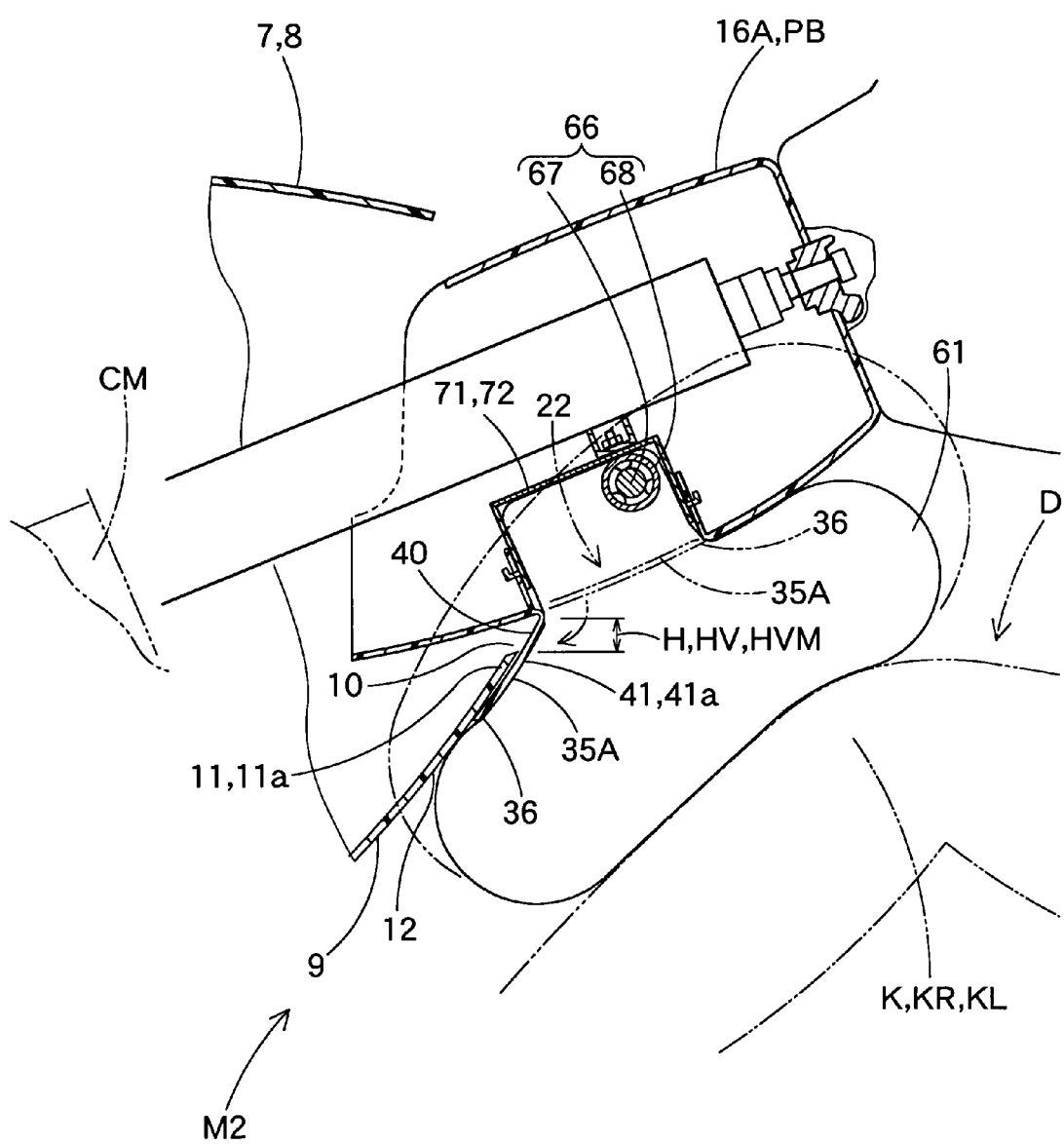
FIG. 20 is a schematic vertical section of an airbag apparatus of the second embodiment in operation when the column cover is disposed at the rearmost and uppermost position.
Figure 21:
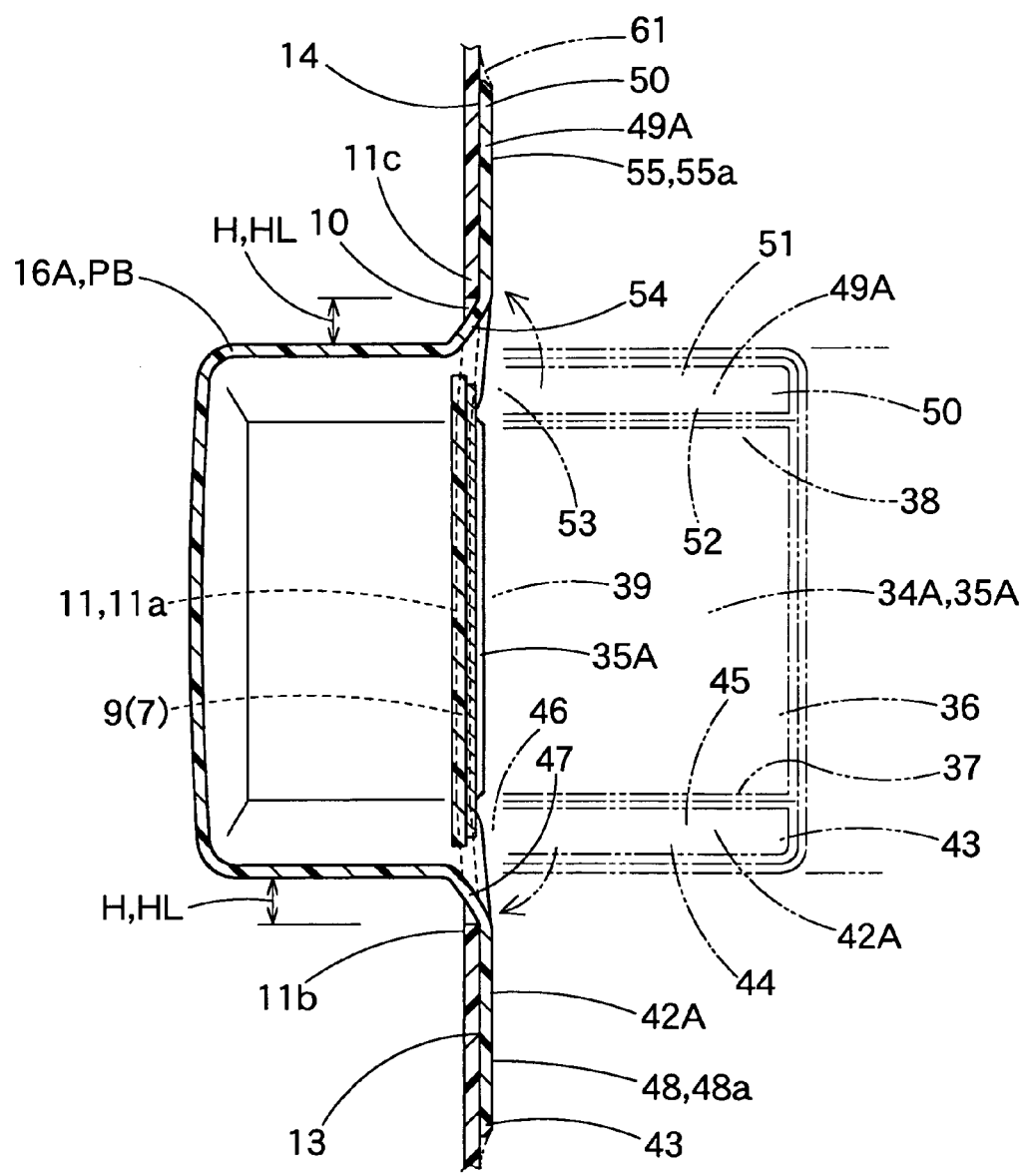
FIG. 21 is a schematic cross section of the column cover shown in FIG. 19 upon operation of the airbag apparatus of the second embodiment particularly showing the way respective doors of a door section open when the column cover is disposed at the rearmost and uppermost position.

Further, as shown in FIGS. 20 and 21, lengths UL and DL (FIG. 19) of the respective doors 35A, 42A and 49A from rear ends 36, 43 and 50 to front ends (bent portions of the tearable portion 24) 26a, 27a, 27b, 28a, 29a and 29b at both lateral edges of the doors are predetermined such that the flexed-open regions 40, 47 and 54 of the respective doors 35A, 42A and 49A contact with the lower peripheral region 11 of the installation opening 10 on the lower panel 9 when the column cover 16A is moved to the rearmost position PB and the allowance gaps HL and HV are maximized i.e., when the column cover 16A is disposed at the rearmost and uppermost position by operating the tilt and telescopic mechanisms.

Furthermore, in the second embodiment, too, as viewed from a side of a vehicle, the front ends of the lower door 35A, left door 42A and right door 49A, or the front ends or bent portions 26a, 27a, 27b, 28a, 29a and 29b of the respective regions of the tearable portion 24 disposed at both lateral sides of the respective doors 35A, 42A and 49A are located proximate the lower peripheral region 11 of the installation opening 10 at the rearmost position PB of the column cover (FIG. 2).

Therefore, the second embodiment attains the same working-effects as the first embodiment.

In the first and second embodiments, the left door 42/42A and right door 49/49A of the front door section 34 are configured to close off the allowance gaps HL between the left and right edges 11b and 11C of the installation opening 10 on the lower panel 9 and the outer circumference 18 of the column cover 16/16A. However, it will also be appreciated that left and right allowance gaps HL are configured so small as not to allow the entrance of the inflating airbag 61 by for example forming the installation opening 10 into a rectangular shape whereas fabricating the column cover 16/16A into a tubular shape having a rectangular section corresponding to the opening 10. With this structure, the airbag 61 is securely prevented from entering into the allowance gap H (HV and HL) only by composing the lower door 35/35A of the front door section 34/34A so as to block the allowance gap HV between the lower edge 11a of installation opening 10 on the lower panel 9 and the outer circumference 18 of the column cover 16/16A. Moreover, the degree of freedom in designing the left door 42/42A and right door 49/49A is increased because there is no need to consider the structure of the left door 42/42A and right door 49/49A for blocking the narrow gaps HL.

Of course, if the left door 42/42A and right door 49/49A of the front door section 34 are configured to close off the allowance gaps HL on the left and right sides of the column cover 16/16A as in the foregoing embodiments, large allowance gaps HL may be disposed on lateral sides of the column cover 16/16A. This structure will increase the degree of freedom in designing an outer contour of the column cover 16/16A because there is no need to consider the engagement between the column cover 16/16A and left and right edges 11b and 11c the installation opening 10 on the lower panel 9 upon vertical and/or anteroposterior movement of the column cover 16/16A.

Furthermore, in the first and second embodiments, the lower door 35/35A, left door 42/42A and right door 49/49A of the front door section 34/34A each has a tearable portion 24 around thereof adapted to tear when pushed by the airbag 61 such that the respective doors open by teardown of the tearable portion 24 for providing the airbag emergence opening 22. With this structure, parting lines do not appear on the outer surface of the column cover 16/16A around the respective doors of the door section 34/34A, thereby improving the appearance of the column cover 16/16A. Without considering this advantage, however, the lower door 35/35A, left door 42/42A and right door 49/49A of the front door section 34/34A may be configured such that peripheral edges of the respective doors except their hinge portions, i.e., front edges 39, 46 and 53 are preliminarily separated from surrounding areas of the column cover 16/16A (refer to the third embodiment shown in FIGS. 24 to 29). By way of example only, it will be appreciated to form an opening at a lower area 16a of the column cover 16/16A and install a member provided with the lower door 35/35A, left door 42/42A and right door 49/49A (for example, an airbag cover separate from the column cover 16/16A) in the opening to provide the door section 34/34A.

Figure 25:
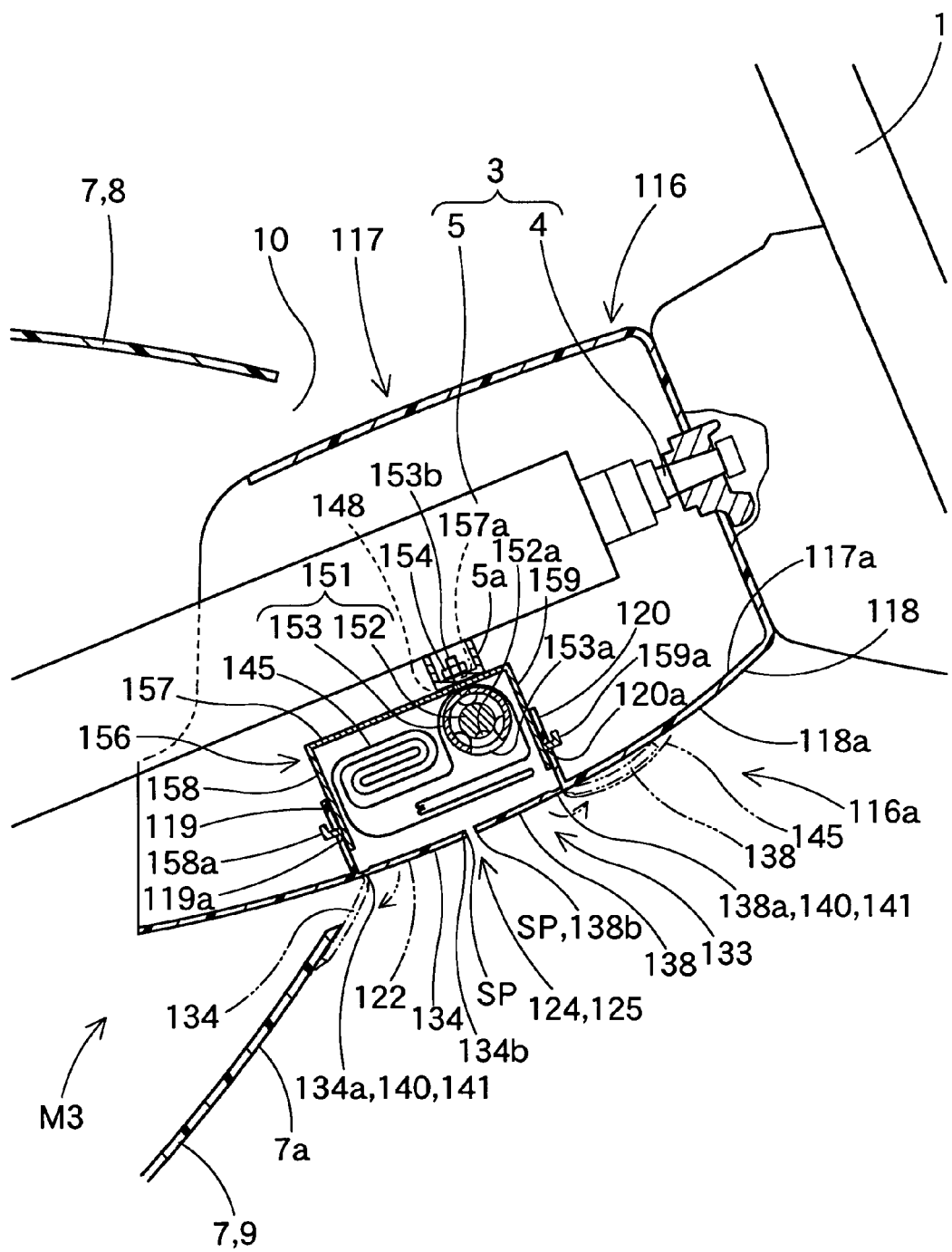
FIG. 25 is an enlarged schematic vertical section of a steering column equipped with the airbag apparatus of the third embodiment taken along the anteroposterior direction.

The third embodiment of the present invention is now described. As shown in FIG. 25, a knee-protecting airbag apparatus M3 according to the third embodiment is mounted on a steering column 3, and includes an airbag 145 housed in a folded state at a lower region 116a of and inside a column cover 116. The airbag apparatus M3 includes a column cover 116 covering the steering column 3, the airbag 145, an inflator 151 for supplying inflation gas to the airbag 145, and a case 156 accommodating the airbag 145 and the inflator 151. The airbag 145 is designed to push and open doors; a front lower door 134, front left door 135, front right door 136 and a rear door 138, formed on the column cover 116 upon inflation to be deployed in front of knees K (KL and KR) of a driver D seated in a driver's seat, as shown in FIG. 29.

Figure 24:
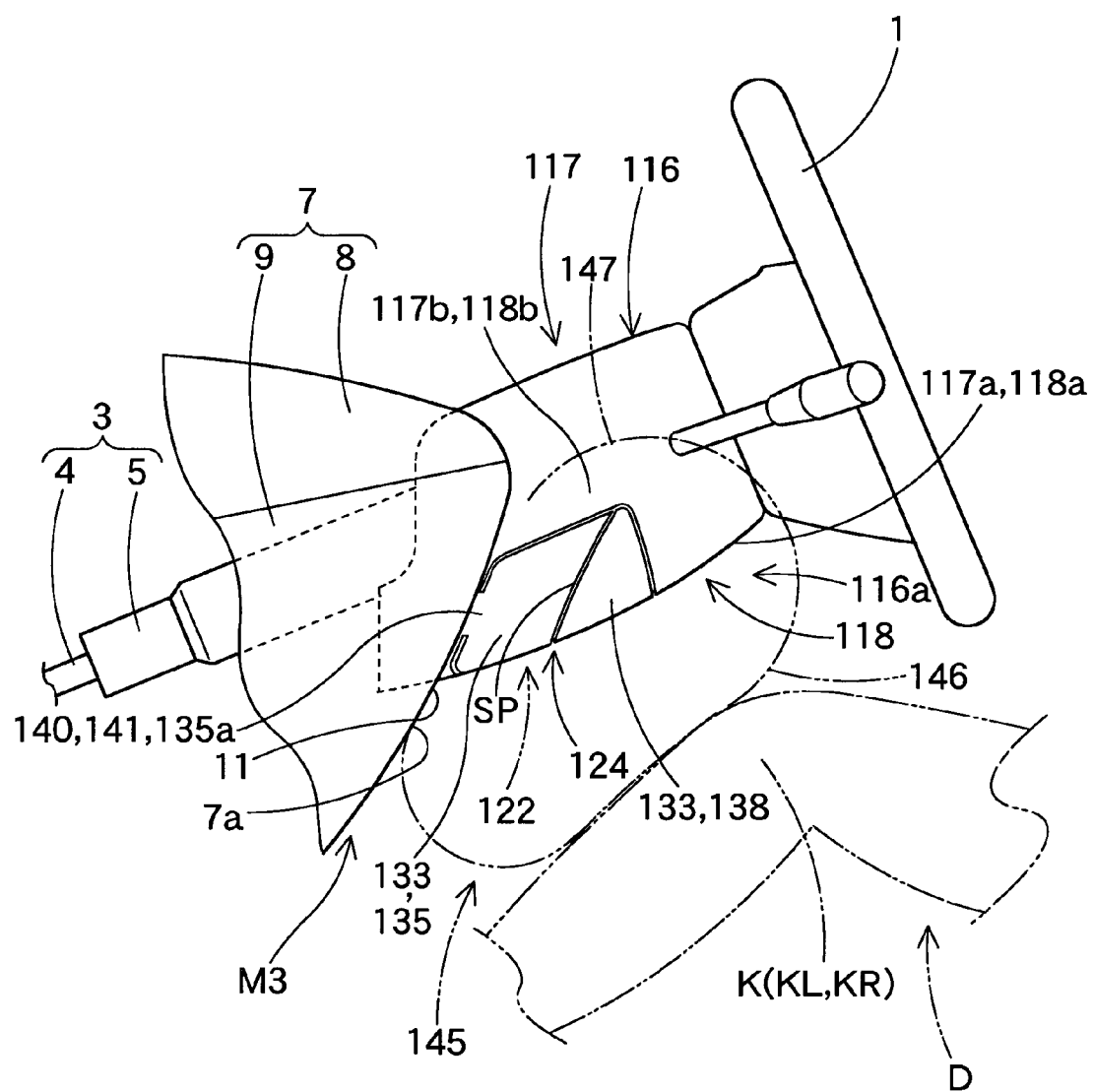
FIG. 24 is a schematic side view of the vicinity of a column cover equipped with a knee-protecting airbag apparatus of the third embodiment of the present invention.
Figure 29:
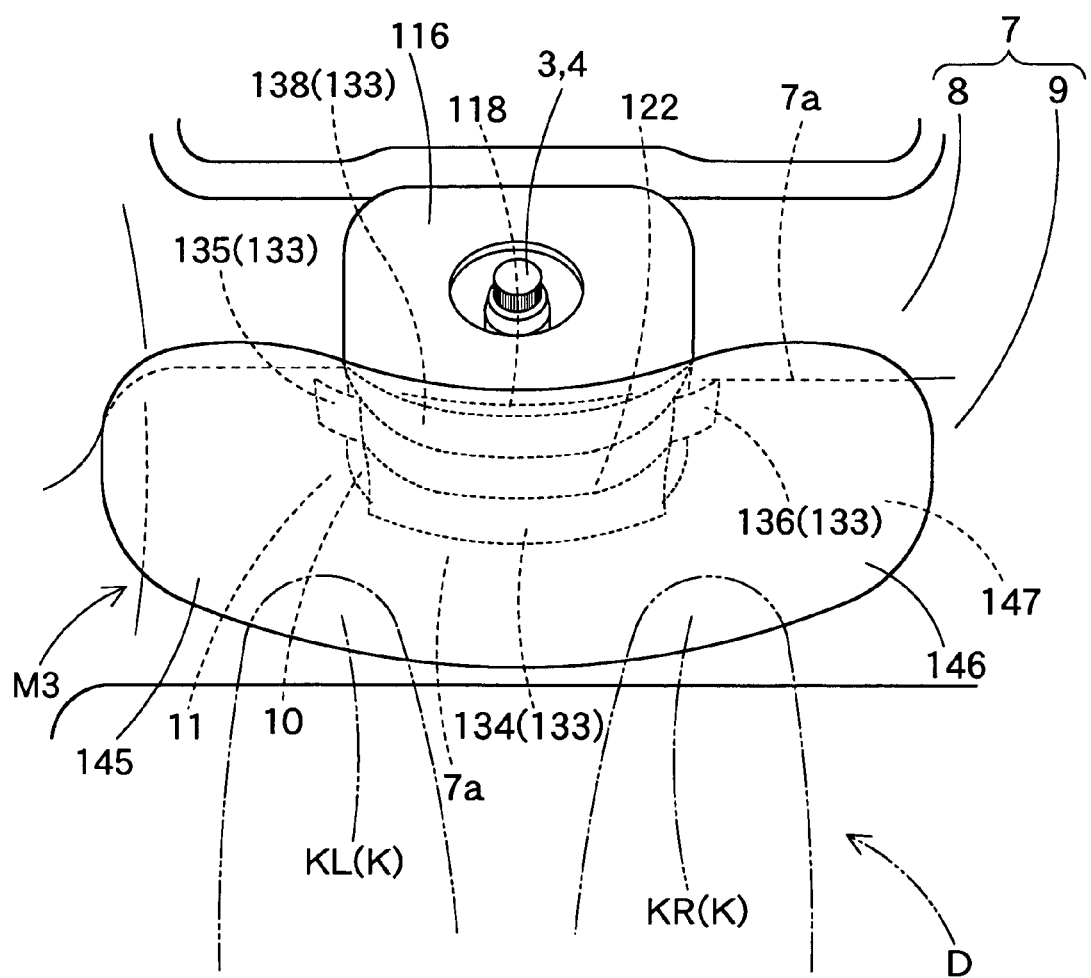
FIG. 29 is a schematic front view of the vicinity of the column cover at operation of the airbag apparatus of FIG. 25 as viewed from the rear.
Figure 30:
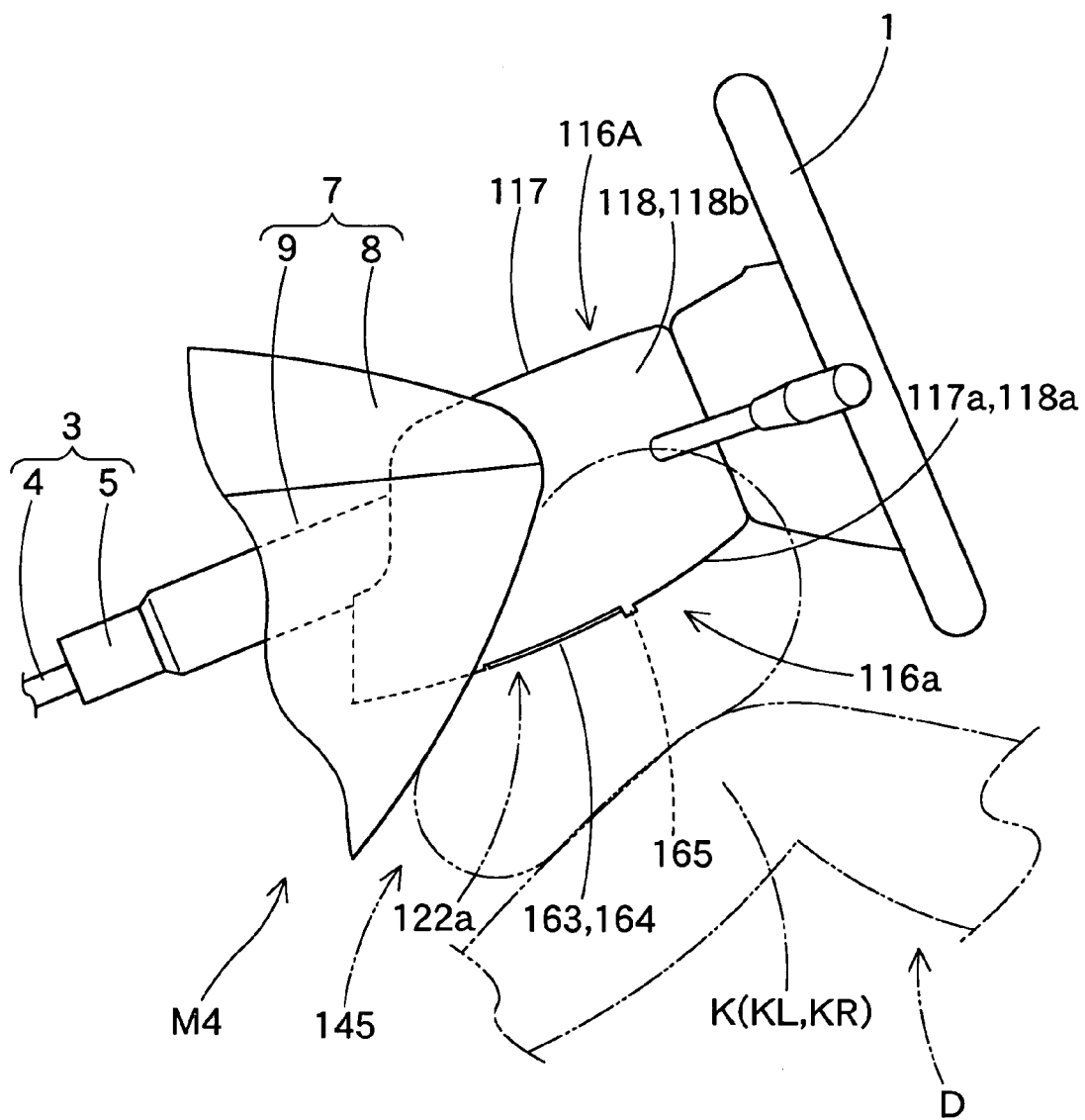
FIG. 30 is a schematic side view of the vicinity of a column cover equipped with a knee-protecting airbag apparatus of the fourth embodiment of the present invention.

As shown in FIGS. 24, 25 and 29, the column cover 116 is formed of synthetic resin into a generally square tubular contour covering the steering column 3. The column cover 116 is attached to a column tube 5 of the steering column 3 at its unillustrated region and is disposed in front of a seated driver D in such a manner as to protrude rearward from an installation opening 10 formed on a dashboard 7 for installing the column cover 116. As in the first embodiment shown in FIG. 1, the steering column 3 is disposed to protrude rearward from the dashboard 7 while being covered by the column cover 116, and includes a main shaft 4 and a column tube 5 mounted around the main shaft 4. A steering wheel 1 is connected to the rear end of the main shaft 4. The dashboard 7 is comprised of an upper panel 8 disposed on upper side and a lower panel 9 disposed on lower side.

Figure 28:
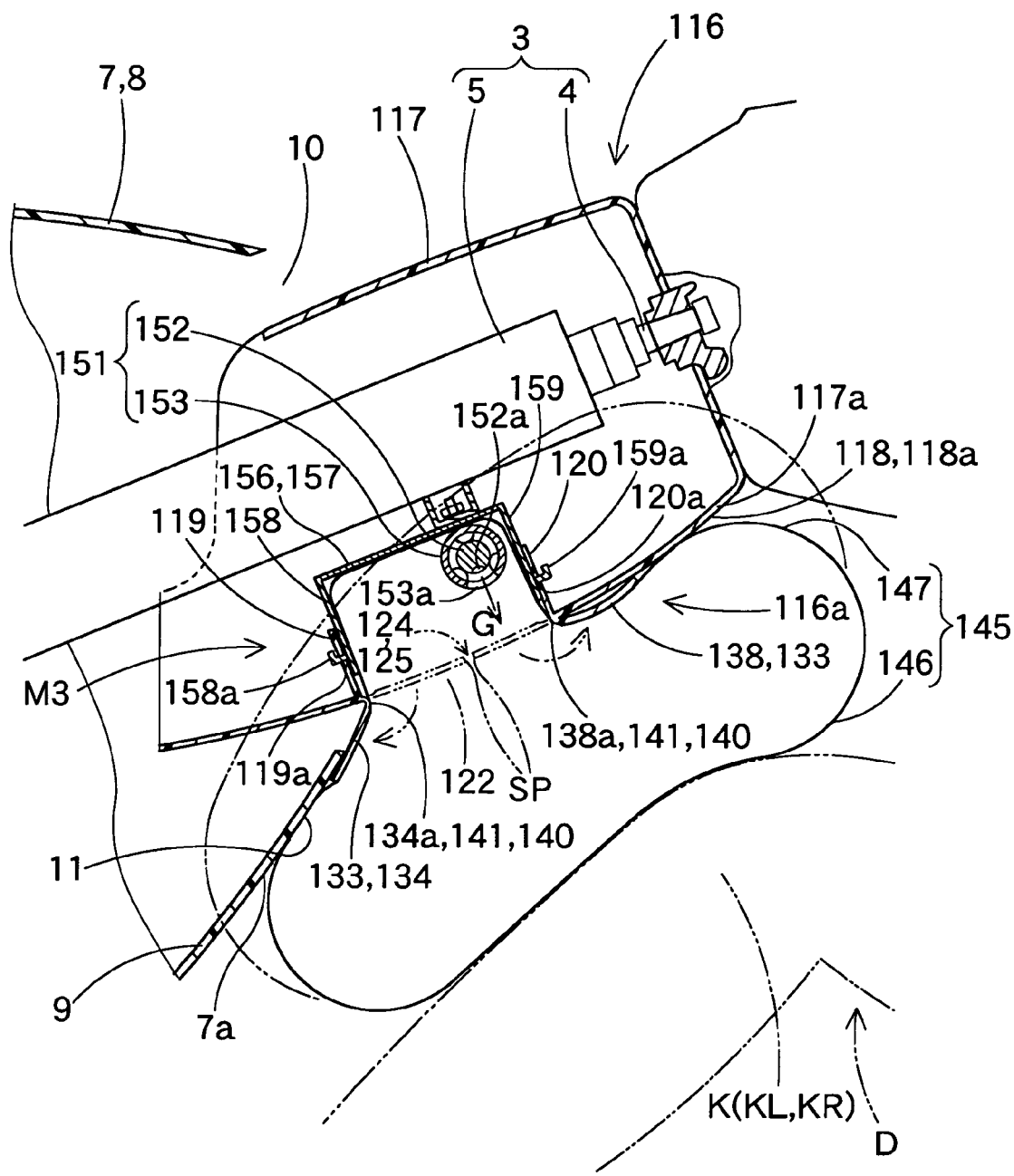
FIG. 28 is a schematic vertical section of the knee-protecting airbag apparatus of FIG. 25.

As indicated by double-dashed lines and solid lines in FIGS. 24, 28 and 29, the airbag 145 is formed into a rectangular plate shape elongative in the lateral direction at full inflation as in the first embodiment. The airbag 145 includes a driver side wall 146 deployed toward a driver D and a column side wall 147 deployed toward the column cover 116, respectively upon airbag deployment. The driver side wall 146 and column side wall 147 are cut out from woven fabric of polyester, polyamide or the like into the same outer contours, and then sewn up at outer peripheral edges to form the airbag 145. The column side wall 147 is provided at more than one (2, in the third embodiment) positions with mounting holes 148 for receiving bolts 153b (FIGS. 25 and 33) of the inflator 151 housed inside the airbag 145.

As shown in FIG. 29, the airbag 145 has such a contour as to cover a lower side 118a of the column cover 116 projecting rearward from the dashboard 7 and an area 11 of a rear side 7a of the lower panel 9 of the dashboard 7 below, on the left and right sides of the column cover 116 at full deployment to protect knees KL and KR of the driver D.

Other than the above-described method of making the airbag 145, the airbag 145 may be made by doubling up a single cloth member in which the driver side wall 146 and the column side wall 147 are connected at a part of the peripheral edge of the walls, and sewing up a remainder of the peripheral edges. The airbag 145 internally includes an unillustrated tether connecting the driver side wall 146 and the column side wall 147 so the thickness of the airbag 145 at full inflation is regulated to keep the airbag 145 in a plate shape.

As shown in FIG. 25, the inflator 151 includes a cylindrical body 152 provided with gas discharge ports 152a for discharging inflation gas and a generally tubular diffuser 153 for holding the body 152 as in the first embodiment. The diffuser 153 has apertures 153a for allowing the inflation gas to flow out therefrom and two bolts 153b (FIG. 33) for attachment of the inflator 151 to the column tube 5 together with the airbag 145 and the case 156. Each of the bolts 153b is nut 154 fastened to a bracket 5a of the column tube 5.

As shown in FIG. 25, the case 156 is made of sheet metal and has a reverse-U shaped sectional view as in the first embodiment, and includes a ceiling wall 157 and side walls 158 and 159 extending downward from front and rear edges of the ceiling wall 157. Each of the side walls 158 and 159 is provided with retaining lugs 158a/159a. The retaining lugs 158a and 159a are put into slots 119a and 120a formed on mounting walls 119 and 120 of the column cover 116 so as to be retained by the mounting walls 119 and 120, so that the side walls 158 and 159 are coupled with the mounting walls 119 and 120. The ceiling wall 157 is provided with through holes 157a for receiving the bolts 153b of the inflator 151.

As shown in FIGS. 26 to 29, the column cover 116 is provided, in an area of its outer surface 118 ranging from a lower side 118a to left side 118b and right side 118c, with an airbag cover 133. The airbag cover 133 includes four doors; the front lower door 134, front left door 135, front right door 136 and rear door 138, adapted to open when pushed by the airbag 145 to cooperatively provide a single airbag emergence opening 122. In the third embodiment, the airbag cover 133 is integral with the column cover 116 made from synthetic resin.

The front lower door 134 is located on a lower wall 117a of the column cover 116, the front left door 135 is located on a left side wall 117b of the column cover 116, and the front right door 136 is located on a right side wall 117c of the column cover 116. Each of these doors 134, 135 and 136 are adapted to open around hinge regions 134a, 135a and 136a disposed on their front edges so that their rear edges 134b, 135b and 136b are oriented forward. The rear door 138 is disposed to extend over the lower wall 117a, left side wall 117b and right side wall 117c of the column cover 116, and is adapted to open around a hinge region 138a disposed on its rear edge so that its rear front 138b is oriented rearward.

The hinge regions 134a, 135a, 136a and 138a are integral hinges 141, and these integral hinges 141 connect each of the doors 134, 135, 136 and 138 with the column cover 116. A slit 124 is formed between outer peripheral edges of the doors 134, 135, 136 and 138 of the airbag cover 133 except the location of integral hinges 141 and a periphery of the airbag emergence opening 122 on the column cover 116, thereby providing separate surfaces SP on the outer peripheral edges of the respective doors 134, 135, 136 and 138.

The slit 124 is formed of a continual linear hole running through a generally square tubular circumferential wall 117 of the column cover 116 from the outer side to the inner side. In the third embodiment, the slit 124 is disposed in between the adjacent doors, too, and includes a central region 125, upper left region 126, lower left region 127, upper right region 128, lower right region 129, rear left region 130, and rear right region 131. The central region 125 extends transversely in such a manner as to partition rear edge regions 134b, 135b and 136b of the three doors 134, 135 and 136 disposed on the front side and the front edge region 138b of the rear door 138. The upper left region 126 is disposed on an upper edge of the front left door 135 in the peripheral edge of the airbag emergence opening 122, and extends forward from the left upper end of the central region 125. The lower left region 127 is disposed between the front lower door 134 and the front left door 135, and extends forward generally along a ridge line of the crossing of the lower wall 117a and left wall 117b of the column cover 116. The upper right region 128 is disposed on an upper edge of the front right door 136 in the peripheral edge of the emergence opening 122, and extends forward from the right upper end of the central region 125. The lower right region 129 is disposed between the front lower door 134 and the front right door 136, and extends forward generally along a ridge line of the crossing of the lower wall 117a and right wall 117c of the column cover 116. The rear left region 130 extends obliquely rearward and downward from the left upper end of the central region 125 to the lower wall 117a along the peripheral edge of the emergence opening 122, while the rear right region 131 extends obliquely rearward and downward from the right upper end of the central region 125 to the lower wall 117a along the peripheral edge of the emergence opening 122.

Each of the hinge regions 134a, 135a and 136a are configured short so they easily bend for assisting the opening of the front lower door 134, front left door 135 and front right door 136. Specifically, front ends of the upper left region 126 and upper right region 128 are bent downward, and front ends of the lower left region 127 and lower right region 129 bifurcate toward the hinge regions 134a, 135a and 136a.

Figure 26:
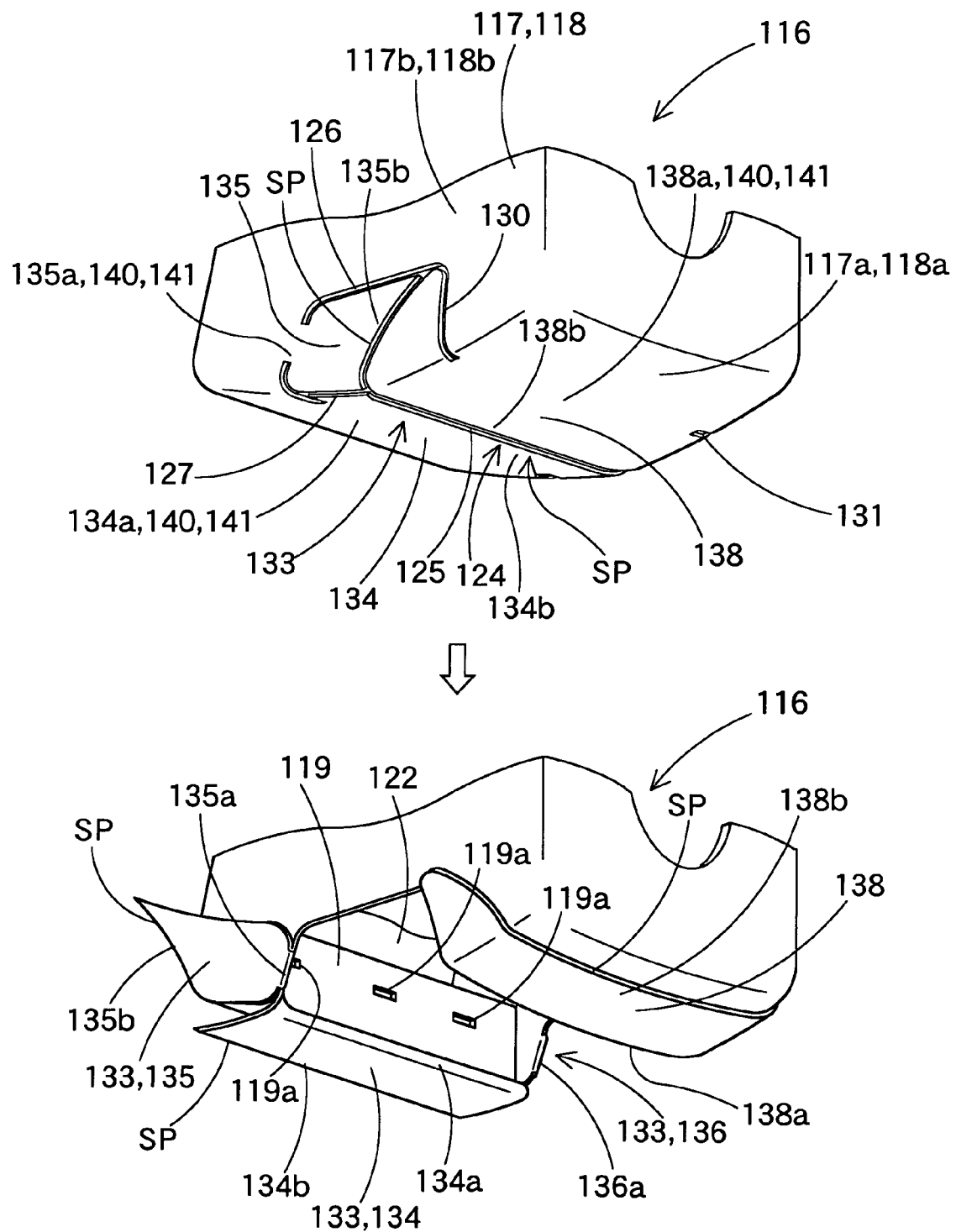
FIG. 26 is a schematic partial perspective view of a column cover used for the knee-protecting airbag apparatus of FIG. 25 showing before and after an airbag emergence opening is formed on the column cover.
Figure 27:
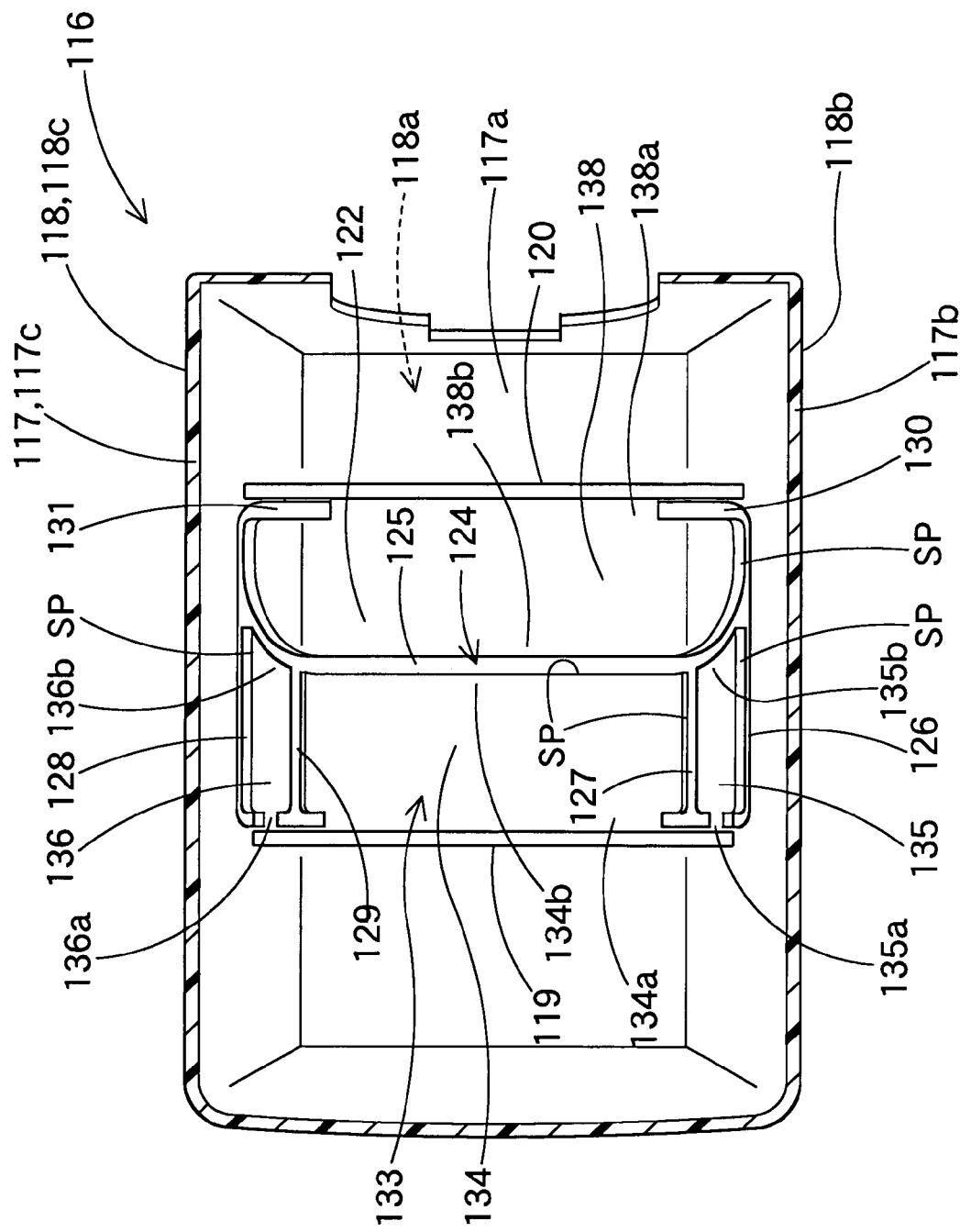
FIG. 27 is a schematic cross sectional view of the column cover of FIG. 26.

With above structure of the third embodiment of the knee-protecting airbag apparatus M3, if the airbag 145 inflates with inflation gas G discharged from the gas discharge ports 152 of the inflator 151, the front lower door 134, front left door 135 and front right door 136 are pushed by the airbag 145 and open around the hinge regions 134a, 135a and 136a so that the rear edges 134b, 135b and 136b are oriented forward as shown in FIGS. 26 and 28, while the rear door 138 opens around the hinge region 138a so the front edge 138b is oriented rearward. Then the airbag emergence opening 122 is formed on an area ranging over the lower side 118a, left side 118b and right side 118c of the column cover 116. The airbag 145 then emerges from the opening 122 and deploys to cover the lower side 118a of the column cover 116 projected from the dashboard 7 and the rear side 7a of the dashboard 7 on the lower, left and right sides of the column cover 116 so that the knees KL and KR of the driver D moving forward are protected from these members.

In the knee-protecting airbag apparatus M3 according to the third embodiment of the present invention, each of the front lower door 134, front left door 135, front right door 136 and rear door 138 is provided on respective outer peripheral edge with the separate surface SP which is preliminarily separated from the peripheral edge of the airbag emergence opening 122 on the column cover 116 from before the opening of the doors 134, 135, 136 and 138 such that a resistance the airbag 145 would experience upon opening the doors is suppressed. In the third embodiment, the separate surfaces SP are formed in between the adjacent doors, too. That is, none of the doors 134, 135, 136 and 138 has any portions to break and open in order to form the airbag emergence opening 122, otherwise the airbag 145 would experience a high resistance to break open the airbag cover 133. Accordingly, the respective doors 134, 135, 136 and 138 of the airbag cover 133 open quickly and smoothly when pushed by the airbag 145 even if the internal pressure of the airbag 145 is not so high. As a result, the airbag 145 emerges from the case 156 quickly for further deployment.

With the knee-protecting airbag apparatus M3 according to the third embodiment, therefore, the resistance of the airbag cover 133 which the airbag 145 would experience upon opening of the airbag cover 133 is suppressed so that a quick deployment of the airbag 145 from the case 156 is secured even with a suppressed internal pressure of the airbag 145 in the initial stage of airbag inflation.

Further in the third embodiment, the airbag cover 133 is integral with the column cover 116 fabricated of synthetic resin, which facilitates the manufacture of the airbag cover 133.

In the third embodiment, the front lower door 134, front left door 135 and front right 136 are disposed over the lower wall 117a, left wall 117b and right wall 117c of the circumferential wall 117 of the column cover 116, while the rear door 138 is also disposed over the lower wall 117a, the left wall 117b and right wall 117c. However, the door for forming the airbag emergence opening 122 may be comprised of only the front lower door 134 and a rear door 138 ranging over the lower wall 117a only, of course together with the slit 124. Alternatively, the door may be comprised of either a larger front lower door 134 or a larger rear door 138 ranging over the lower wall 117a only. With any of these structures, the airbag emergence opening is formed only on the lower side 118a of the column cover 116, and therefore, the slit formed along the outer peripheral edges of the doors is formed on the lower side 118a only and hardly comes in sight of vehicle occupants even if the slit is wide. Therefore, the appearance of the column cover 116 will not be affected.

Further alternatively, the airbag cover may be formed as a separate entity from the column cover. FIGS. 30 to 35 illustrate a knee-protecting airbag apparatus M4 according to the fourth embodiment of the invention. The airbag apparatus M4 includes an airbag cover 163 formed separate from a column cover 116A and fitted in an area on the column cover 116A to be an airbag emergence opening 122A. Although the column cover 116A and the airbag cover 163 are differently structured from those of the third embodiment, other components of the fourth embodiment such as an airbag 145, an inflator 151 and a case 156 have the same structures as, those of the third embodiment.

The airbag emergence opening 122A of the fourth embodiment has a rectangular shape and is located on a lower wall 117a of a circumferential wall 117 of the column cover 116A so that the airbag 145 emerges only from a lower side 118a of the column cover 116A.

Figure 31:
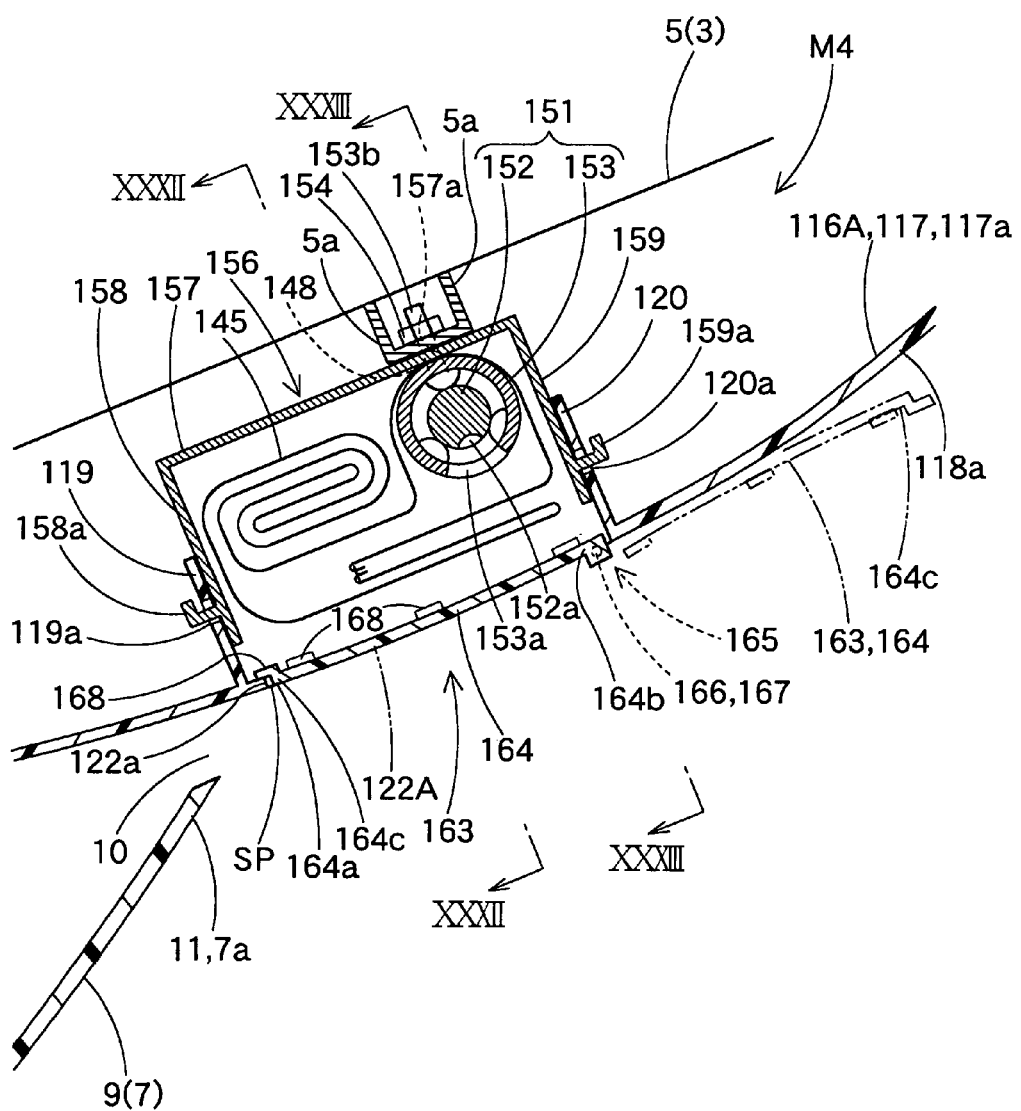
FIG. 31 is an enlarged schematic vertical section of a steering column equipped with the airbag apparatus of the fourth embodiment taken along the anteroposterior direction.
Figure 32:
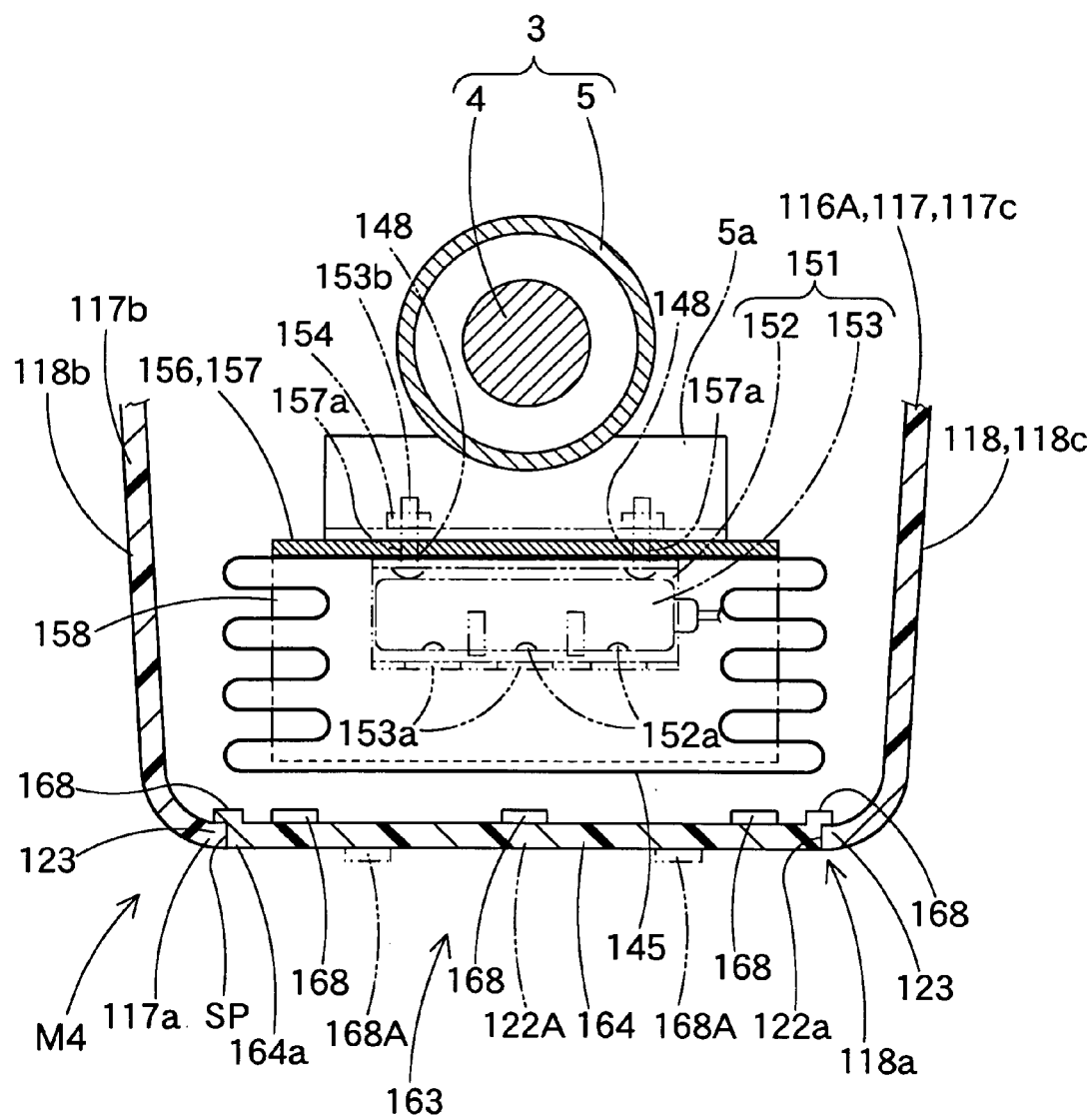
FIG. 32 is an enlarged schematic vertical section of the airbag apparatus of the fourth embodiment taken along line XXXII-XXXII of FIG. 31.
Figure 33:
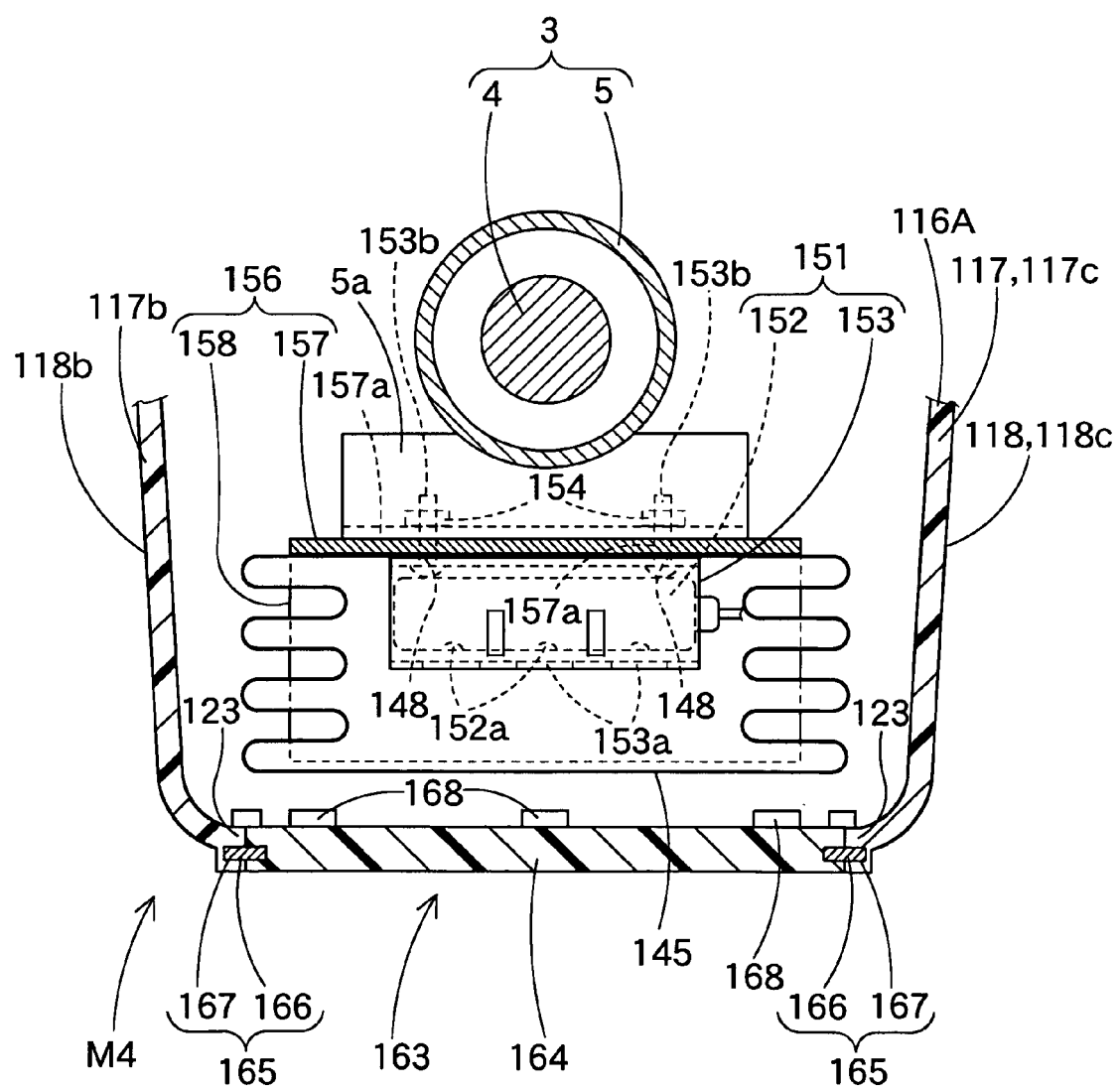
FIG. 33 is an enlarged schematic vertical section of the airbag apparatus of the fourth embodiment taken along line XXXIII-XXXIII of FIG. 31.
Figure 34:
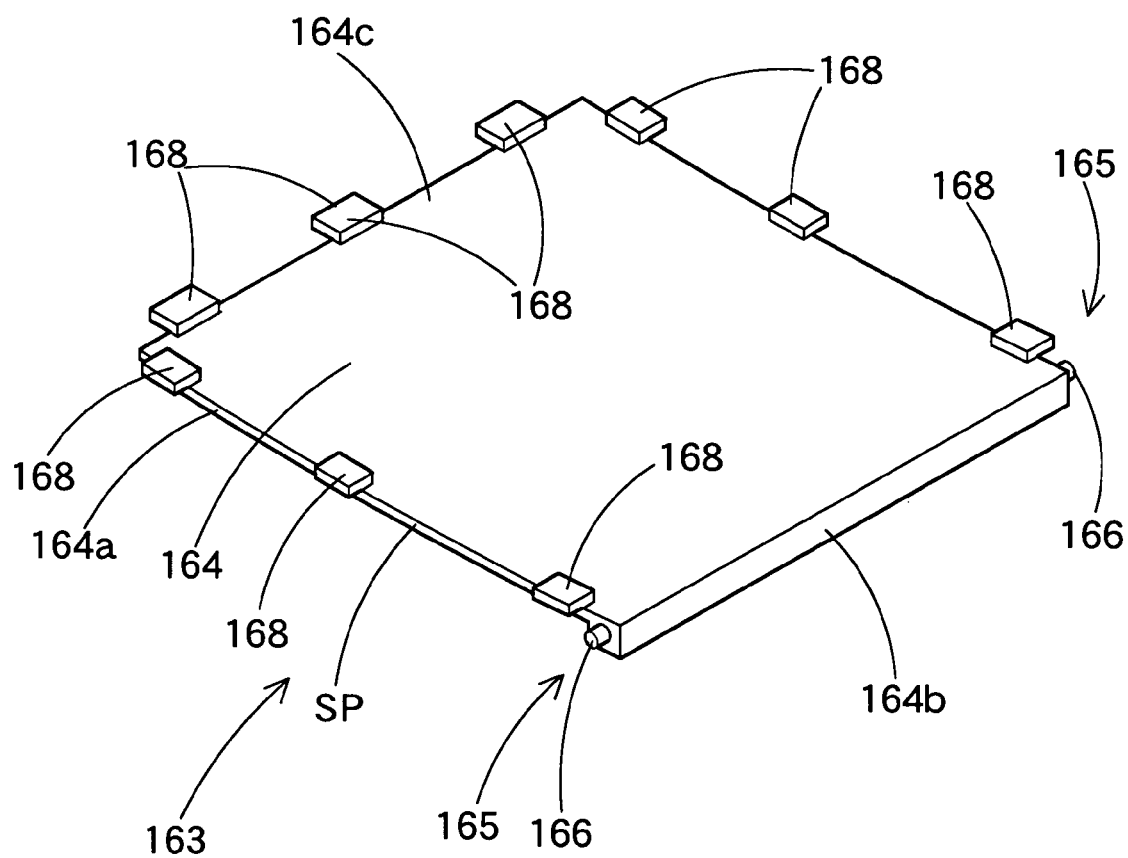
FIG. 34 is a perspective view of a door used in the airbag apparatus of the fourth embodiment.

As shown in FIGS. 31 to 33, the airbag cover 163 is fabricated of synthetic resin material like the column cover 116A. A door 164 of the airbag cover 163 is formed into a rectangular plate shape for closing the airbag emergence opening 122A. At a rear edge 164b of the door 164 is a hinge portion 165 around which the door 164 opens when pushed by the inflating airbag 145, so that the door 164 opens such that its front edge 164c rotates downwardly and rearwardly. The hinge portion 165 includes a pair of rotary shafts 166 and bearings 167 supporting the shafts 166 while permitting the rotation of the shafts 166. The rotary shafts 166 are formed to project to the left and right from lateral sides of the rear edge 164b of the door 164. The bearings 167 are formed of holes bored on rear end areas of a peripheral edge of the airbag emergence opening 122A on the column cover 116A for receiving the rotary shafts 166. That is, an outer peripheral edge 164a of the door 164 except the hinge portion 165 serves as the separate surface SP separated from the inner surface of the opening 122A on the column cover 116A.

The door 164 is provided along its outer peripheral edge 164a with a plurality of retaining legs 168 retained by an inner surface of the column cover 116A at the peripheral edge 123 of the emergence opening 122A. The retaining force of the retaining legs 168 is such that they flex and disengage from the peripheral edge 123 if the door 164 is pushed by the inflating airbag 145.

Figure 35:
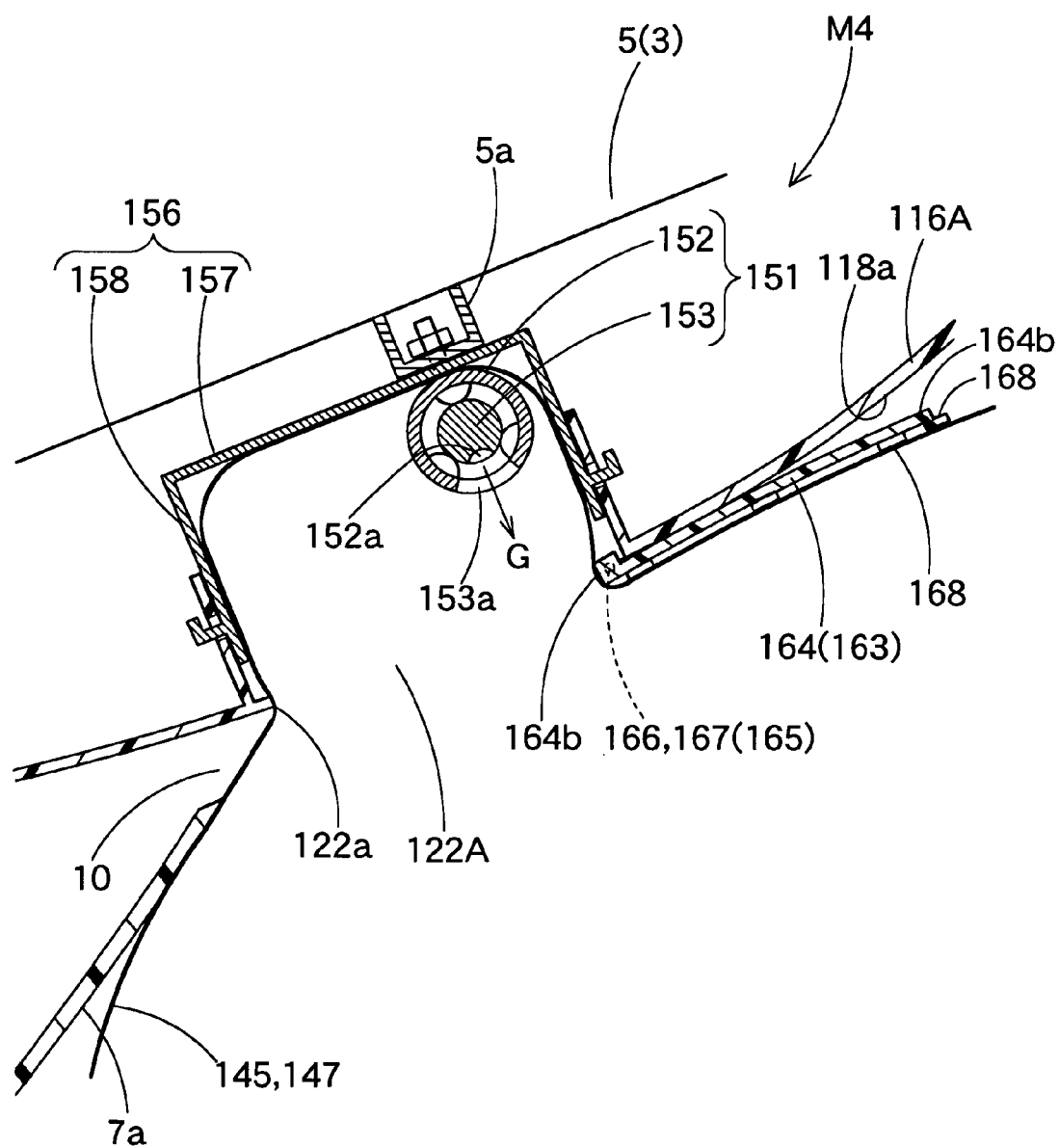
FIG. 35 is an enlarged schematic vertical section of the airbag apparatus of the fourth embodiment in operation.

In the airbag apparatus M4 of the fourth embodiment, too, if the folded and housed airbag 145 is fed with inflation gas G, the airbag 145 inflates as shown in FIGS. 31 and 35. Then the airbag 145 pushes the airbag cover 163 such that the retaining legs 168 are disengaged from the peripheral edge 123 of the airbag emergence opening 122A and the door 164 opens around the rotary shafts 166 of the hinge portion 165 rearwardly and downwardly, thereby forming the opening 122A on the column cover 116A for allowing the emergence of the airbag 145. Hence the airbag 145 emerges from the opening 122A and deploys in front of knees K (KL and KR) of a driver D as indicated by double-dashed lines in FIG. 30.

In the fourth embodiment, the door 164 of the airbag cover 163 is preliminarily provided on its outer peripheral edge 164a with the separate surface SP which is separated from the peripheral edge of the airbag emergence opening 122A on the column cover 116A. That is, the airbag cover 163 has no region to be broken to provide the emergence opening 122A, otherwise the airbag 145 would experience a high resistance when breaking open the airbag cover 163. Accordingly, the door 164 of the airbag cover 163 opens quickly and smoothly when pushed by the airbag 145 even if the internal pressure of the airbag 145 is not so high. As a result, the airbag 145 emerges from the case 156 quickly for further deployment, and the same working-effects as the third embodiment are obtained.

In the fourth embodiment, the airbag cover 163 is a separate entity from the column cover 116A and coupled to the column cover 116A. However, since part of the hinge portion 165 also serves as a joint to the column cover 116A, number of parts of the joint is reduced. Of course the door 164 stays connected to the column cover 116A at the hinge portion 165 if the door 164 opens, and therefore, the door 164 does not fly off from the column cover 116A.

In the fourth embodiment, the hinge portion 165 is comprised of the pin-like rotary shafts 166 formed on the part of the door 164 and bearings 167 for receiving the shafts 166 formed on the part of the column cover 116A. However, the rotary shafts 166 may alternatively be formed on the part of the column cover 116A while the bearings 167 on the part of the door 164.

Figure 36:
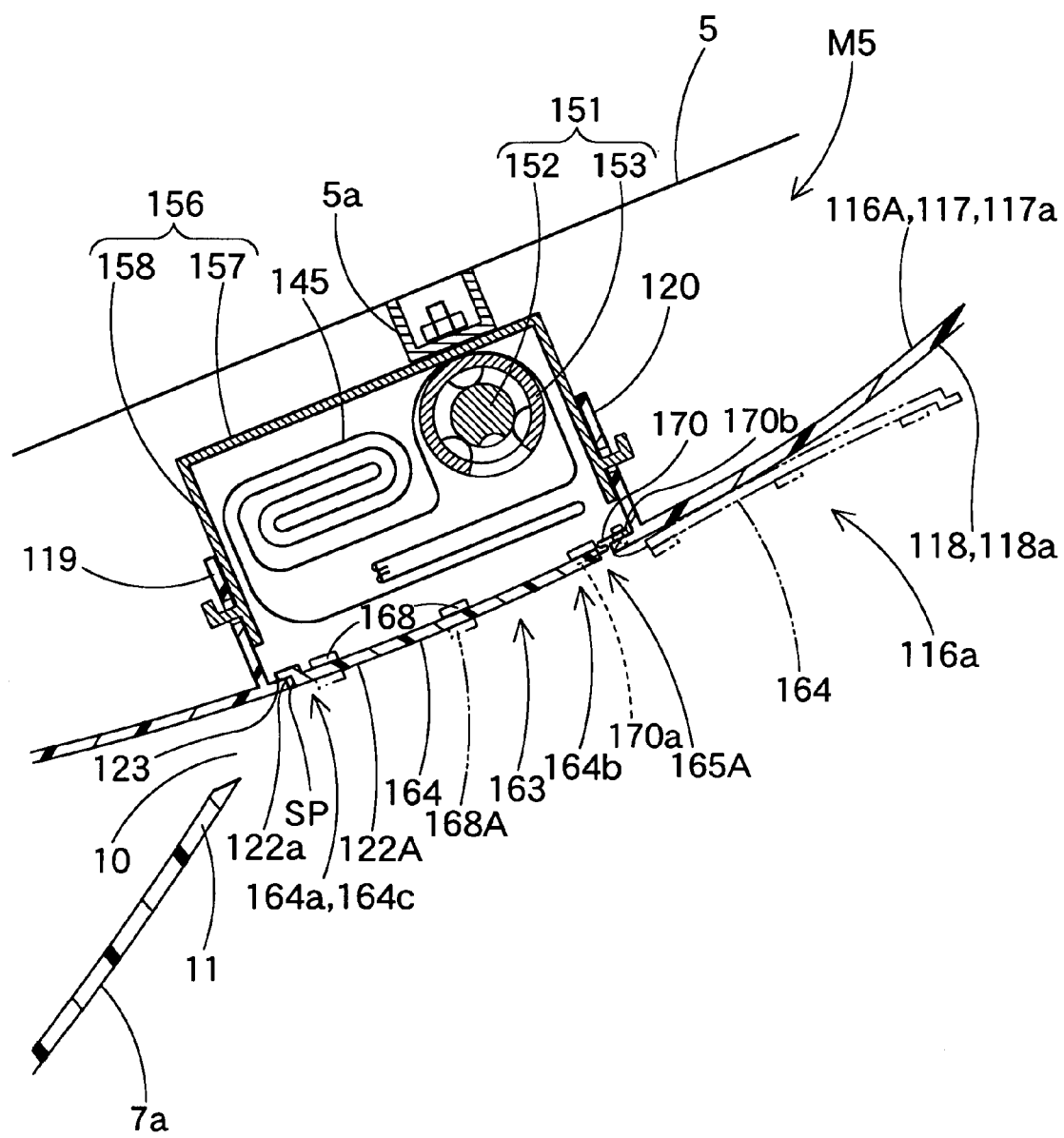
FIG. 36 is an enlarged schematic vertical section of a knee-protecting airbag apparatus according to the fifth embodiment of the invention.
Figure 37:
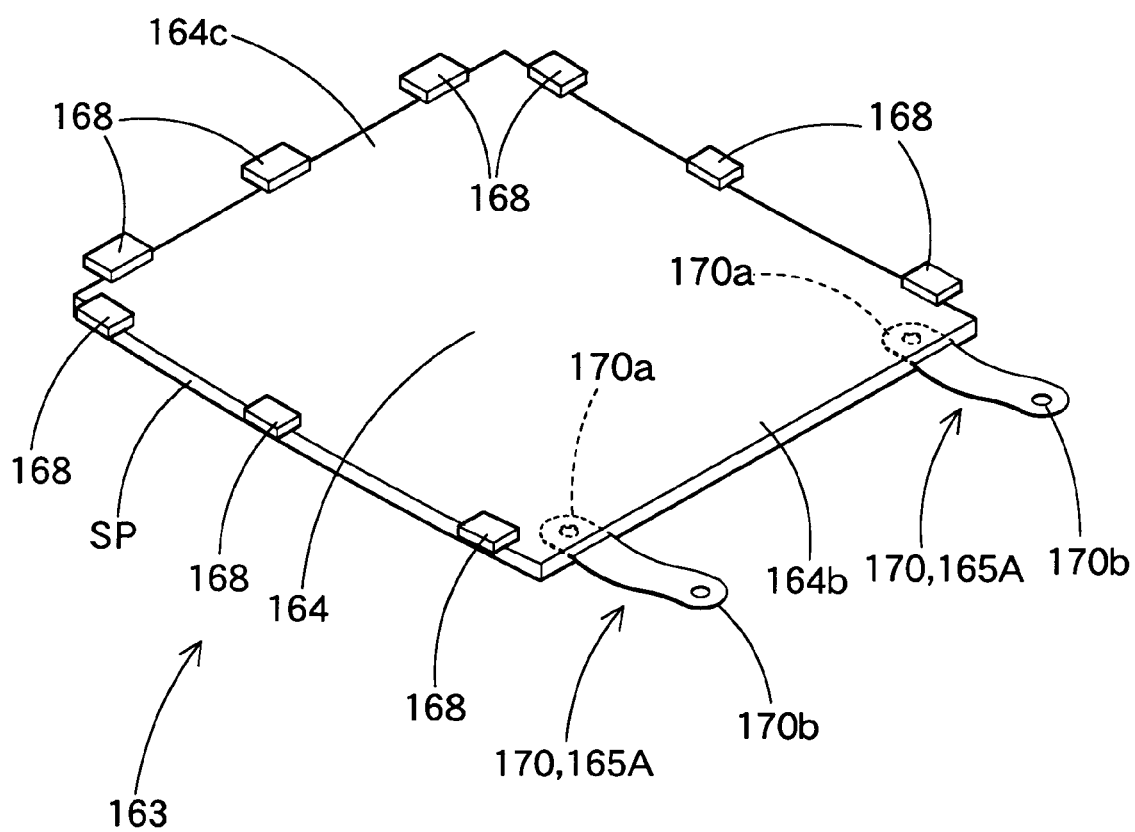
FIG. 37 is a perspective view of a door used in the airbag apparatus of the fifth embodiment.
Figure 38:
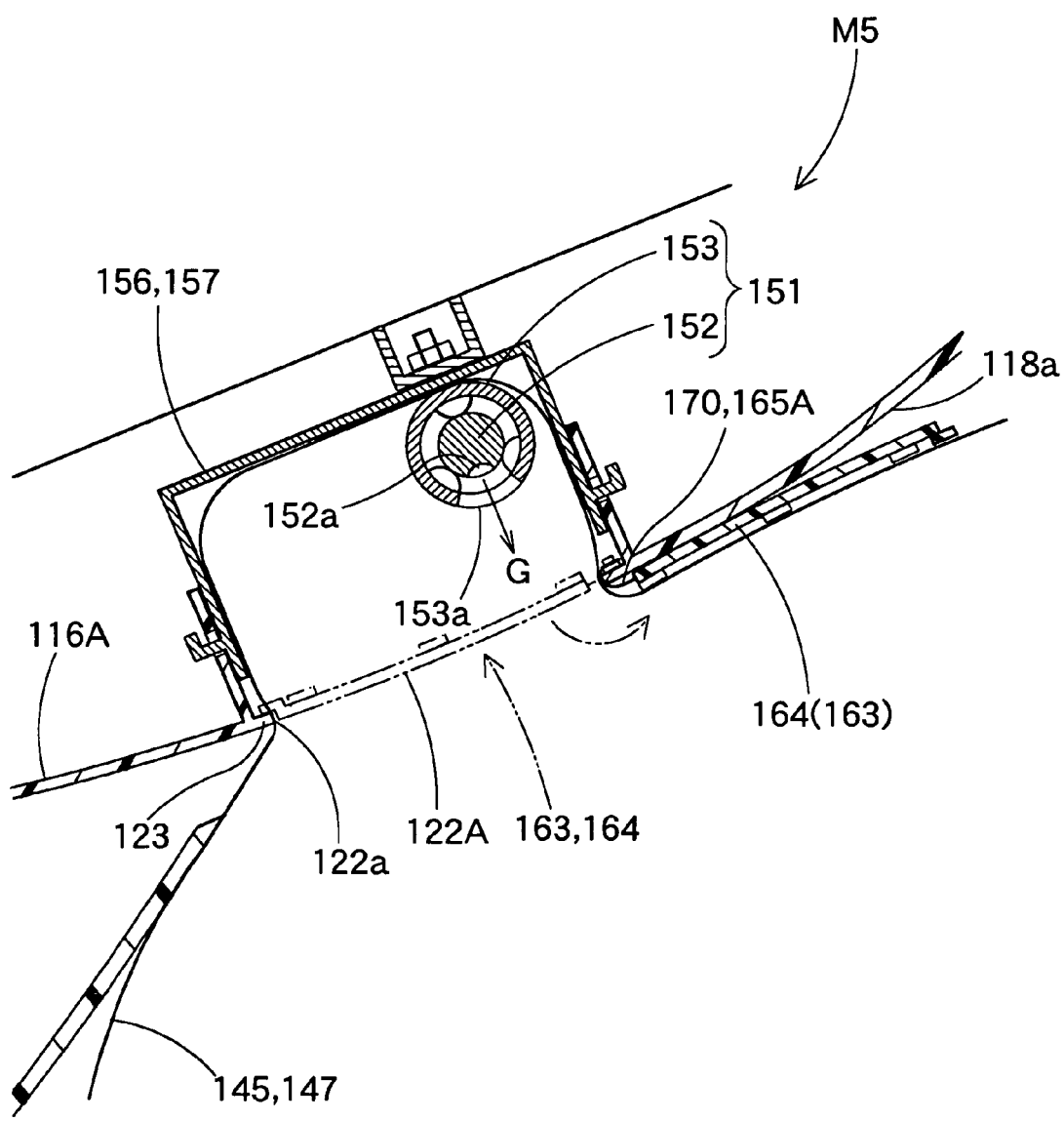
FIG. 38 is an enlarged schematic vertical section of the airbag apparatus of the fifth embodiment in operation.
Figure 39:
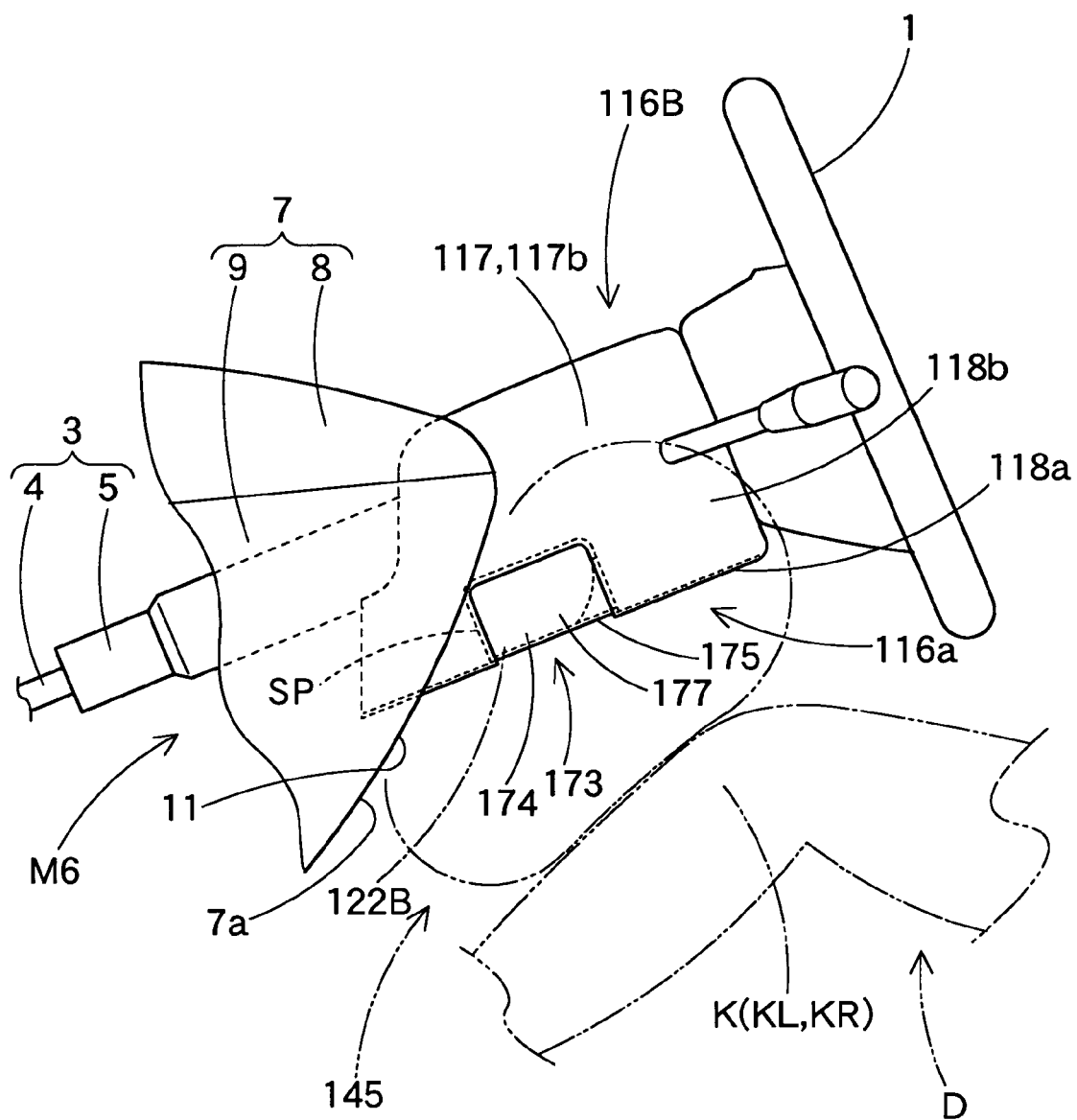
FIG. 39 is a schematic side view of the vicinity of a column cover equipped with a knee-protecting airbag apparatus according to the sixth embodiment of the invention.

If the airbag cover is formed as a separate entity from the column cover and coupled to the column cover at a hinge portion, the following fifth embodiment shown in FIGS. 36 to 38 may also be adopted. Although a hinge portion 165A of the fifth embodiment has a different structure from that of the fourth embodiment, other components are the same as in the fourth embodiment.

The hinge portion 165A of the fifth embodiment is comprised of a pair of band members 170 having flexibility. First ends 170a of the band members 170 are fixedly connected to the door 164 while second ends 170b of the band members 170 are fixedly connected to the peripheral edge 123 of the airbag emergence opening 122A on the column cover 116A. In this specific embodiment, the band members 170 are formed of woven fabric of polyamide or the like and disposed on the left and right of the rear edge 164a of the door 164.

In the airbag apparatus M5 of the fifth embodiment, too, if the folded and housed airbag 145 is fed with inflation gas G, the airbag 145 inflates as shown in FIGS. 36 and 38. Then the airbag 145 pushes the airbag cover 163 such that the retaining legs 168 are disengaged from the peripheral edge 123 of the airbag emergence opening 122A, and then the band members 170 are flexed and the door 164 opens rearwardly and downwardly around the vicinity of the band members 170 serving as the hinge portion 165A, thereby forming the opening 122A on the column cover 116A for allowing the emergence of the airbag 145. Hence the airbag 145 emerges from the opening 122A and deploys in front of knees K (KL and KR) of a driver D, and the same working-effects as the fourth embodiment are obtained.

In the fourth and fifth embodiments, the door 164 is provided along its outer peripheral edge 164a with retaining legs 168 retained by the inner surface of the column cover 116A at the peripheral edge 123 of the emergence opening 122A. However, as indicated by double-dashed lines in FIGS. 32 and 36, it will also be appreciated to form such retaining legs 168A on the column cover 116A as to hold the outer peripheral edge 164a of the door 164. The retaining force of the retaining legs 168A should of course be such that they flex and allows the outer edge 164a of the door 164 to be disengaged from the peripheral edge 123 if the door 164 is pushed by the inflating airbag 145.

In such a structure as the fourth and fifth embodiments where the door 164 is a hinged door which opens downwardly about the hinge portion 165/165A provided with a center of rotation extending along the lateral or anteroposterior direction to provide the airbag emergence opening 122A on the lower side of the column cover 116A, measures have to be taken only to prevent the door 164 from opening downward when the airbag apparatus M4/M5 is inactive, utilizing such means as the retaining legs 168/168A formed either on the peripheral edge 123 of the opening 122A or on the outer peripheral edge of the door 164. There is no need for means for preventing the door 164 from opening upwardly because such a movement toward the interior of the column cover 116A is regulated by the folded airbag 145.

Although the door 164 in the fourth and fifth embodiment is a hinged door turning and opening about the hinge portion 165/165A, the door may be a sliding door as in a knee-protecting airbag apparatus M6 according to the sixth embodiment shown in FIGS. 39 to 43. In the sixth embodiment, an airbag cover 173 is a separate entity from a column cover 116B. A door 174 closing off an airbag emergence opening 122B on the column cover 116B is a sliding door adapted to slide open rearward along an opening face OP of the opening 122B or along the axial direction of the steering column 3. The airbag emergence opening 122B is disposed on an area ranging from the lower wall 117a to the left and right walls 117b and 117c of the circumferential wall 117 of the column cover 116B.

Although the column cover 116B, airbag cover 173 and a case 156B of the sixth embodiment have different structures from those of the third embodiment, other components such as the airbag 145 and inflator 151 have generally the same structures as those in the third embodiment.

Figure 40:
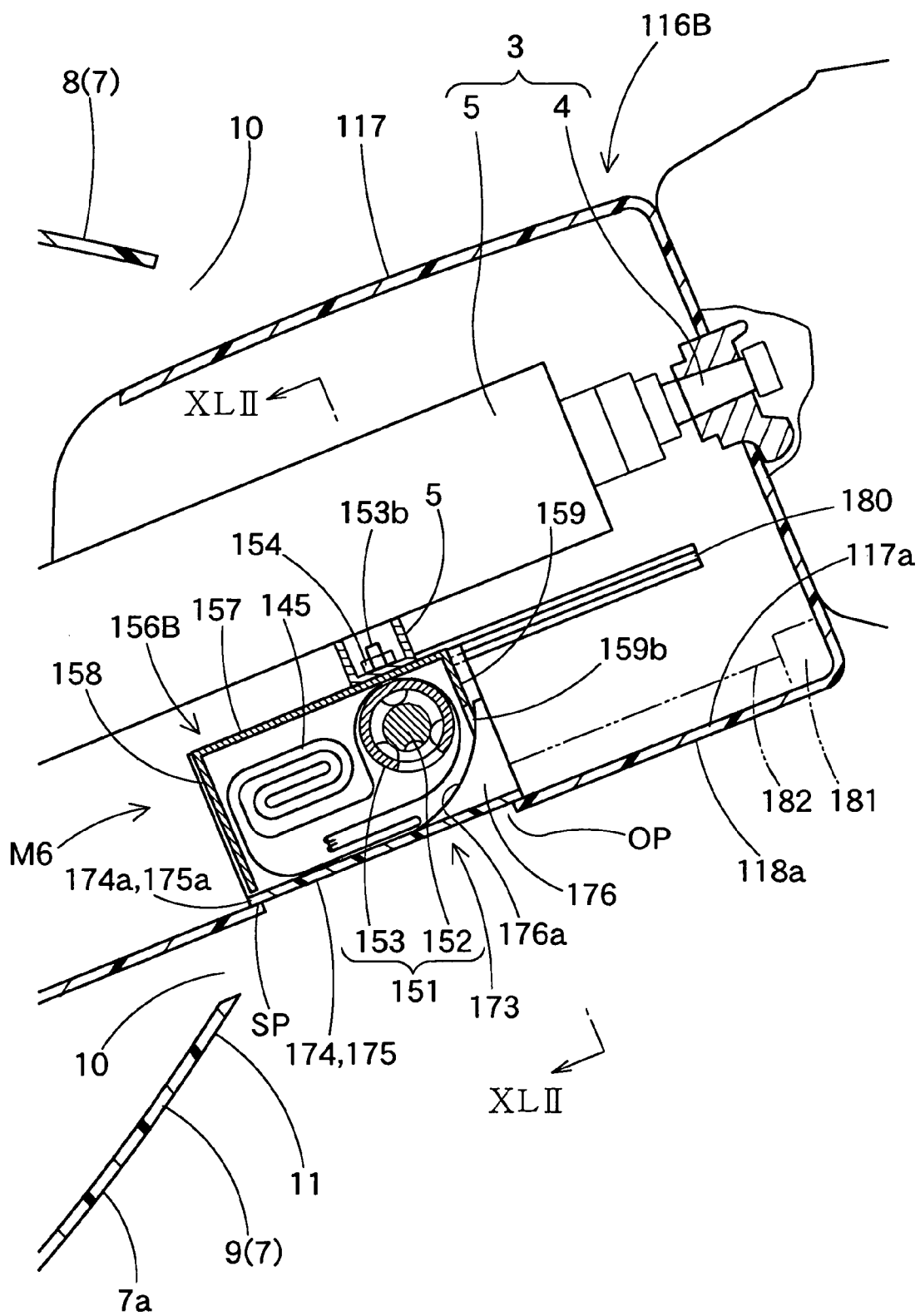
FIG. 40 is an enlarged schematic vertical section of a steering column equipped with the airbag apparatus of the sixth embodiment taken along the anteroposterior direction.
Figure 41:
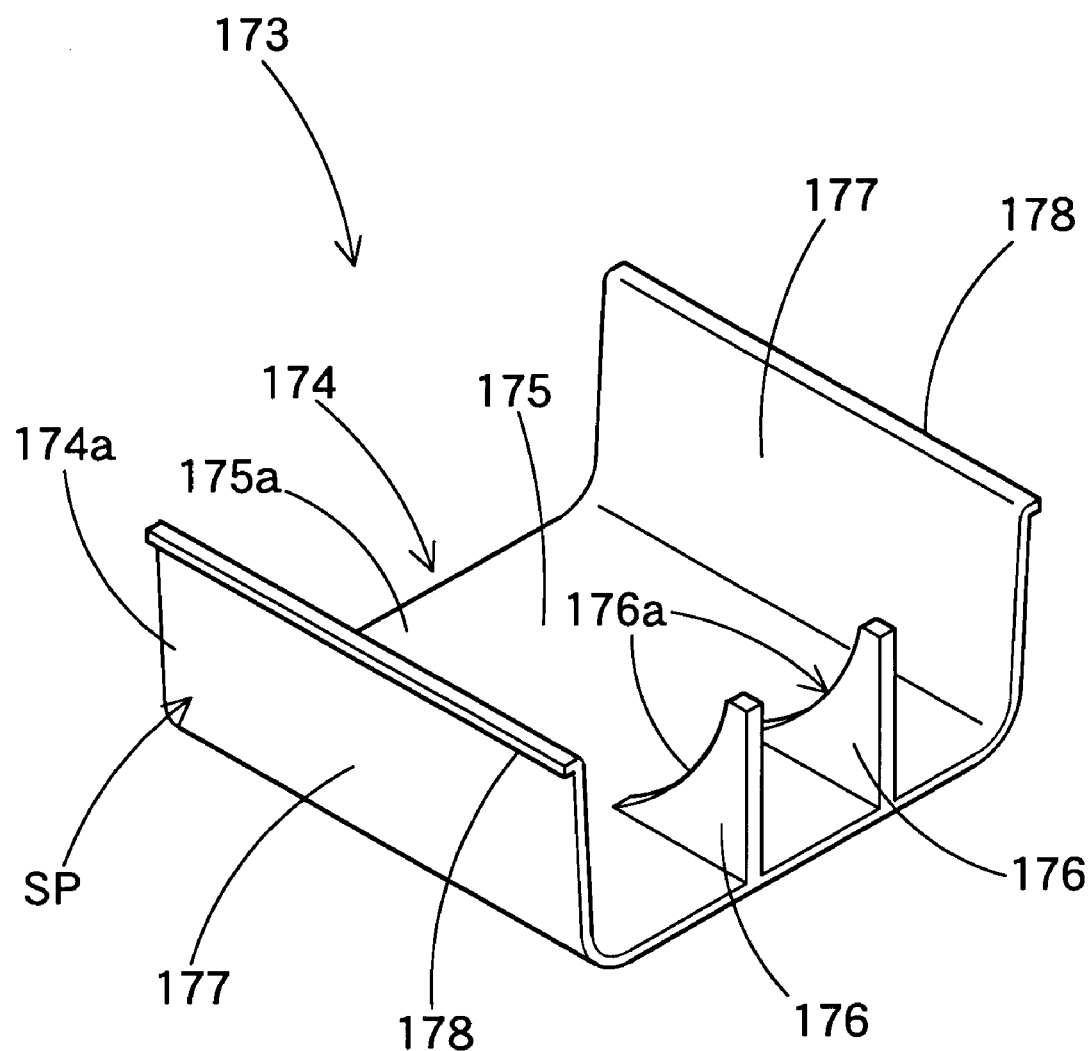
FIG. 41 is a perspective view of an airbag cover used for the airbag apparatus of the sixth embodiment.
Figure 42:
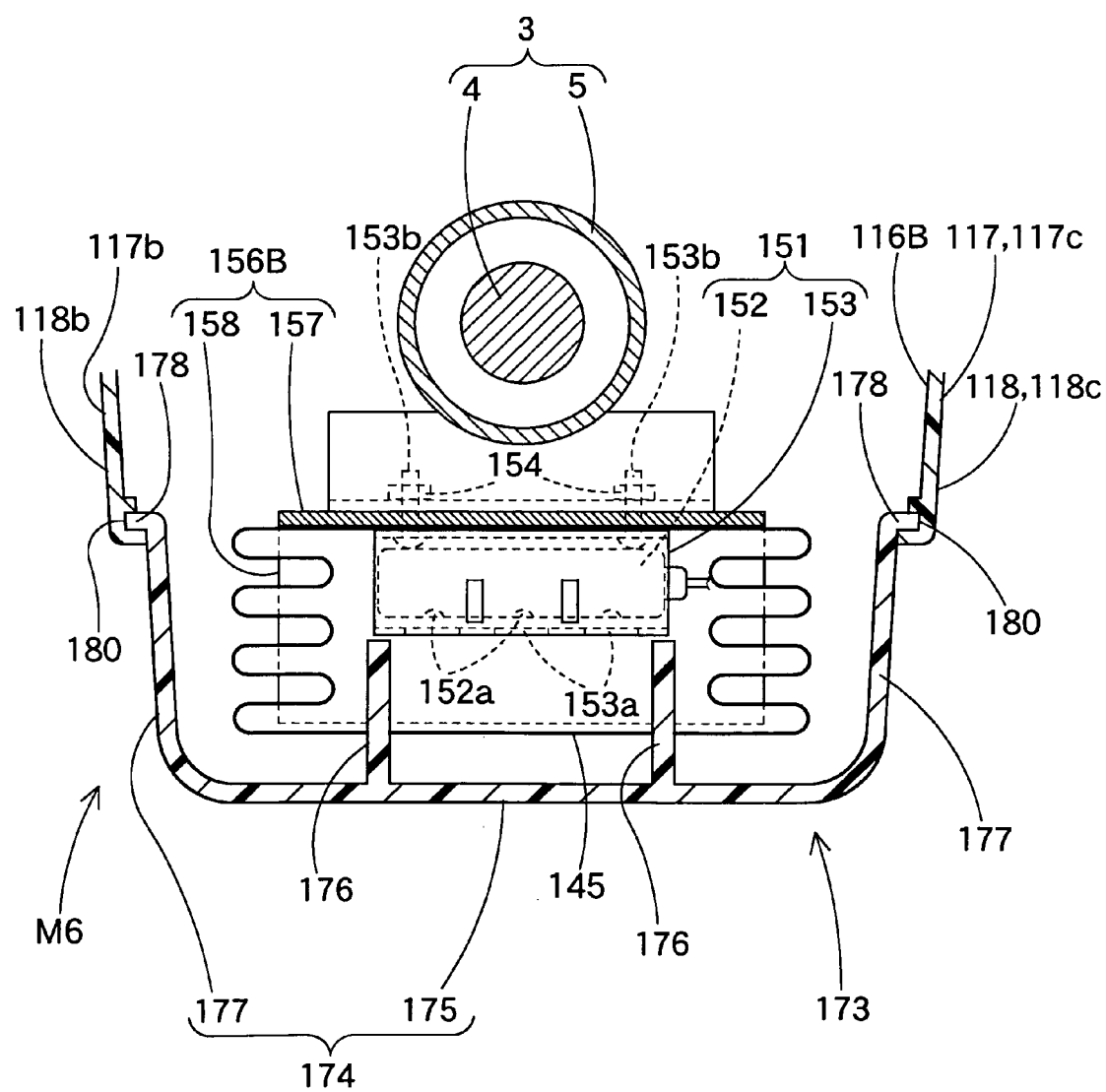
FIG. 42 is an enlarged schematic vertical section of the airbag apparatus of the sixth embodiment taken along line XLII-XLII of FIG. 40.

As shown in FIGS. 40 to 42, the airbag cover 173 is fabricated of synthetic resin having shape retention property and includes a bottom wall 175 and side walls 177 extending upwardly from the lateral sides of the bottom wall 175. Each of the side walls 177 is provided on top with a guide flange 178 projecting outwardly in the lateral direction. The bottom wall 175 covers an area of the airbag emergence opening 122B on a lower side 118a of the column cover 116B while the left and right side walls 177 cover areas of the opening 122B on left and right sides 118b and 118c of the column cover 116B. The bottom wall 175 is provided on the top side or inner side with thrust portions 176 each having a triangular plate shape and disposed in parallel in the lateral direction. The guide flanges 178 are fitted in guide grooves 180 formed on the inner side of the column cover 116B in a slidable manner. The guide grooves 180 extend along the axial direction of the steering column 3 from the vicinity of the upper edge of the airbag emergence opening 122B on the left and right walls 117b and 117c. The guide flanges 178 and guide grooves 180 cooperatively constitute a guide mechanism which guides the opening of the door 174. The thrust portions 176 are adapted to be thrusted backward by an inflating airbag 145 at front faces 176a thereof. The front face 176a each has such a tapered contour that rises rearward and upward from the bottom wall 175.

As shown in FIGS. 40 and 42, the case 156B is made of sheet metal and has a reverse-U section. It has a ceiling wall 157 and side walls 158 and 159 extending downwardly from front and rear edges of the ceiling wall 157. The side walls 158 and 159 have shorter vertical length relative to those of the third embodiment and have no retaining lugs. The rear side wall 159 has slits 159b extending upward from the distal end for receiving the thrust portions 176 from the rear.

Figure 43:
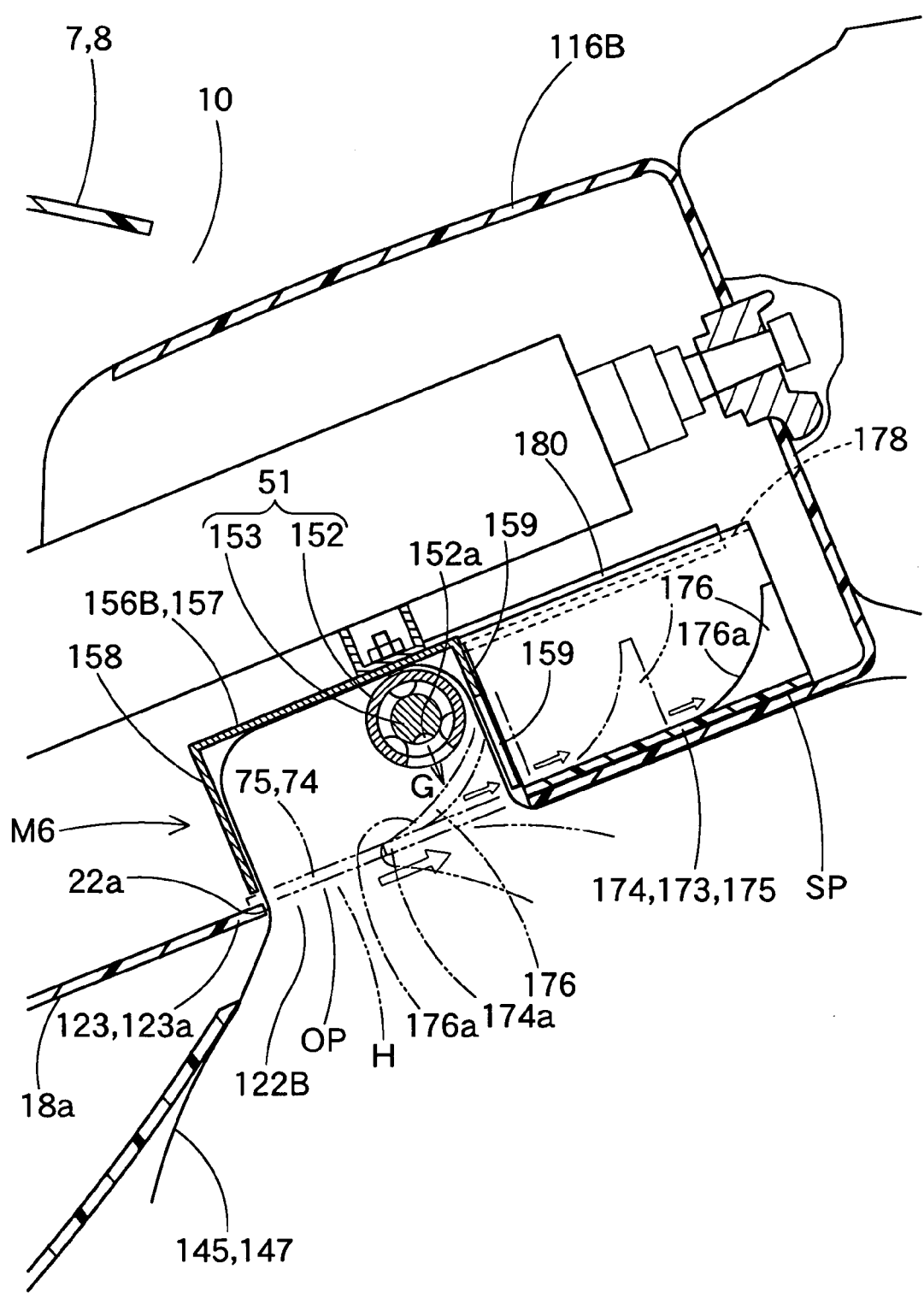
FIG. 43 is an enlarged schematic vertical section of the airbag apparatus of the sixth embodiment in operation.

In the airbag apparatus M6 of the sixth embodiment, if the folded and housed airbag 145 is fed with inflation gas G, the airbag 145 inflates as shown in FIGS. 40 and 43. Then the airbag 145 pushes the front sides 176a of the thrust portions 176 so that the guide flanges 178 slide in the guide grooves 180 to move the door 164 rearward, thereby forming the airbag emergence opening 122B on the column cover 116B. The emergence opening 1228 is formed by the drive force of the airbag 145 inflating inside the case 156B and pushing the front faces 176 of the thrust portions 176 and the drive force of the airbag 145 thrusting into a gap H formed between a front edge 175a of the bottom wall 175 and a front edge 123a of the peripheral edge 123 of the opening 122B on the column cover 116B and pushing the front edge 175a rearward. Hence the airbag 145 emerges from the opening 122B and deploys in front of knees K (KL and KR) of a driver D as indicated by double-dashed lines of FIG. 39.

In the sixth embodiment, too, the door 174 of the airbag cover 173 is preliminarily provided on the outer peripheral edge 174a with a separate surface SP which is separated from the peripheral edge 123 of the airbag emergence opening 122B on the column cover 116B. That is, the airbag cover 173 has no region to be broken to provide the emergence opening 122B, otherwise the airbag 145 would experience a high resistance when breaking open the airbag cover. Accordingly, the door 174 of the airbag cover 173 opens quickly and smoothly when pushed by the airbag 145 even if the internal pressure of the airbag 145 is not so high. As a result, the airbag 145 emerges from the case 1568 quickly for further deployment.

In the sixth embodiment, an actuator 181 and a tractive member 182 indicated by double-dashed lines in FIG. 40 may be utilized for speeding up the slide movement of the door 174. The actuator 181 may be comprised of a micro gas generator or the like for assisting the rearward movement of the door 174. The tractive member 182 extends from the actuator 181 for connection to the door 174. With this structure, the door 174 will be opened even faster by the driving force (traction) of the actuator 181 coupled with the pushing force of the airbag 145 upon inflation.

Further, the sliding door 174 may be formed only on the lower side 118a of the column cover 116B as long as the airbag emergence opening 122B secures a sufficient opening area for the emergence of the airbag 145.

As a modification of the structure wherein the airbag cover is a separate entity from the column cover, the following seventh embodiment will also be appreciated. In a knee-protecting airbag apparatus M7 according to the seventh embodiment shown in FIGS. 44 to 47, an airbag cover 183 is mounted on the steering column 3 such that a door 184 is disposed on a location of an airbag emergence opening 122C on the column cover 116C in such a manner as to open when pushed by the inflating airbag 145. The airbag emergence opening 122C is disposed on an area of the column cover 116C ranging from the lower wall 117a to the left and right walls 117b and 117c of the circumferential wall 117.

Although the column cover 116C, airbag cover 183 and a case 156C of the seventh embodiment have different structures from those of the third embodiment, other components such as the airbag 145 and inflator 151 have generally the same structures as those in the third embodiment.

The airbag cover 183 includes the door 184 and amounting section 188. The door 184 is fabricated from such synthetic resin as thermo-plastic elastomer so as to be flexed and open upon airbag inflation. The door 184 is configured to have a generally U-shape section and includes a bottom wall 185 adapted to cover the airbag emergence opening 122C on the lower side 118a of the column cover 116C and side walls 186 extending upwardly from the lateral sides of the bottom wall 185 for covering the airbag emergence opening 122C on the left and right sides 118b and 118c of the column cover 116C.

The mounting section 188 is configured to have a reverse-L shape section. It includes a joint plate 189 extending upward from a top side of a rear part of the bottom wall 185 of the door 184 along the lateral direction, and amounting plate 190 extending forward from the upper end of the joint plate 189. The mounting plate 190 is provided with mounting holes 190a for receiving bolts 153b of the diffuser 153 of the inflator 151. The mounting plate 190 is nut 154 fastened to a bracket 5a of the column tube 5 of the steering column 3 by the bolts 153b together with the case 156C.

When pushed by the inflating airbag 145, the door 184 rotates rearwardly and downwardly around a hinge region 187 disposed in front of the joint plate 189 on the bottom wall 185. When the bottom wall 185 gets opened, the left and right side walls 186 open in such a reversed manner as to contact left and right sides 118b and 118c of the column cover 116C.

Figure 45:
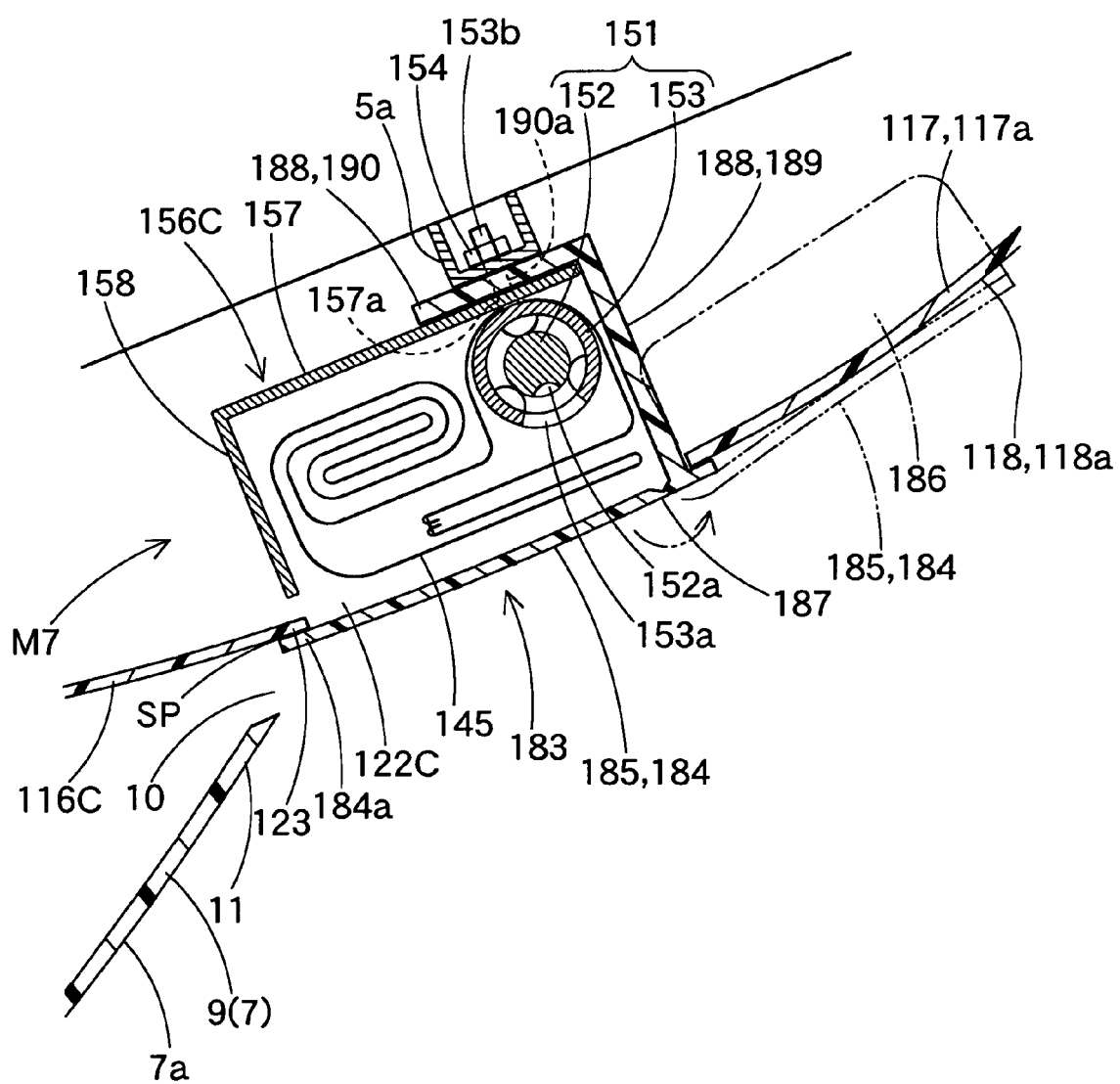
FIG. 45 is an enlarged schematic vertical section of a steering column equipped with the airbag apparatus of the seventh embodiment taken along the anteroposterior direction.
Figure 46:
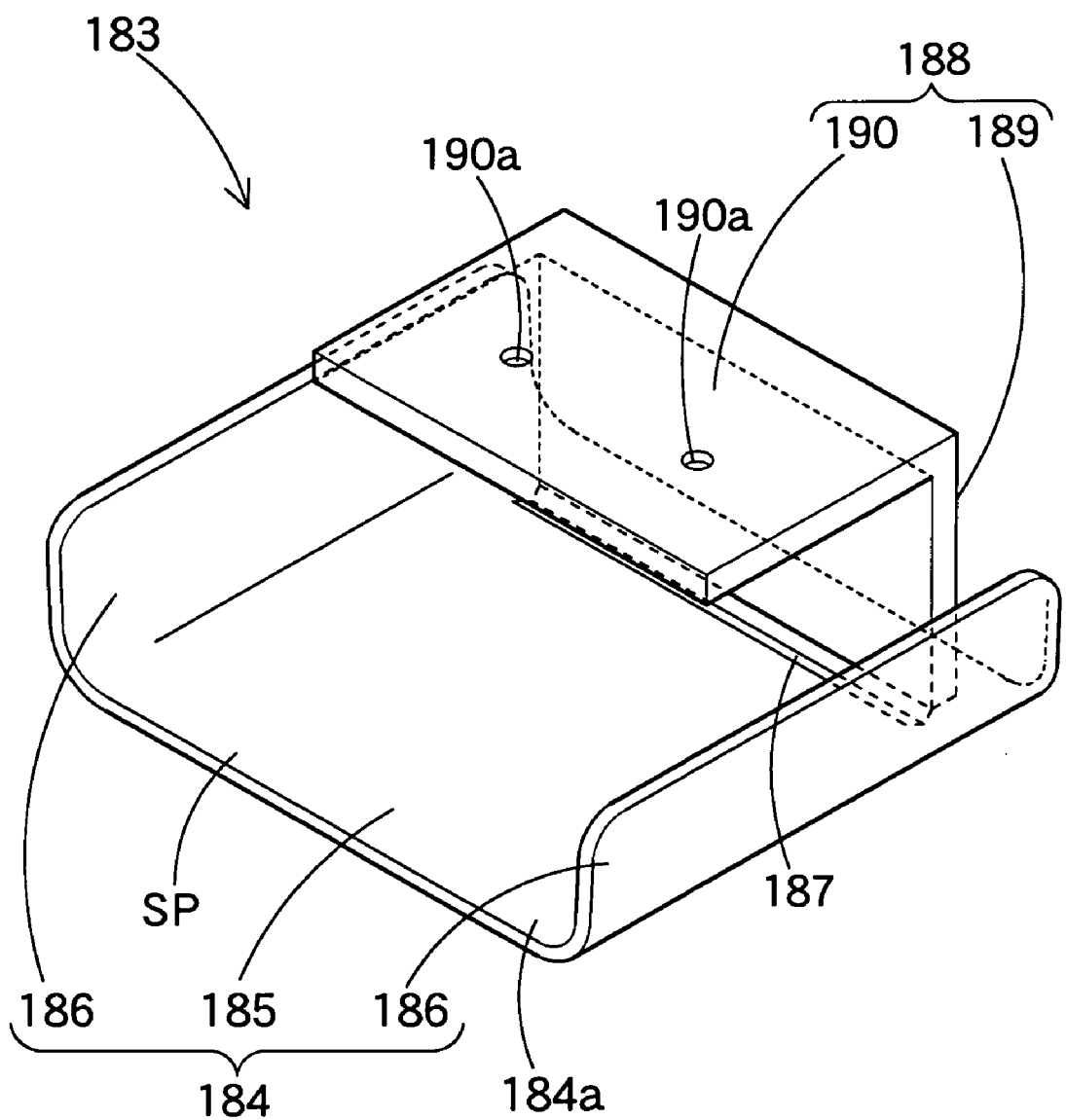
FIG. 46 is a perspective view of an airbag cover used for the airbag apparatus of the seventh embodiment.

The case 156C is made of sheet metal and has a reverse-L section as shown in FIG. 45. It has a ceiling wall 157 and a side wall 158 extending downwardly from the front edge of the ceiling wall 157.

Figure 44:
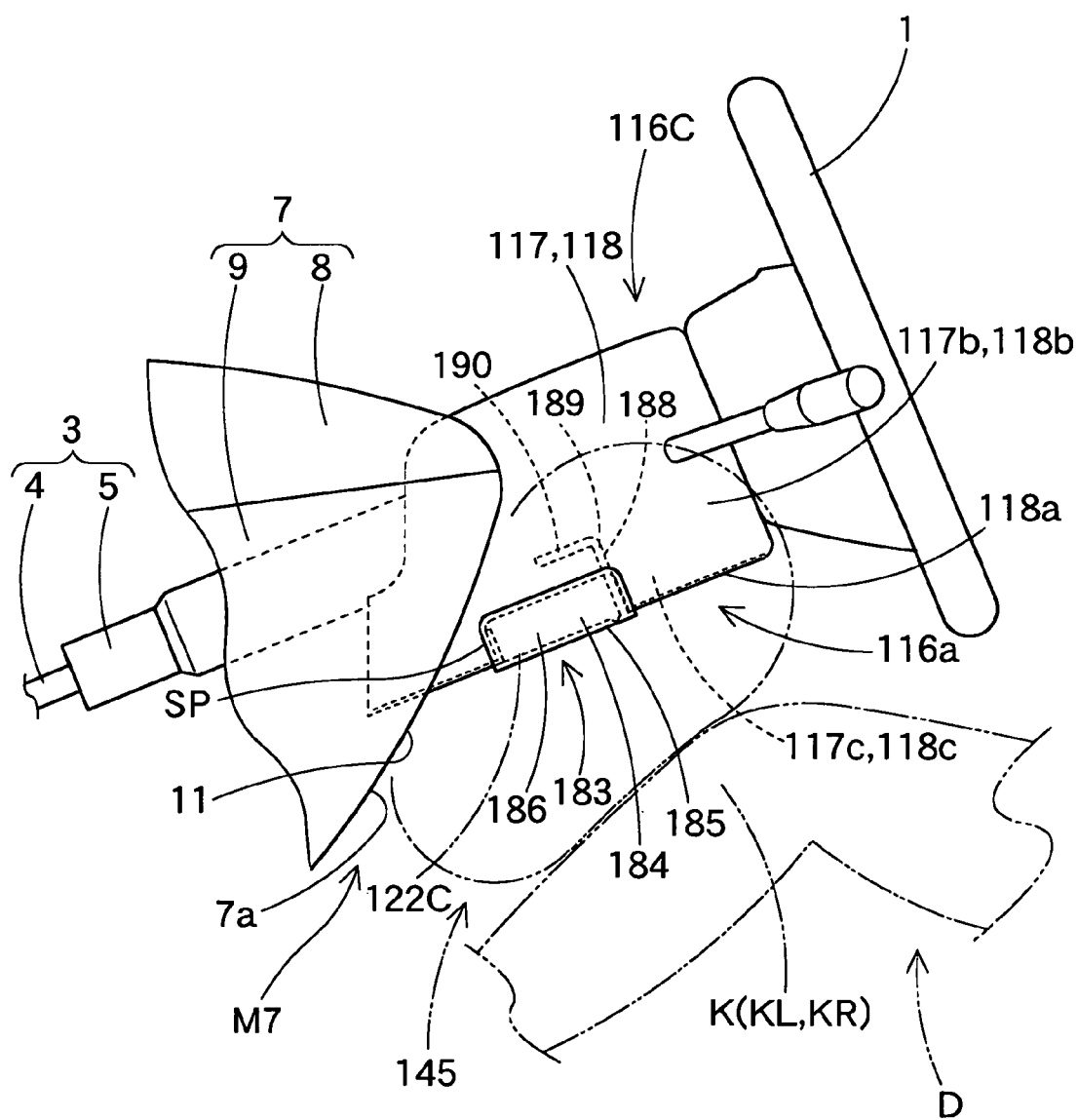
FIG. 44 is a schematic side view of the vicinity of a column cover equipped with a knee-protecting airbag apparatus according to the seventh embodiment of the invention.
Figure 47:
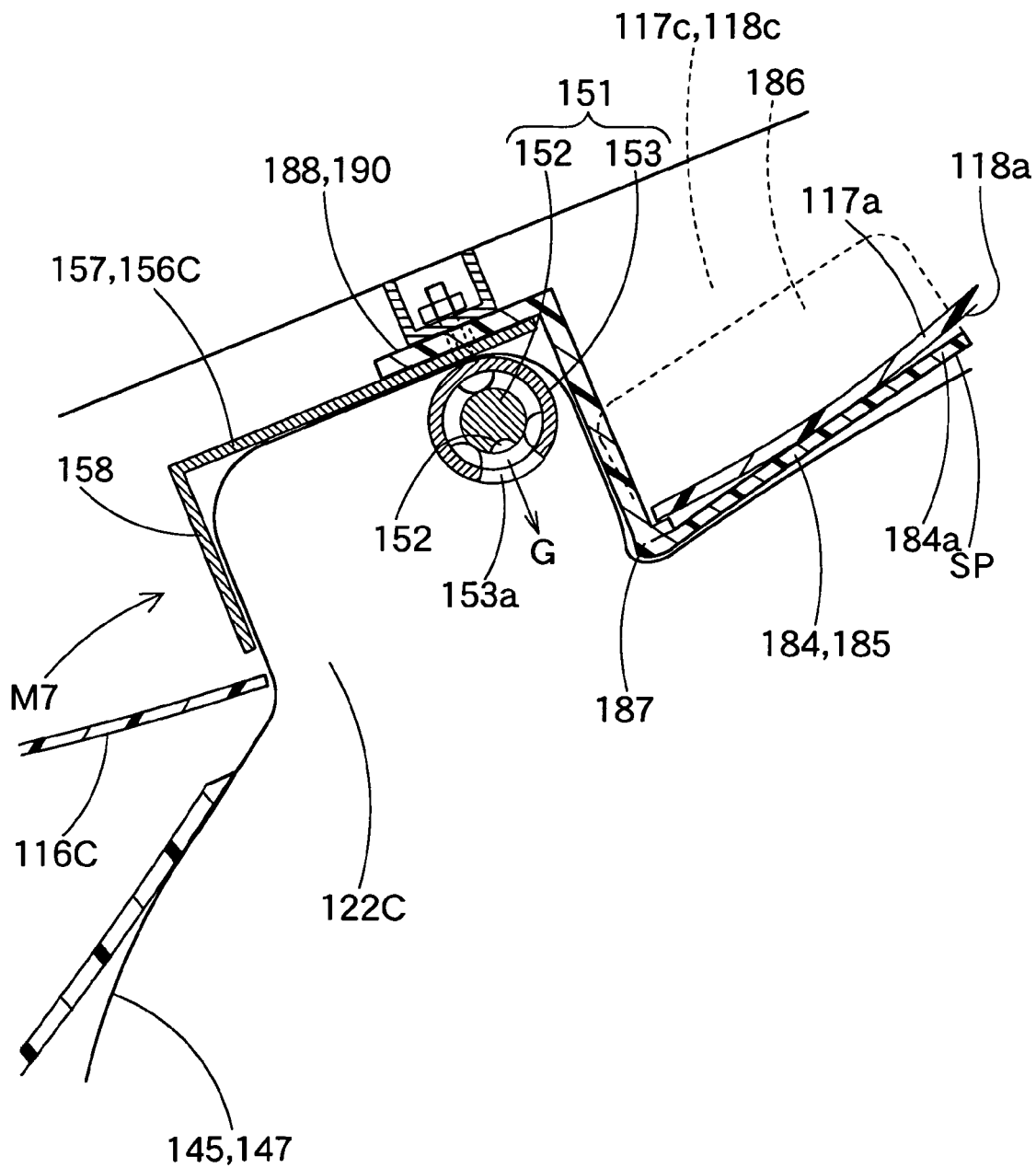
FIG. 47 is an enlarged schematic vertical section of the airbag apparatus of the seventh embodiment in operation.

In the airbag apparatus M7 of the seventh embodiment, if the folded and housed airbag 145 is fed with inflation gas G, the airbag 145 inflates as shown in FIGS. 44 and 47. Then the door 184 pushed by the inflating airbag 145 opens about the hinge region 187 rearwardly and downwardly, thereby forming the airbag emergence opening 122C on the column cover 116C. Hence the airbag 145 emerges from the opening 122C and deploys in front of knees K (KL and KR) of a driver D as indicated by double-dashed lines in FIG. 44.

The door 184 of the airbag cover 183 is preliminarily provided on the outer peripheral edge 184a with a separate surface SP which is separated from the peripheral edge 123 of the airbag emergence opening 122C on the column cover 116C. That is, the airbag cover 183 has no region to be broken to provide the emergence opening 122C, otherwise the airbag 145 would experience a high resistance. Accordingly, the door 184 of the airbag cover 183 opens quickly when pushed by the airbag 145 even if the internal pressure of the airbag 145 is not so high. As a result, the airbag 145 emerges from the case 156C quickly for further deployment, and the same working-effects as the third embodiment are obtained.

In the seventh embodiment, the airbag cover 183 provided separate from the column cover 116C is fixedly secured to the steering column 3 together with the airbag 145, inflator 151 and case 156C. This structure helps secure a stable opening of the door 184.

Further in the seventh embodiment, the outer peripheral edge 184a of the door 184 is overlaid on an outer surface of the peripheral edge 123 of the airbag emergence opening 122C on the column cover 116C (FIG. 45), and this overlapped area constitutes the separate surface SP. This structure differs from that of the third to fifth embodiments where the separate surface SP faces an inner circumference of the airbag emergence opening 122/122A on the circumferential wall 117 of the column cover 116/116A (FIGS. 25, 31 and 36) so that the front lower door 134 or door 164 is so disposed as to be generally flush with the column cover 116/116A. The door 184 of the seventh embodiment is disposed in a stepped manner from the lower side 118a, left side 118b, and right side 118c of the column cover 116C. However, this disposition of the door 184 will not affect the appearance of the column cover 116C because the door 184 is located on a lower region of the lower side 118a, left side 118b and right side 118c of the column cover 116C, i.e. on the lower region 116a of the column cover 116C.

Figure 48:
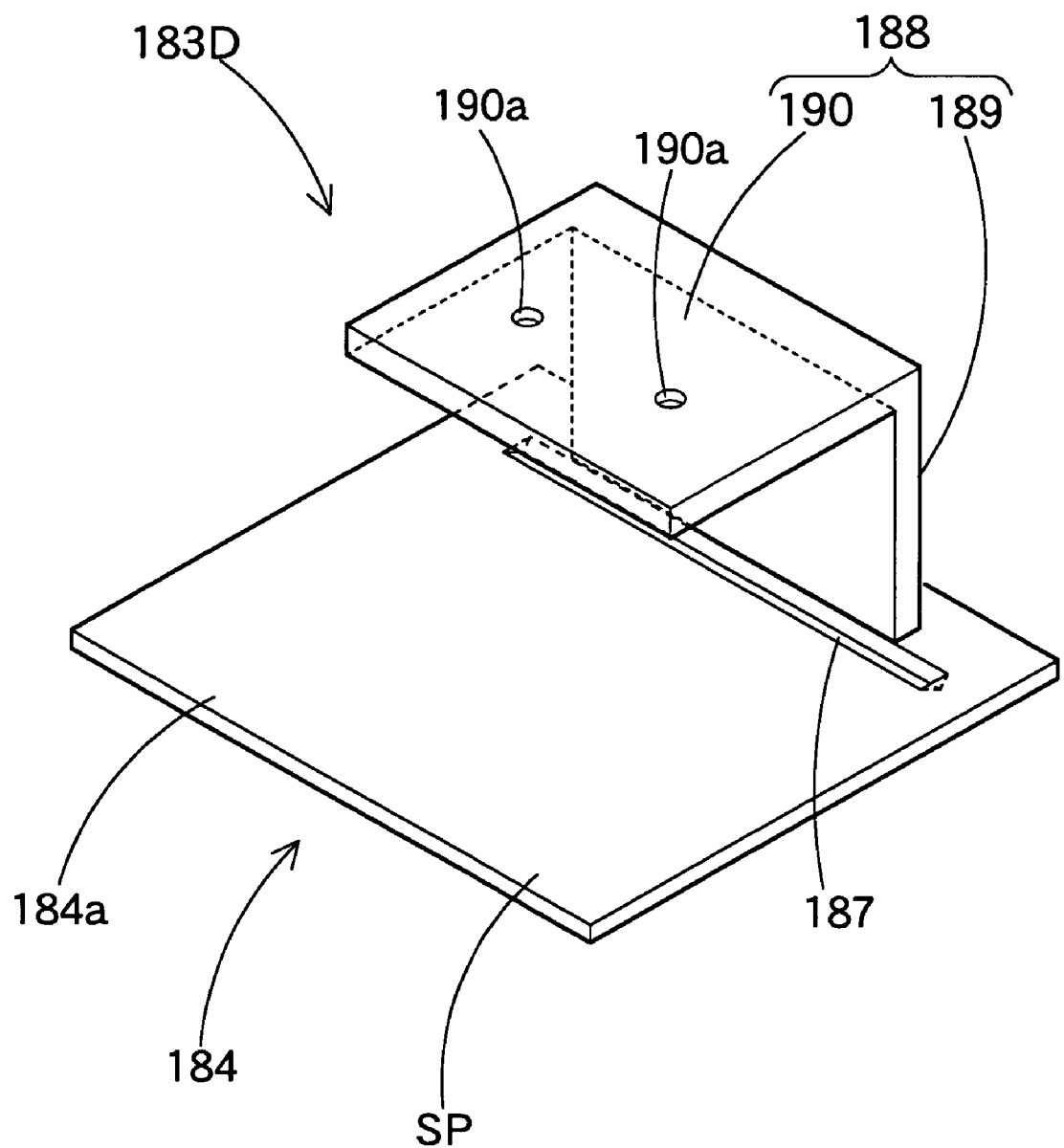
FIG. 48 is a perspective view of an airbag cover used for an airbag apparatus of the eighth embodiment.
Figure 49:
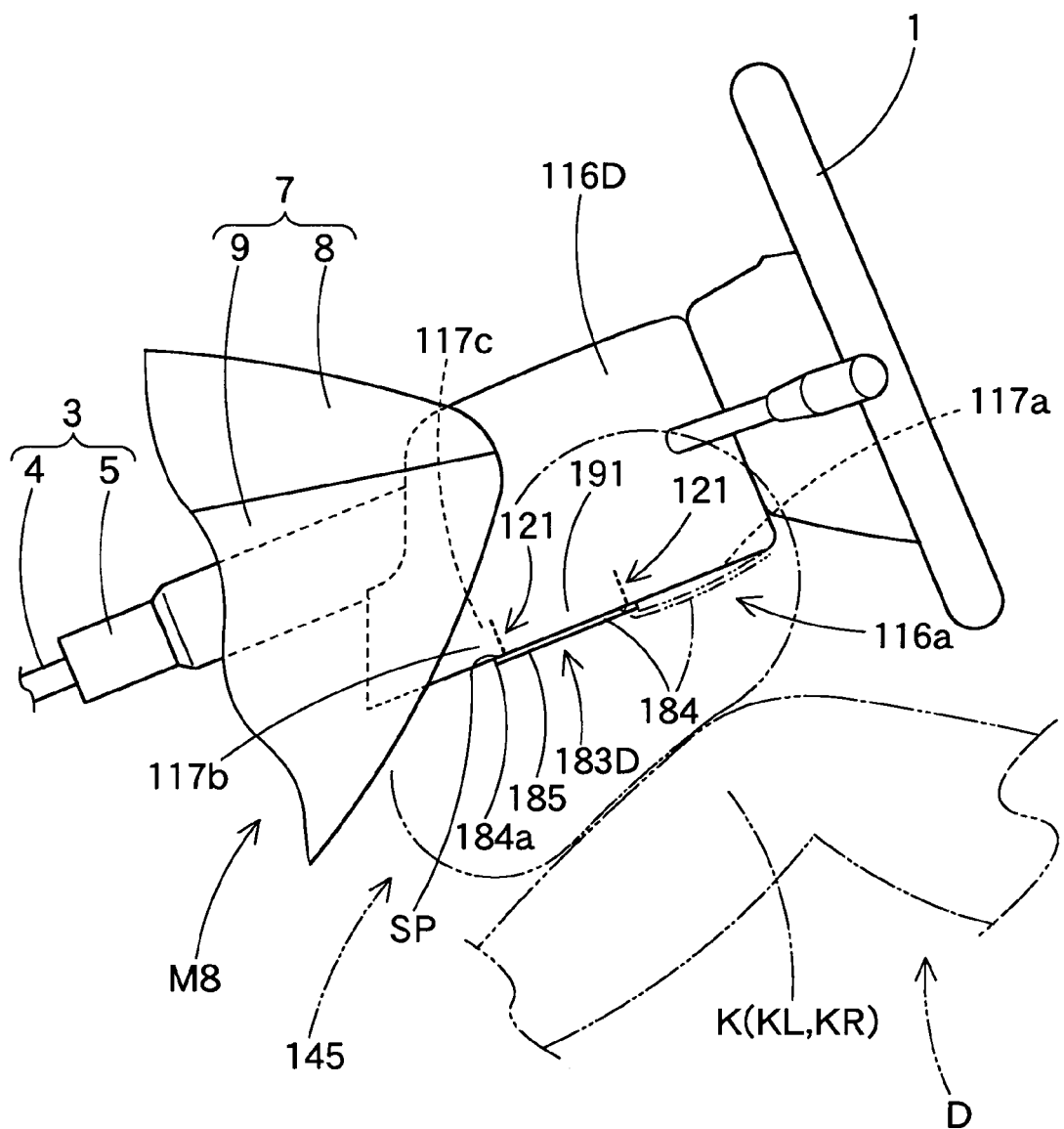
FIG. 49 is a schematic side view of the vicinity of a column cover equipped with the airbag apparatus according to the eighth embodiment of the invention.
Figure 50:
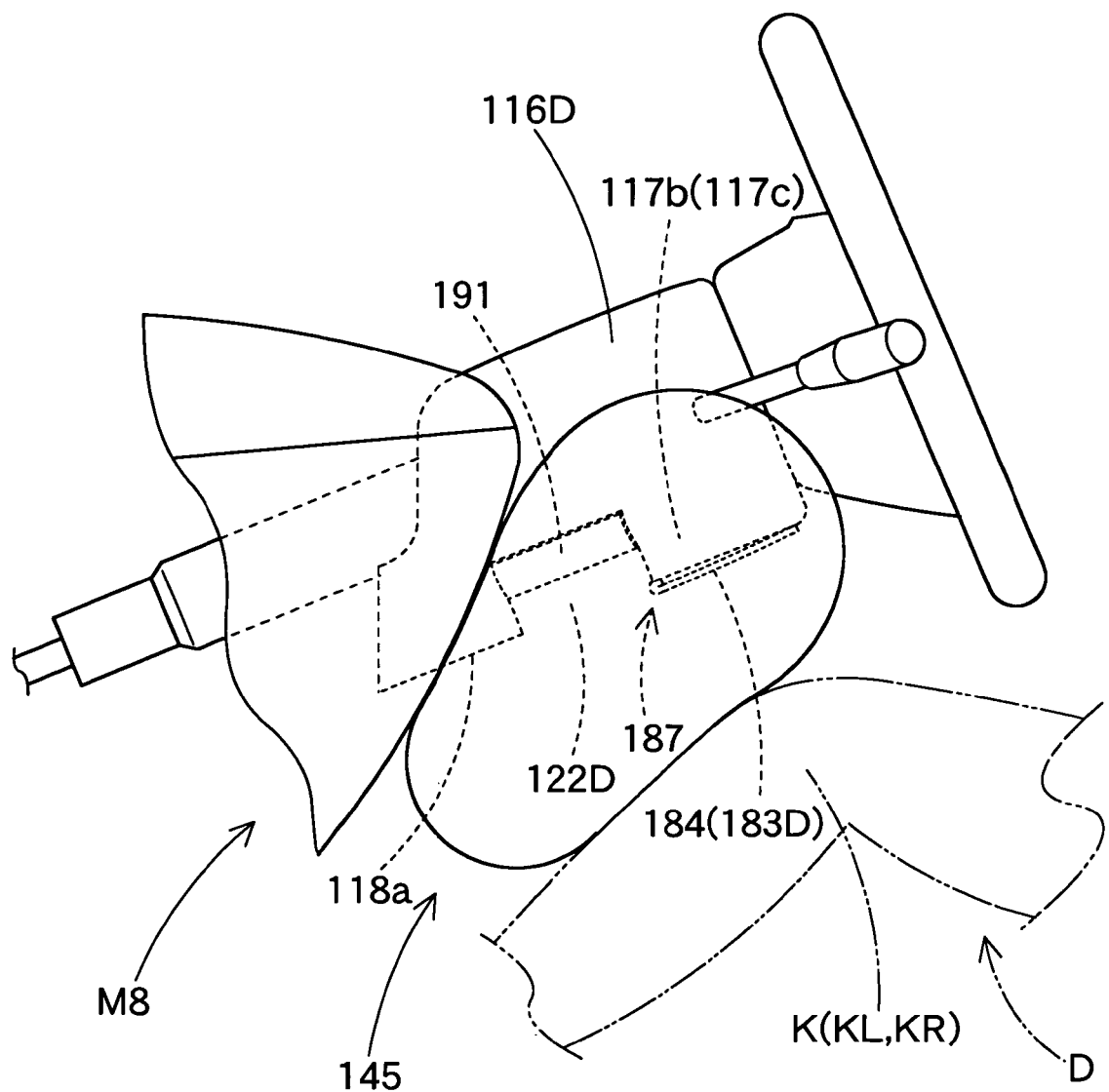
FIG. 50 is a schematic side view of the airbag apparatus of the eighth embodiment in operation.
Figure 51:
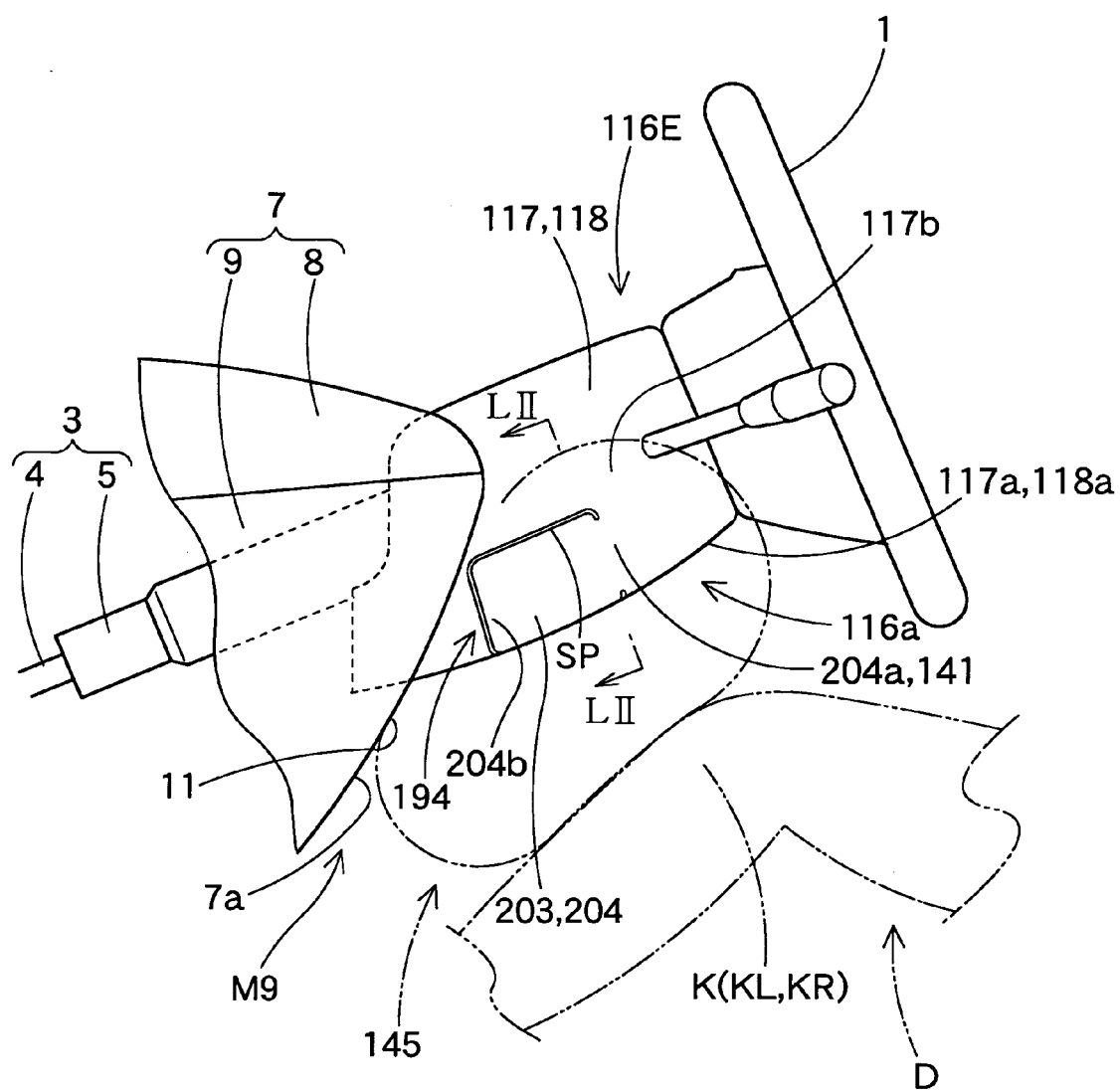
FIG. 51 is a schematic side view of the vicinity of a column cover equipped with a knee-protecting airbag apparatus according to the ninth embodiment of the invention.

An airbag cover separate from a column cover and mounted on a steering column may alternatively be structured as the eighth embodiment shown in FIGS. 48 to 50. In a knee-protecting airbag apparatus M8 of the eighth embodiment, a door 184 of an airbag cover 183D is composed only of the bottom wall 185 for covering the lower side 118a of an airbag emergence opening 122D on a column cover 116D.

In the eighth embodiment, auxiliary doors 191 are located on the left wall 117b and right wall 117c of the column cover 116D for increasing the opening area of the airbag emergence opening 122D as shown in FIGS. 49 and 50. Each of the auxiliary doors 191 is provided on the front and rear edges with thinned tearable areas 121 for teardown when pushed by the inflating airbag 145. When opening, the doors 191 open upward and help increase the opening areas of the airbag emergence opening 122D. The doors 191 are disposed in such a manner as not to hinder the deployment of the airbag in the initial stage of airbag inflation. Of course, slits formed through the column cover 116D may replace the tearable areas 121 having a thinned structure.

The airbag emergence opening in the foregoing embodiments are disposed on an area ranging from the lower side to left and right sides of the column cover or on the lower side only. Alternatively, the opening may be formed only on the left and right sides of the column cover as in the ninth embodiment shown in FIGS. 51 to 54.

An airbag cover 203 of a knee-protecting airbag apparatus M9 of the ninth embodiment is integral with a column cover 116D of synthetic resin. The airbag cover 203 includes doors 204 respectively disposed on the left wall 117b and right wall 117c of the column cover 116E. Each of these doors 204 has a rectangular plate contour and is provided along the peripheral edge with a slit 194. Each of the slits has a generally laid down U-shape such that the doors 204 open around an integral hinge 141 located at the rear edge, which hinge serves as a hinge region 204a, such that the front edge 204b rotates rearwardly and outwardly.

Figure 52:
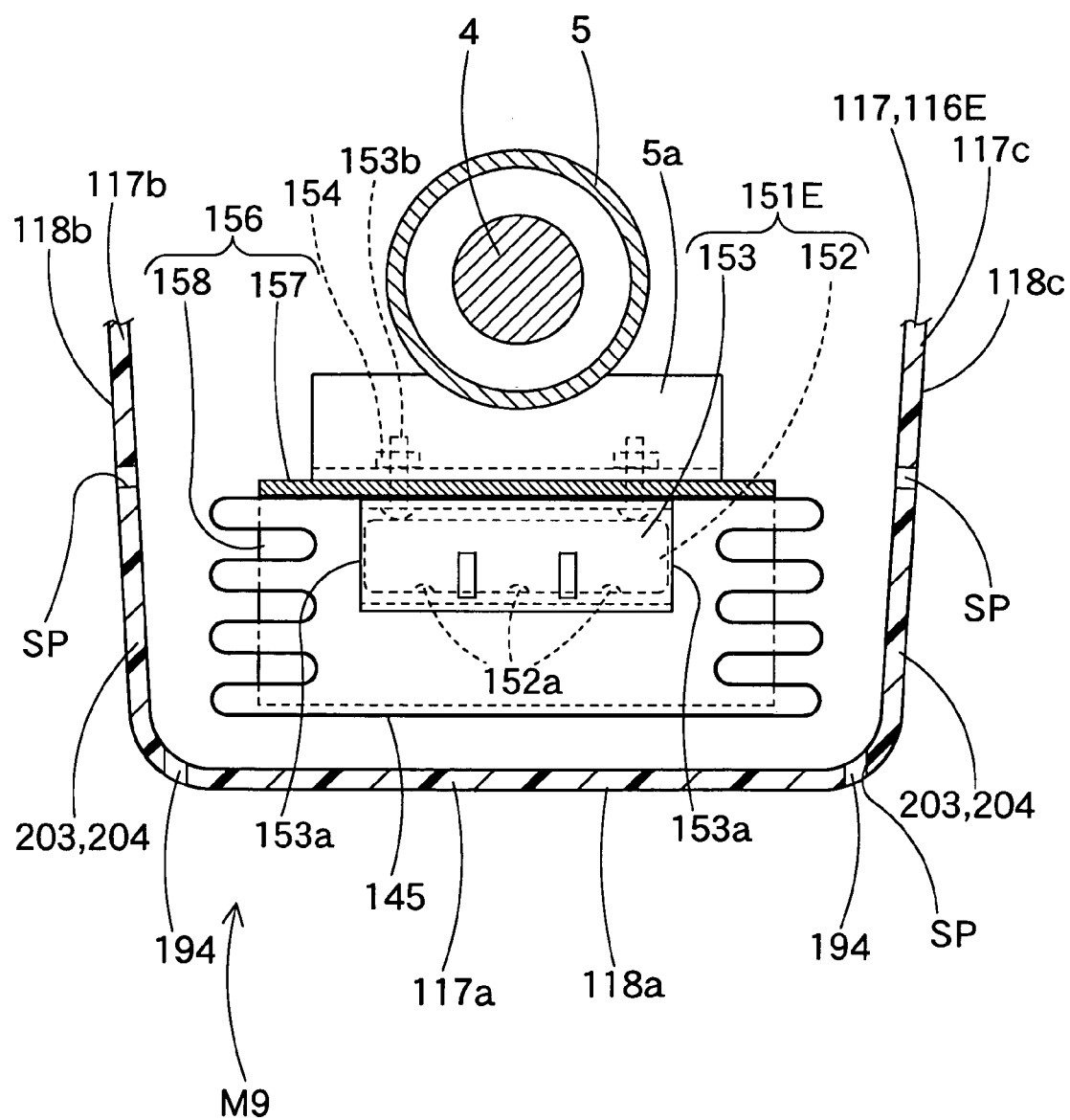
FIG. 52 is an enlarged schematic vertical section of the airbag apparatus of the ninth embodiment taken along line LII-LII of FIG. 51.
Figure 53:
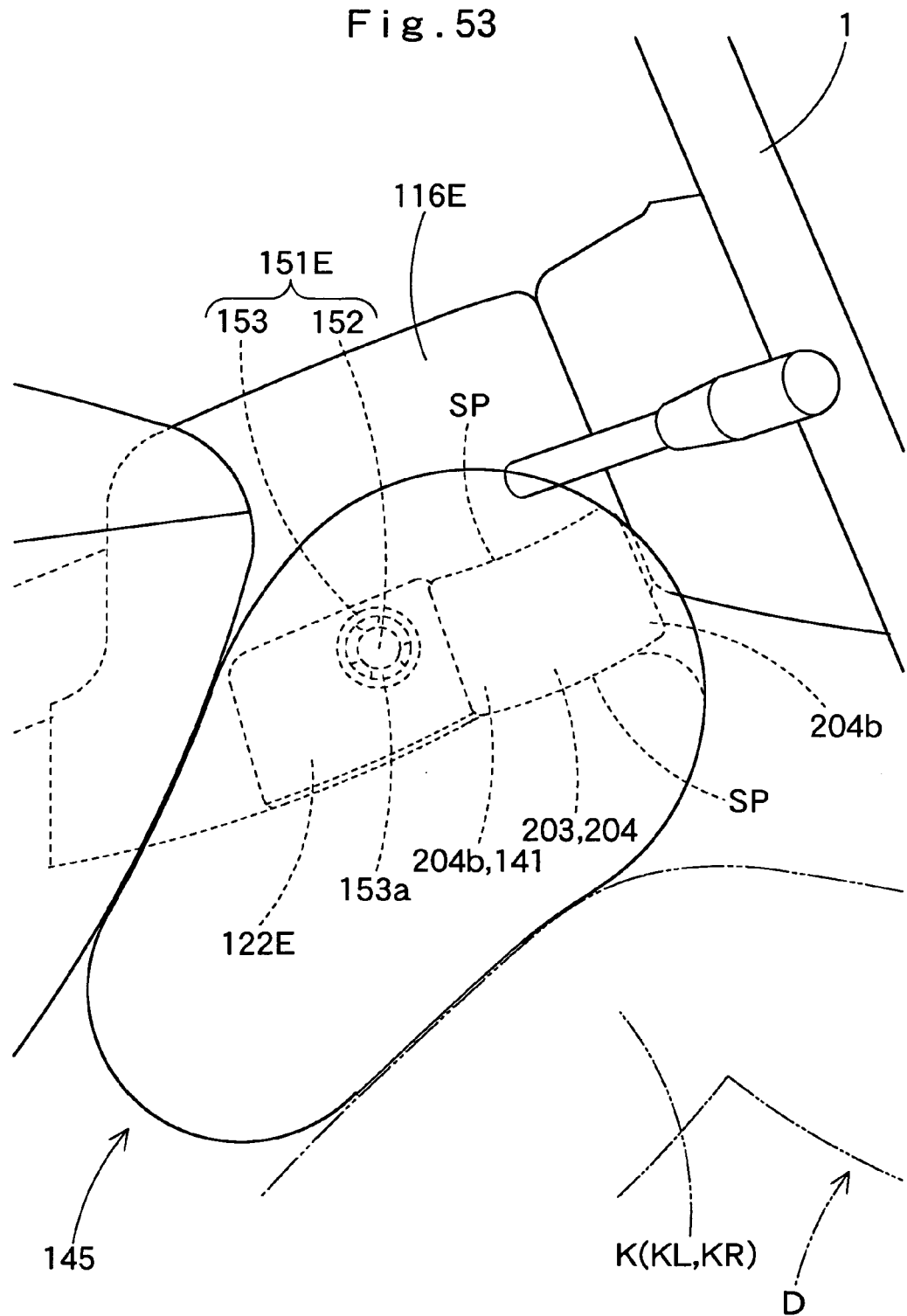
FIG. 53 is a schematic side view of the airbag apparatus of the ninth embodiment in operation.
Figure 54:
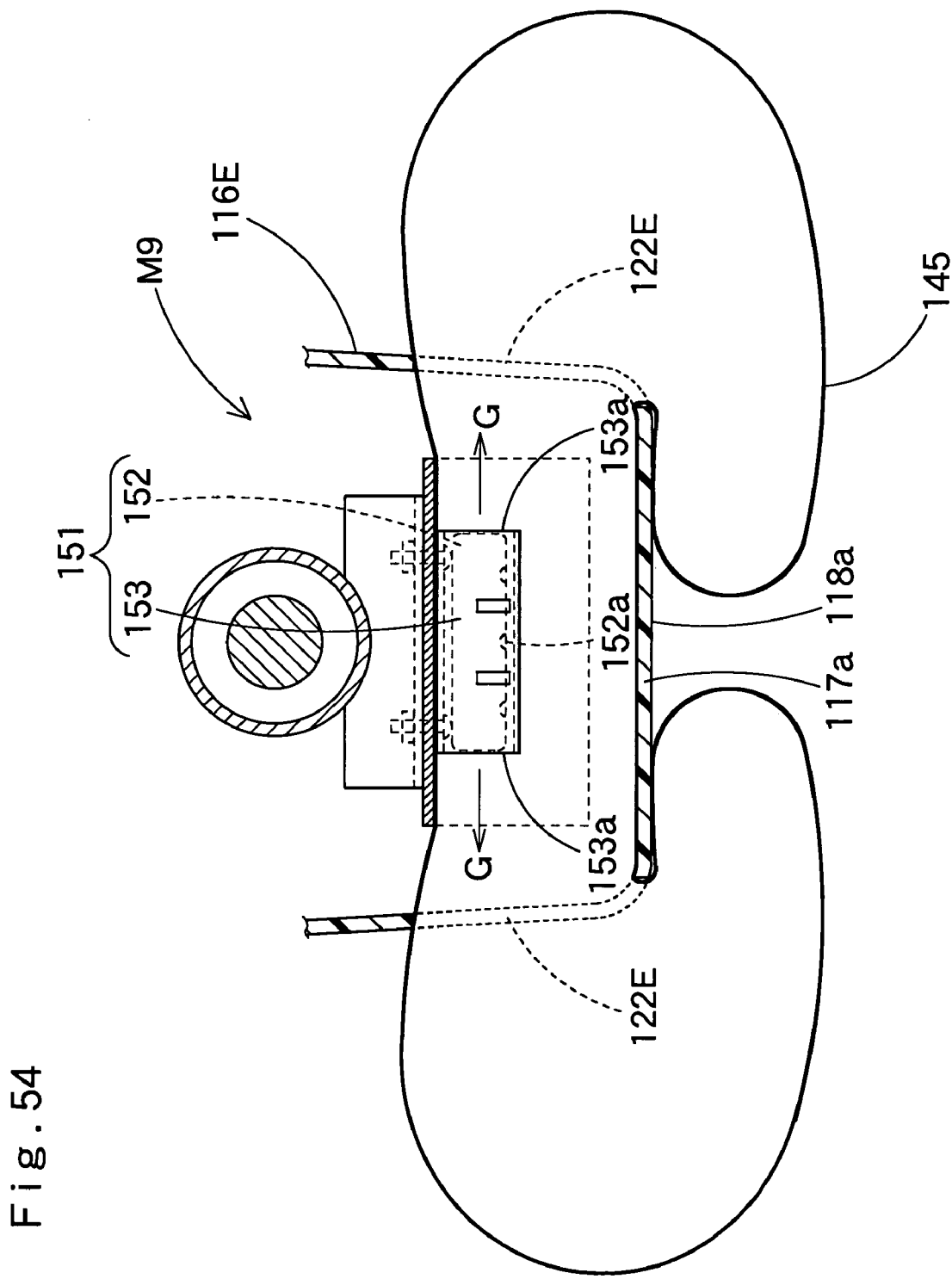
FIG. 54 is an enlarged schematic vertical section of the airbag apparatus of the ninth embodiment in operation taken along the lateral direction.

In the ninth embodiment, a cylindrical diffuser 153 of an inflator 151E has outlets 153a for letting out inflation gas G on left and right ends as shown in FIG. 52, so that the airbag 145 upon inflation easily pushes the left and right doors 204 outwardly toward the left and right.

In the airbag apparatus M9 of the ninth embodiment, too, when the airbag 145 is fed with inflation gas G discharged from gas discharge ports 152a of the inflator 151E, the inflated airbag 145 pushes the doors 204 to open rearward around the hinge regions 204a, thereby forming the airbag emergence openings 122E on the left and right sides 118b and 118c of the column cover 116E. Hence the airbag 145 emerges from the openings 122E and deploys in front of knees K (KL and KR) of a driver D as indicated by double-dashed lines in FIG. 51.

Each of the doors 204 of the ninth embodiment is preliminarily provided on the outer peripheral edge with the slit 194 i.e. a separate surface SP which is separated from the peripheral edge of the airbag emergence opening 122E on the column cover 116E. That is, the door 204 has no region to be broken to provide the emergence opening 122E, otherwise the airbag 145 would experience a high resistance. Accordingly, the door 204 of the airbag cover 203 opens quickly when pushed by the airbag 145 even if the internal pressure of the airbag 145 is not so high. As a result, the airbag 145 emerges from the case 156 quickly for further deployment.

In the ninth embodiment, the airbag emergence openings 122E are formed on the left and right sides of the lower region of the column cover 116E. With this structure, the airbag 145 is promoted to unfold toward the left and right, which helps the airbag 145 to secure a wide protection area in the lateral direction. Further, the airbag 145 will not project rearward or toward the knees K of the driver D unduly. Of course, if the opening areas 122, 122B and 122C are formed on an area ranging from the lower side 118a to the left and right sides 118b and 118c of the column cover 116, 116B and 116C as in the third, sixth and seventh embodiments, a wide protection area of the airbag 145 is secured in the lateral direction upon airbag inflation, too. In the third, sixth and seventh embodiments, furthermore, the airbag 145 is also deployed in the vicinity of the lateral center of the lower side 118a of the column cover 116, 116B and 116C. Accordingly, even if knees K of a driver are positioned right below the column cover 116, 116B and 116C, the inflated airbag 145 will protect the knees K.

The invention claimed is:
1. A knee-protecting airbag apparatus adapted to be mounted on a steering column of vehicle projecting rearward from an instrument panel and equipped with a steering wheel at a rear end thereof and an adjusting mechanism for adjusting the disposition of the steering wheel at least vertically, the airbag apparatus comprising:
    a column cover having a tubular contour and mounted on the steering column for covering the steering column, the column cover being set in an installation opening on the instrument panel for installing the column cover with an allowance gap left between the column cover and a peripheral region of the installation opening on a rear side of the instrument panel for allowing the movement of the column cover together with the steering column by operation of the adjusting mechanism;
    an airbag folded and housed in a lower area inside the column cover and emerging from the column cover for deployment when fed with inflation gas upon activation of the airbag apparatus, the airbag having such a contour as to cover at least a lower side of the column cover projected from the instrument panel and an area of the rear side of the instrument panel on lower, left and right sides of the column cover when fully inflated and deployed in front of driver's knees; and
    a door section formed on an area of the column cover ranging from the lower side to left and right sides of the column cover, the door opening up when pushed by the airbag for providing a single airbag emergence opening, the door section comprising a lower door disposed on the lower side, a left door disposed on the left side, and a right door disposed on the right side, of the column cover, wherein:

at least the lower door of the door section opening forward and away from the column cover from a rear edge region thereof and locating the rear edge region to abut on a rear side of the instrument panel or on a lower area of the peripheral region of the installation opening on the rear side of the instrument panel for blocking the allowance gap formed between an outer circumference of the column cover moved by the adjusting mechanism and the lower area of the peripheral region of the installation opening on the rear side of the instrument panel from the rear such that the airbag is prevented from entering into the allowance gap.

2. The knee-protecting airbag apparatus according to claim 1, wherein:

the left door and right door of the door section opening forward and away from the column cover from rear edge regions thereof and locating the rear edge regions to abut on the rear side of the instrument panel or on left and right areas of the peripheral region of the installation opening on the rear side of the instrument panel for blocking the allowance gap formed between the outer circumference of the column cover moved by the adjusting mechanism and the left and right areas of the peripheral region of the installation opening on the rear side of the instrument panel from the rear such that the airbag is prevented from entering into the allowance gap.

3. The knee-protecting airbag apparatus according to claim 2, wherein:

each of the lower door, left door and right door of the door section has flexibility;

dispositions of the rear edges of the lower, left and right doors are predetermined such that regions of the respective doors flexed and opened in such a manner as to project from the outer circumference of the column cover contact with the lower, left and right areas of the peripheral region of the installation opening on the instrument panel when the column cover is moved to the foremost position by the adjusting mechanism and the allowance gap is maximized; and lengths of the respective doors from rear ends to front ends at both lateral edges of the doors are predetermined such that the flexed-open regions of the respective doors contact with the lower, left and right areas of the peripheral region of the installation opening on the instrument panel when the column cover is moved to the rearmost position by the adjusting mechanism and the allowance gap is maximized.

4. The knee-protecting airbag apparatus according to claim 3, wherein the front ends of the lower, left and right doors of the door section at both lateral edges of the doors are located proximate the peripheral region of the installation opening on the instrument panel as viewed from a side of vehicle when the column cover is disposed at the rearmost position.

5. The knee-protecting airbag apparatus according to claim 1, wherein each of the lower door, left door and right door of the door section has a tearable portion around thereof adapted to tear when pushed by the airbag such that the door opens by teardown of the tearable portions for providing the airbag emergence opening.

6. The knee-protecting airbag apparatus according to claim 1, wherein:

each of the lower door, left door and right door of the door section is connected to the column cover at a hinge region thereof around which the respective door opens; and a peripheral edge of each of the lower door, left door and right door except the hinge region is preliminarily separated from a surrounding area of the column cover.

7. The knee-protecting airbag apparatus according to claim 1 comprising an additional door formed on the column cover to adjoin the lower door, left door and right door of the door section from the rear, the additional door coupled with the door section forming the airbag emergence opening.

* * * * *